United States Patent

Shiraishi et al.

[11] Patent Number: 6,100,912
[45] Date of Patent: Aug. 8, 2000

[54] MULTI-BEAM EXPOSER UNIT

[75] Inventors: Takashi Shiraishi, Sagamihara; Masao Yamaguchi, Funabashi; Yasuyuki Fukutome, Tokyo, all of Japan

[73] Assignee: Kabushiki Kaisha Toshiba, Tokyo, Japan

[21] Appl. No.: 08/903,943

[22] Filed: Jul. 31, 1997

[30] Foreign Application Priority Data

Jul. 31, 1996 [JP] Japan .................................. 8-201645

[51] Int. Cl.⁷ .................................................. B41J 2/385
[52] U.S. Cl. ......................... 347/233; 347/241; 347/244; 359/205
[58] Field of Search .................................. 347/233, 241, 347/243, 244, 256, 257, 258, 261; 359/205, 206

[56] References Cited

U.S. PATENT DOCUMENTS

| | | | |
|---|---|---|---|
| 5,715,079 | 2/1998 | Ono ......................................... | 359/205 |
| 5,734,489 | 3/1998 | Shiraishi et al. ......................... | 359/205 |
| 5,774,249 | 6/1998 | Shiraishi et al. ......................... | 359/205 |
| 5,806,428 | 9/1998 | Koppelkamm et al. ............ | 101/352.04 |

*Primary Examiner*—N. Le
*Assistant Examiner*—Hai C. Pham

*Attorney, Agent, or Firm*—Foley & Lardner

[57] ABSTRACT

A multi-beam exposer unit 1 includes $$\sum_{i=1}^{M}(Ni-1)$$

half mirror 11 for synthesizing $$\sum_{i=1}^{M} Ni$$

light to M groups of light beams, M sets of optical members 12, having positive power with a large absolute value as compared with a case of a main scanning direction, for further converging the beam in a sub-scanning direction, a synthesizing reflection mirror 13 for reflecting M groups of beams to be substantially overlaid on each other in a first direction, a polygon mirror unit 5 for deflecting M groups of beams, and a dust prevention glass 14 inclined to a direction opposite to a direction where the half mirror is inclined, thereby reducing influence of coma aberration exerted on M groups of beams by the half mirror.

3 Claims, 32 Drawing Sheets

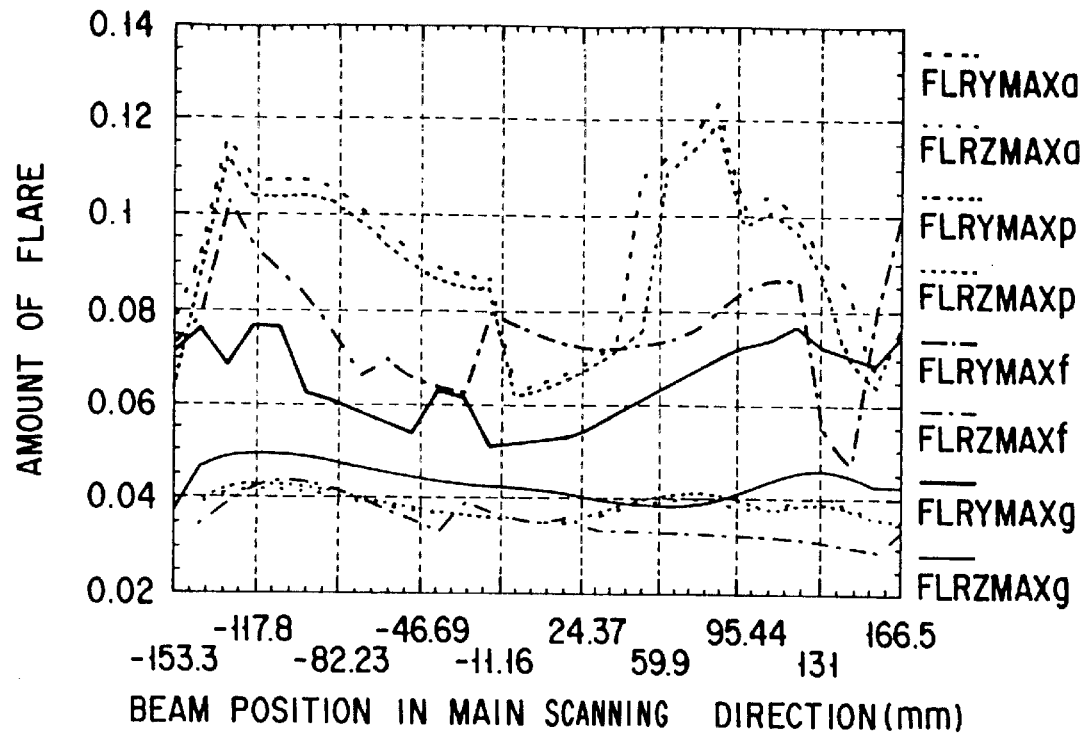
F I G. 6
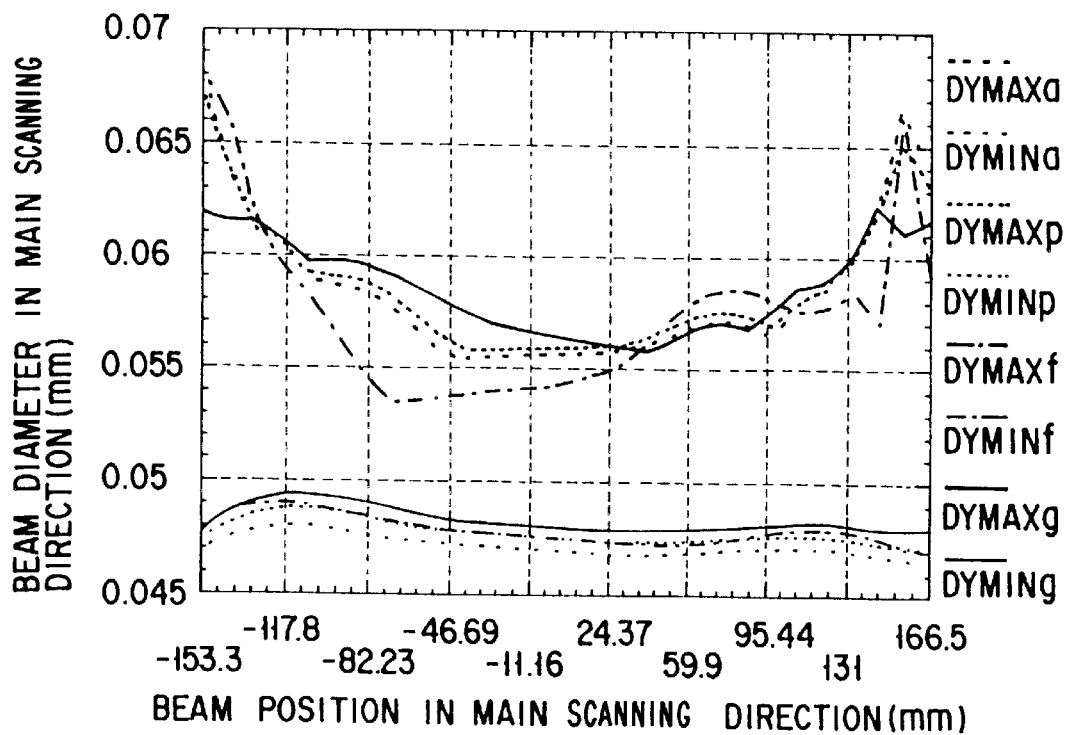
F I G. 7

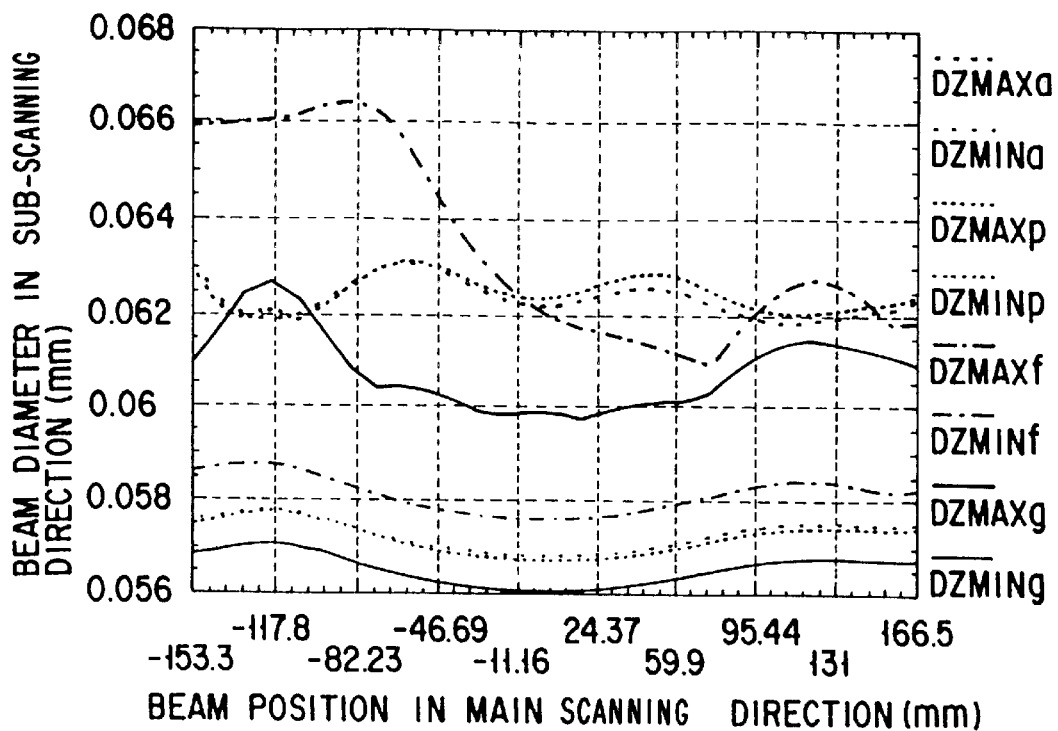
F I G. 8
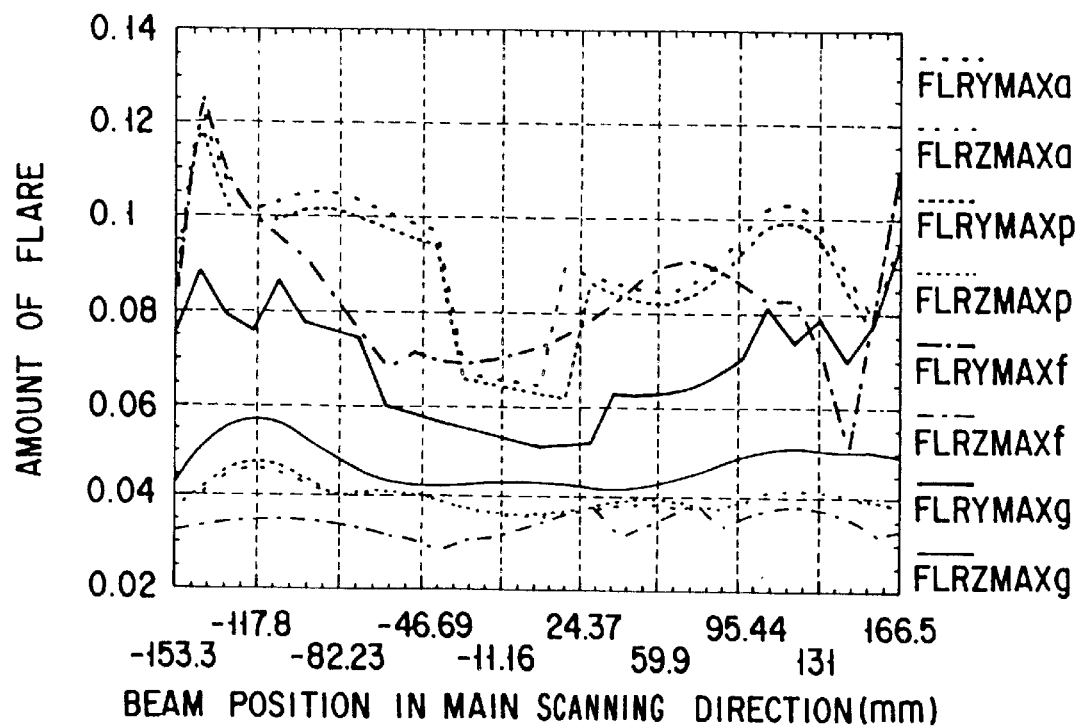
F I G. 9

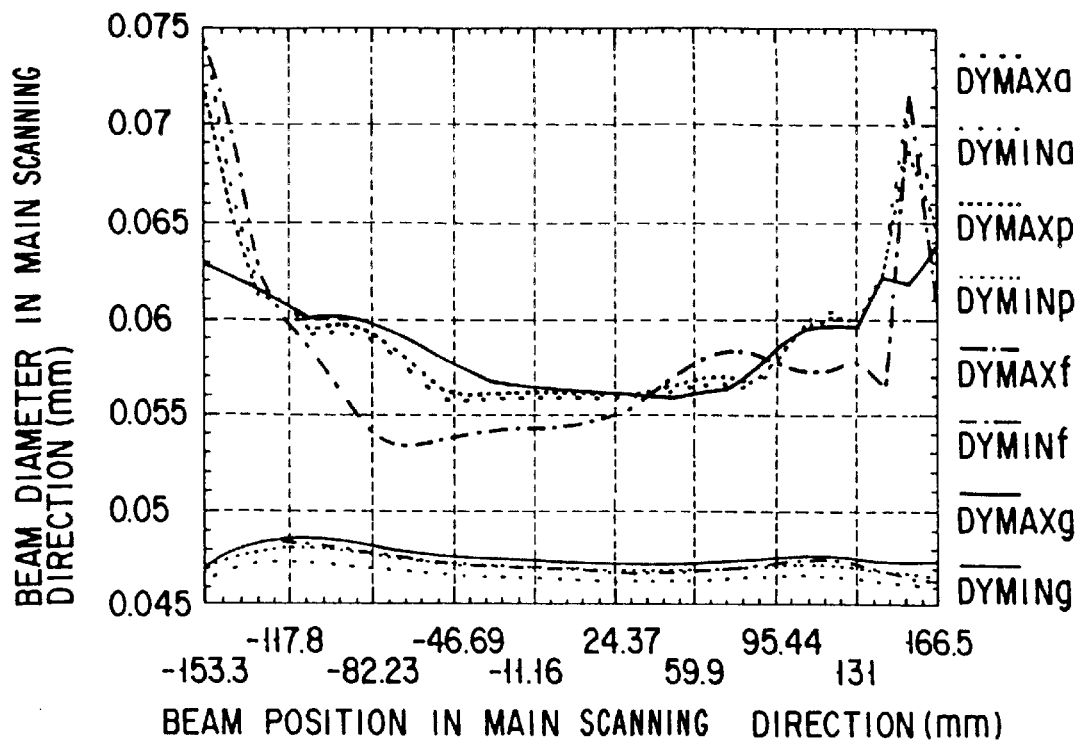
F I G. 10
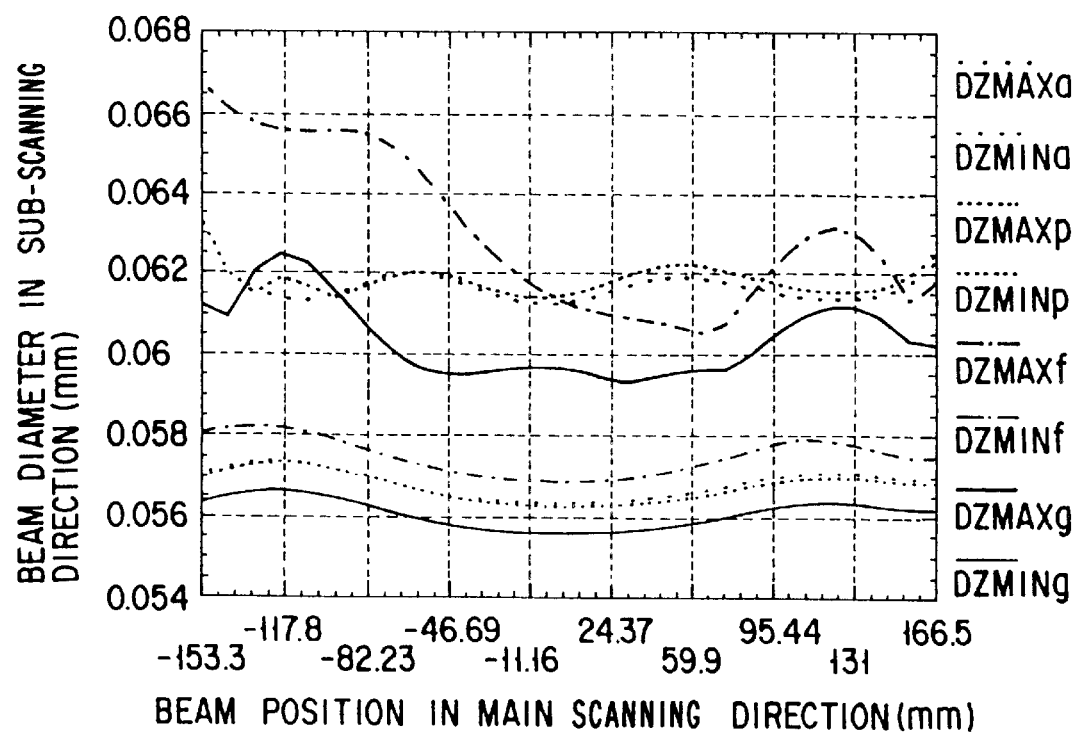
F I G. 11

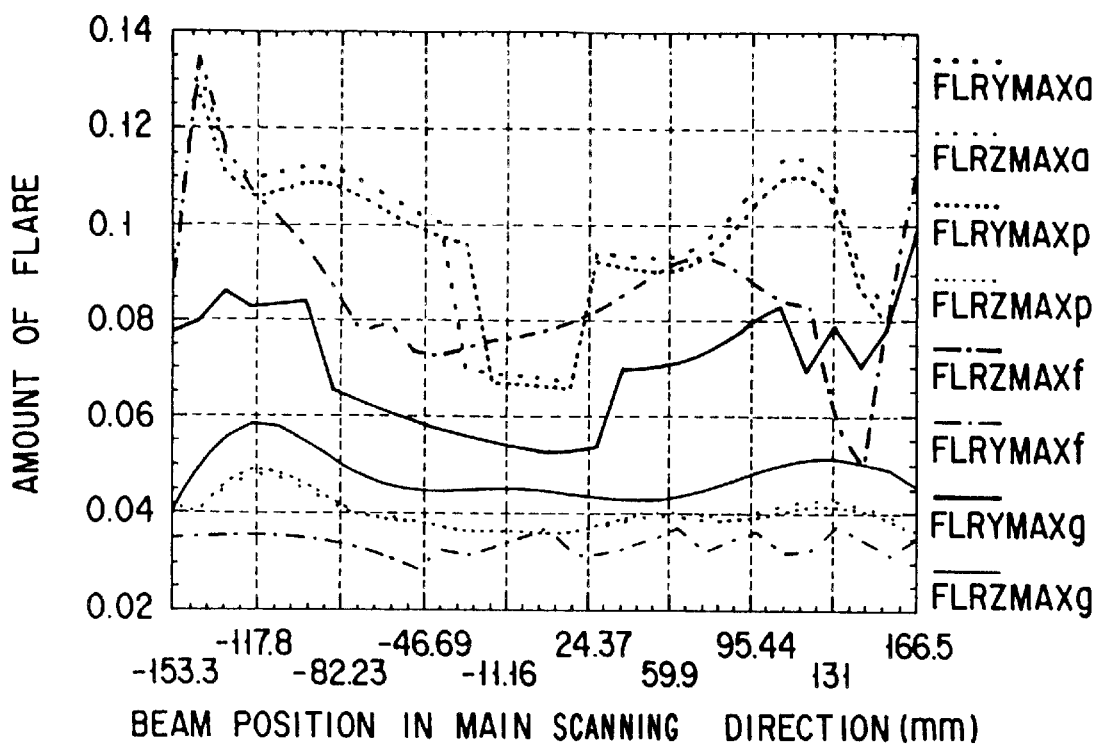
F I G. 12
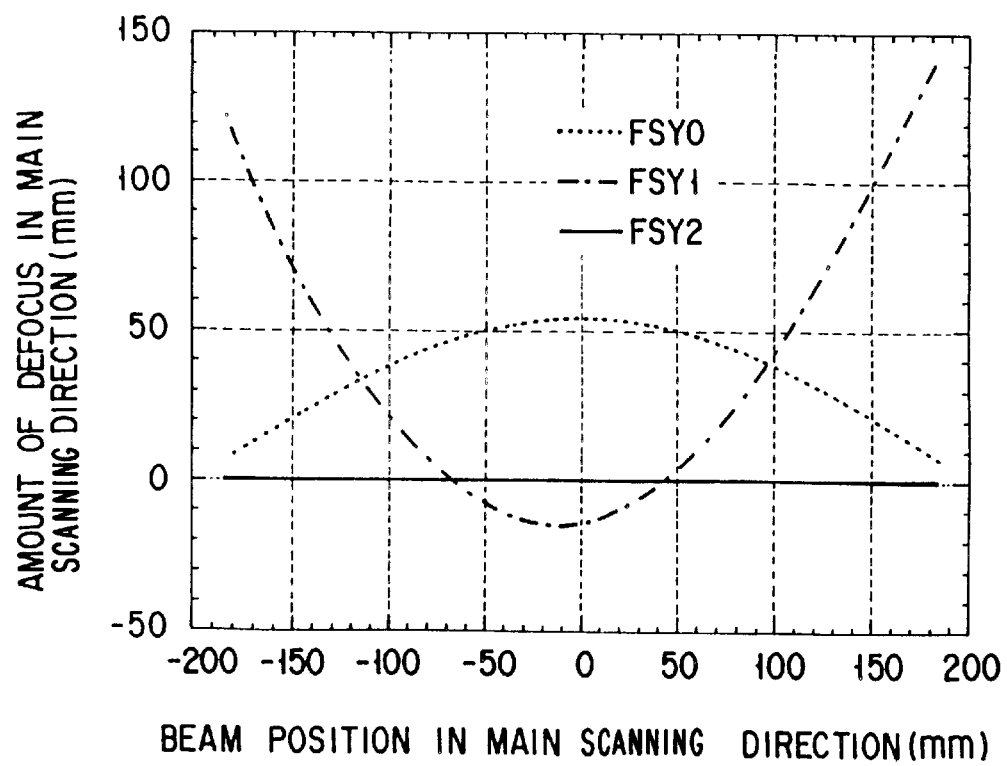
F I G. 13

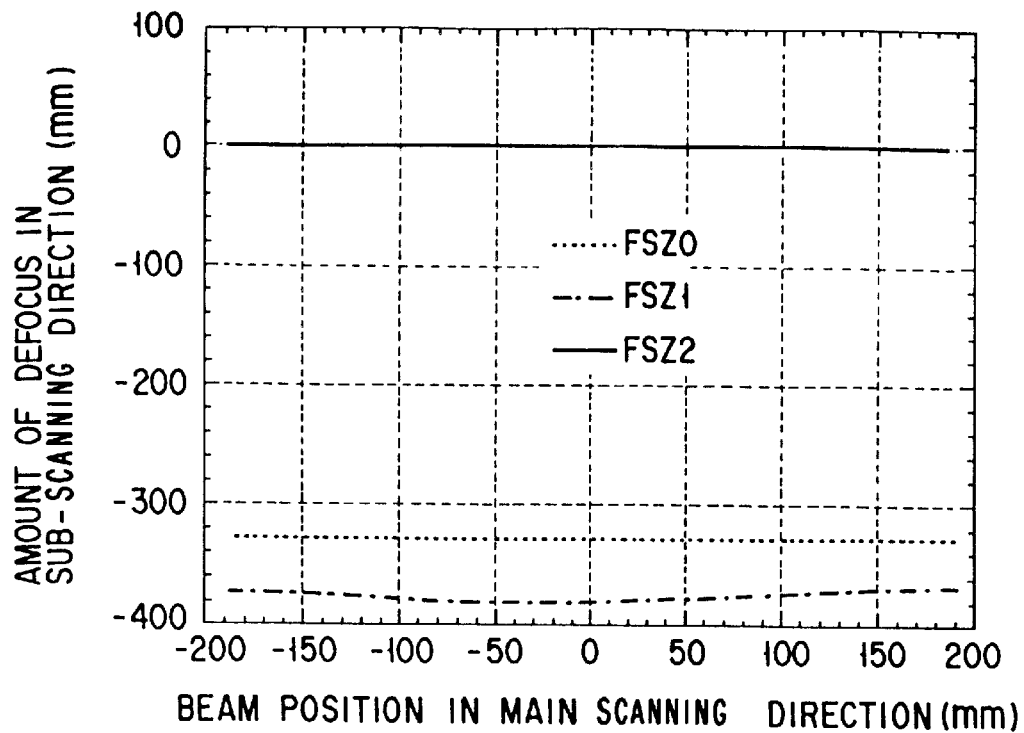
F I G. 20
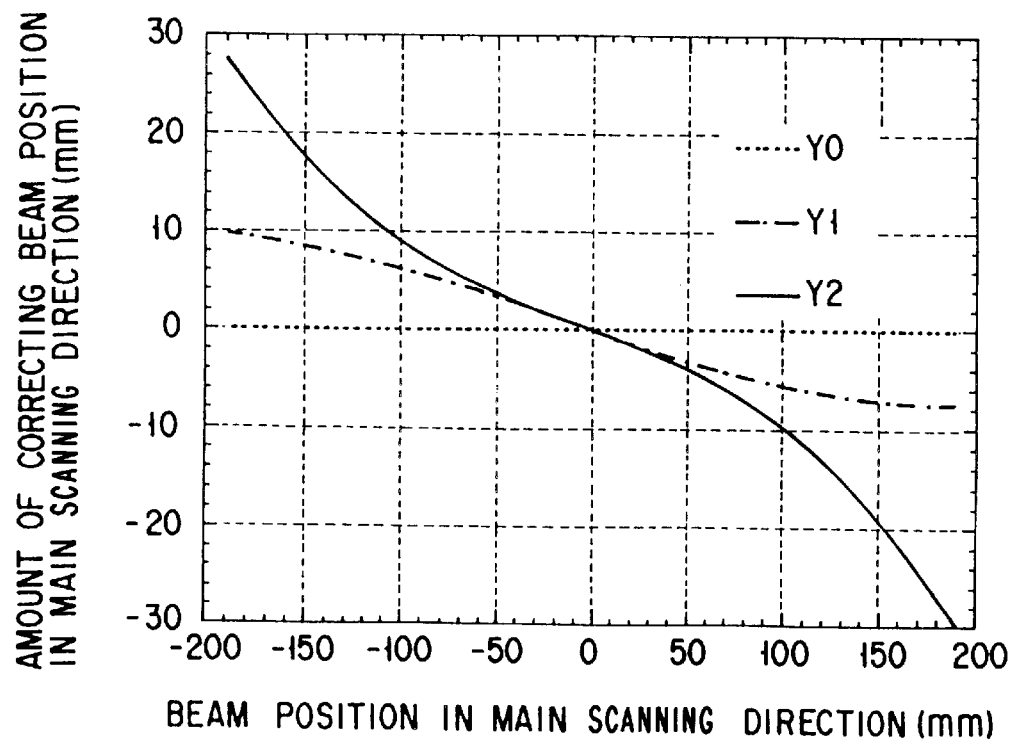
F I G. 21

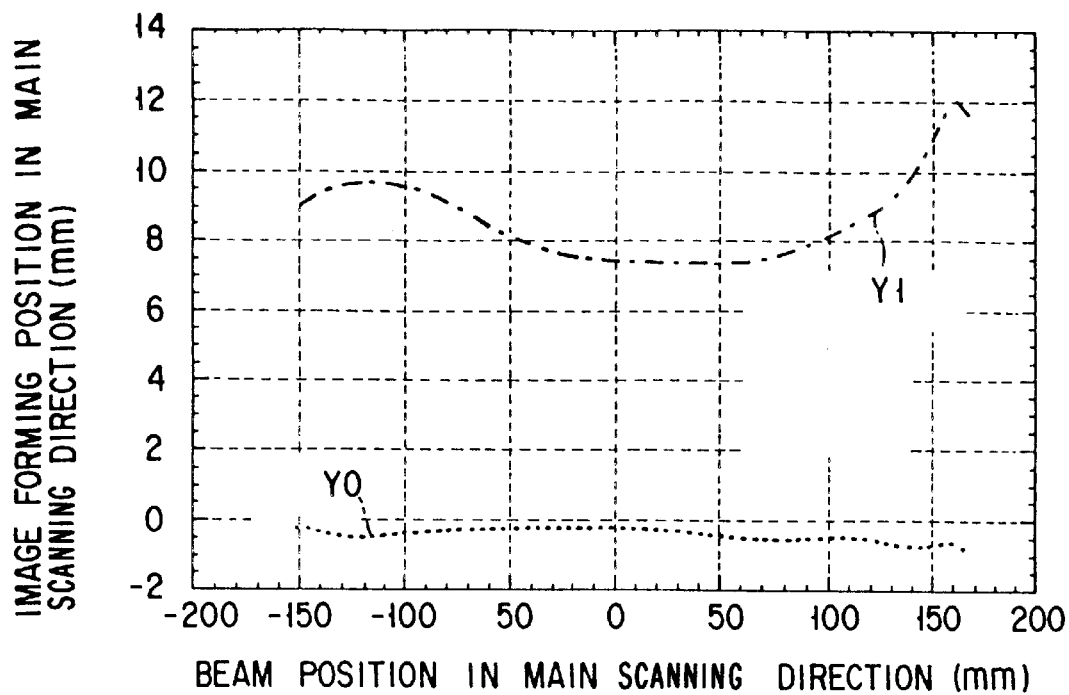
F I G. 23A
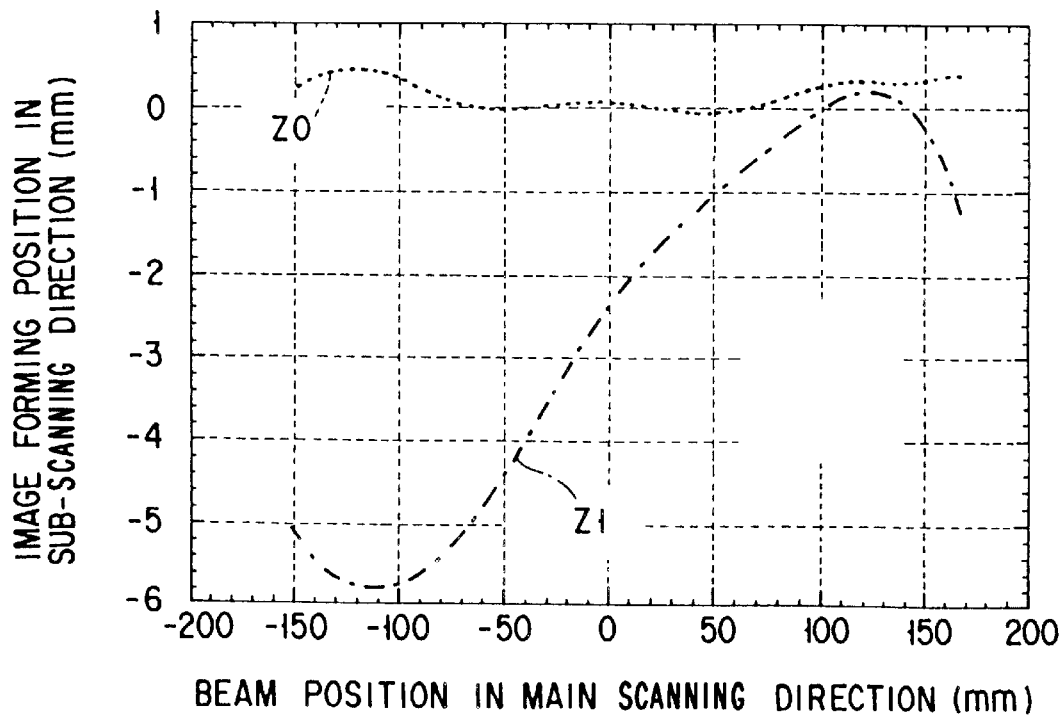
F I G. 23B

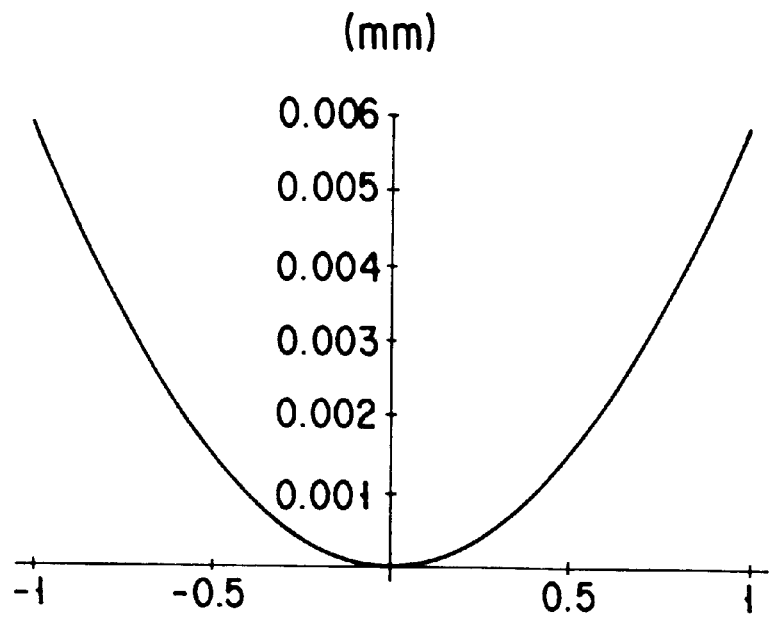
F I G. 24A
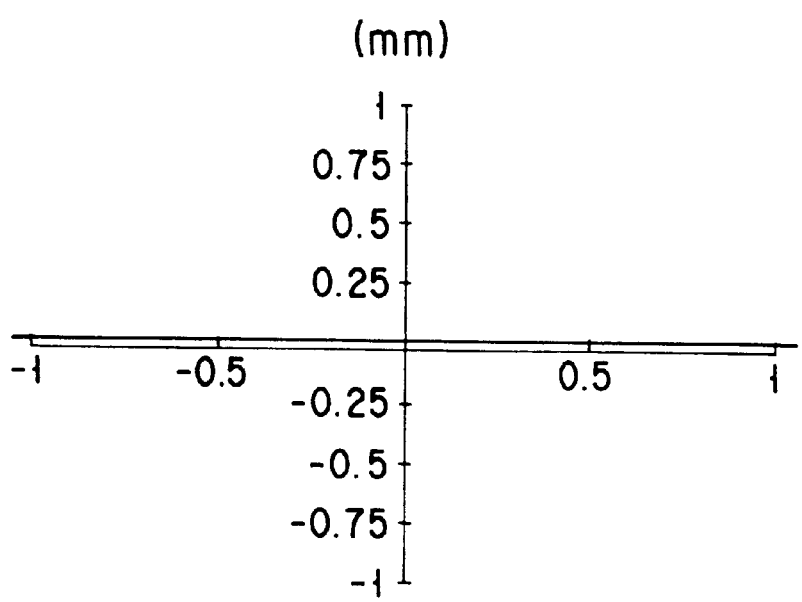
F I G. 24B

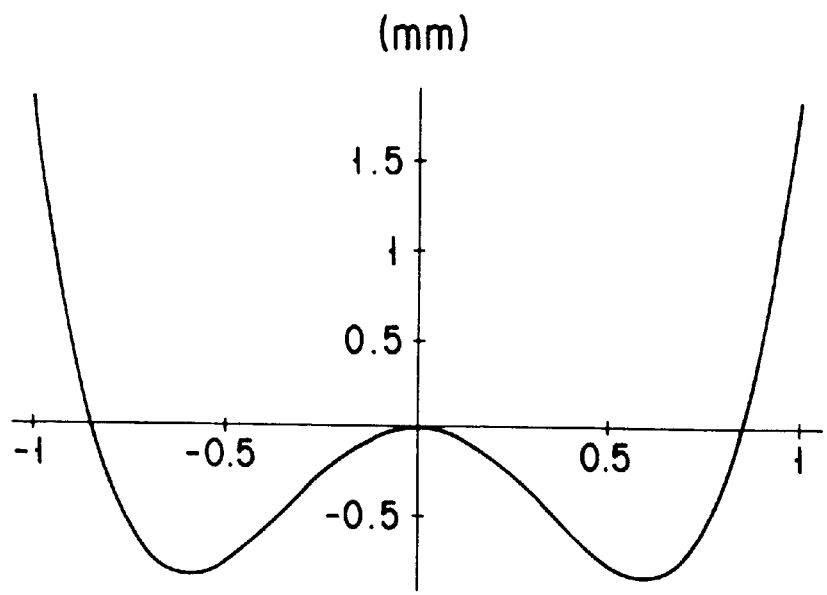
F I G. 25A
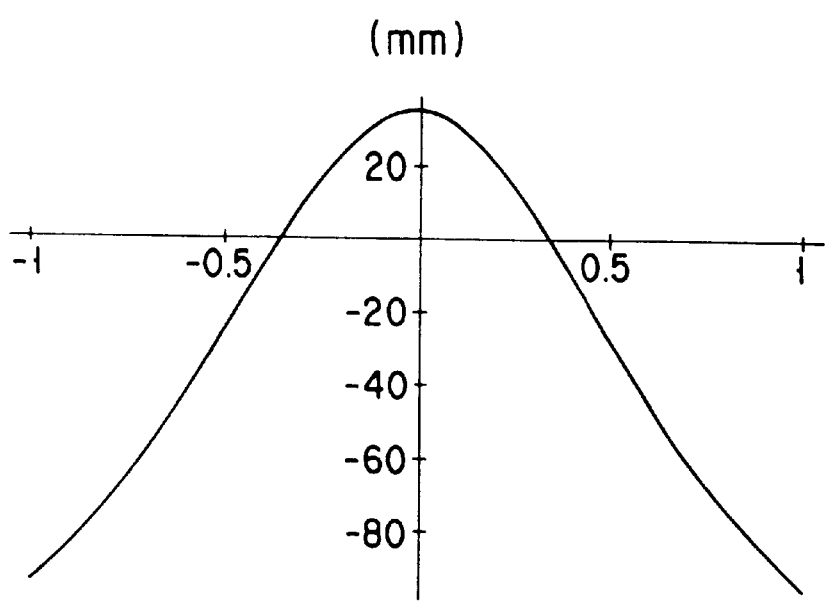
F I G. 25B

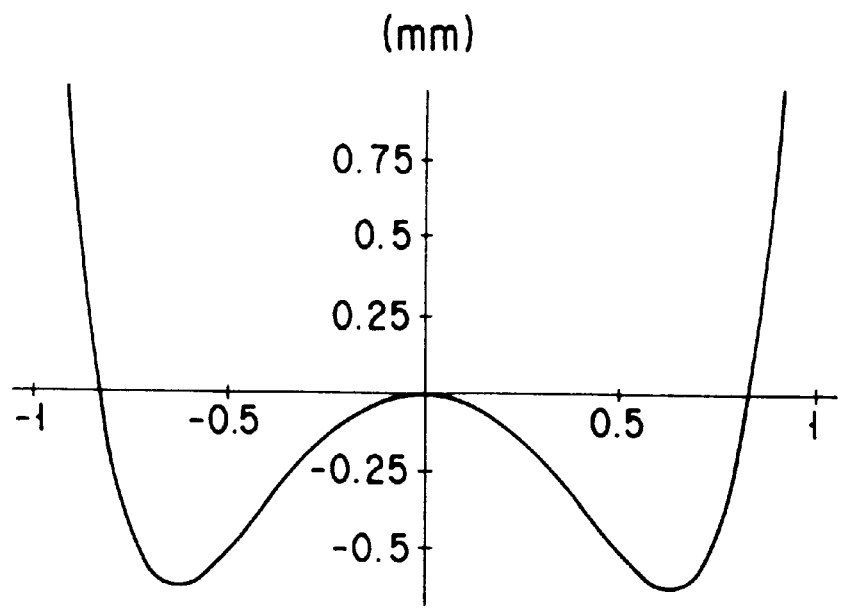
F I G. 26A
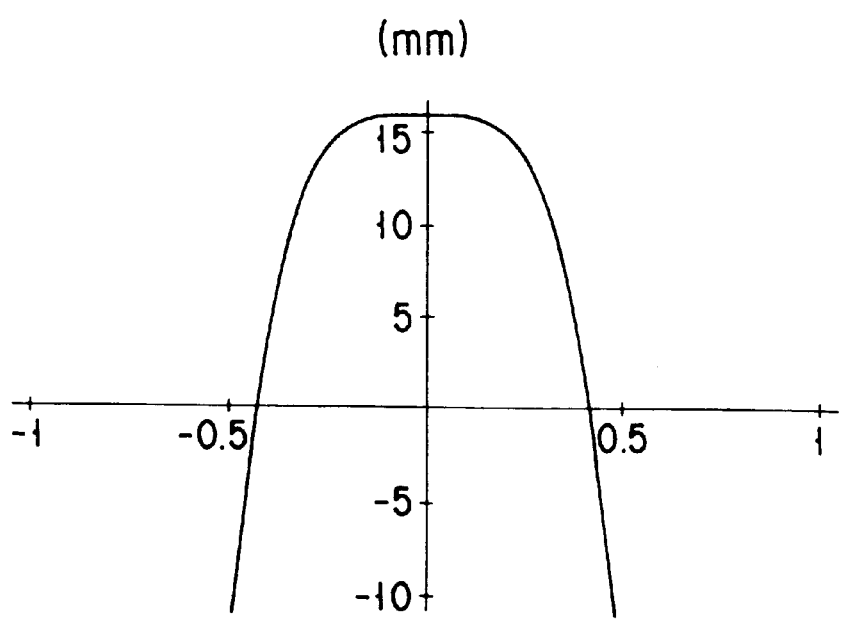
F I G. 26B

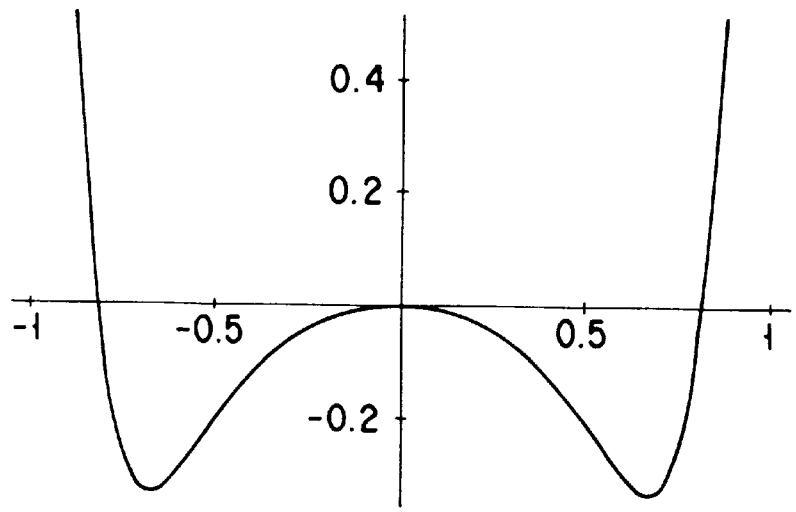
F I G. 27A
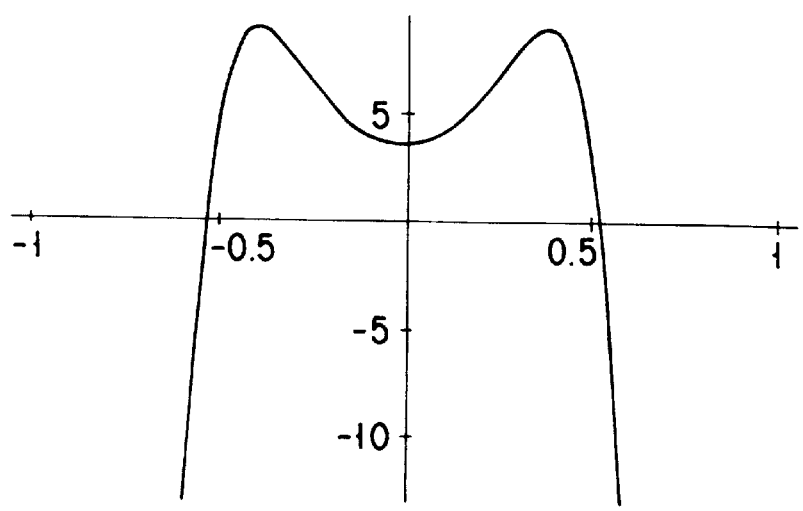
F I G. 27B

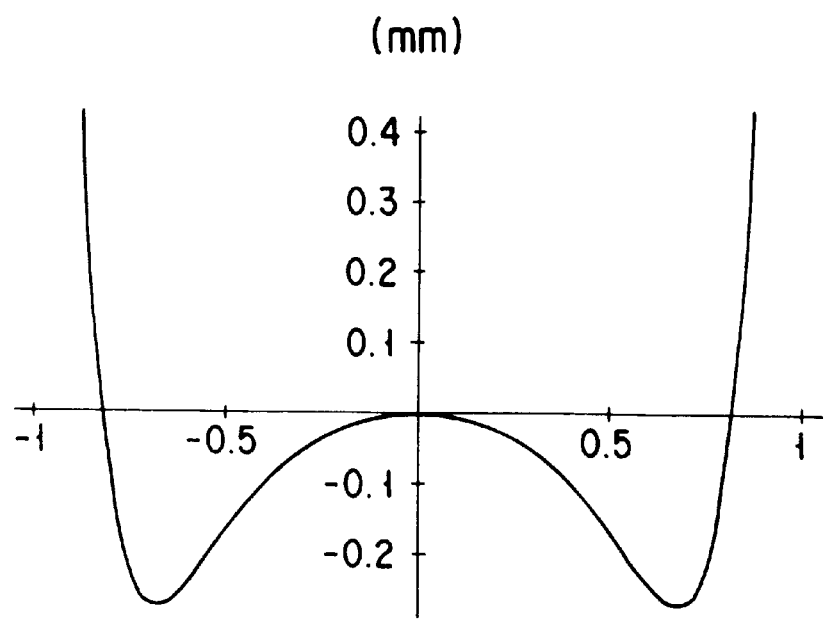
F I G. 29A
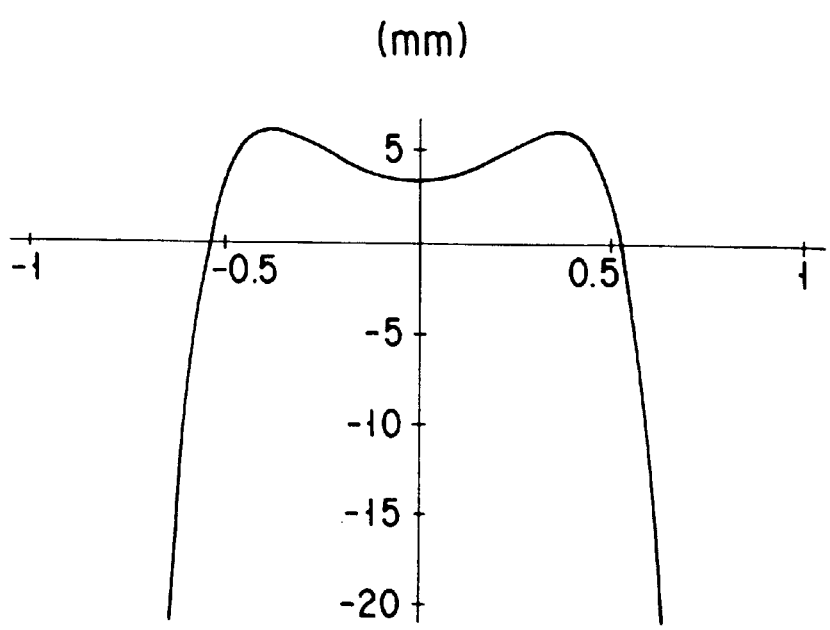
F I G. 29B

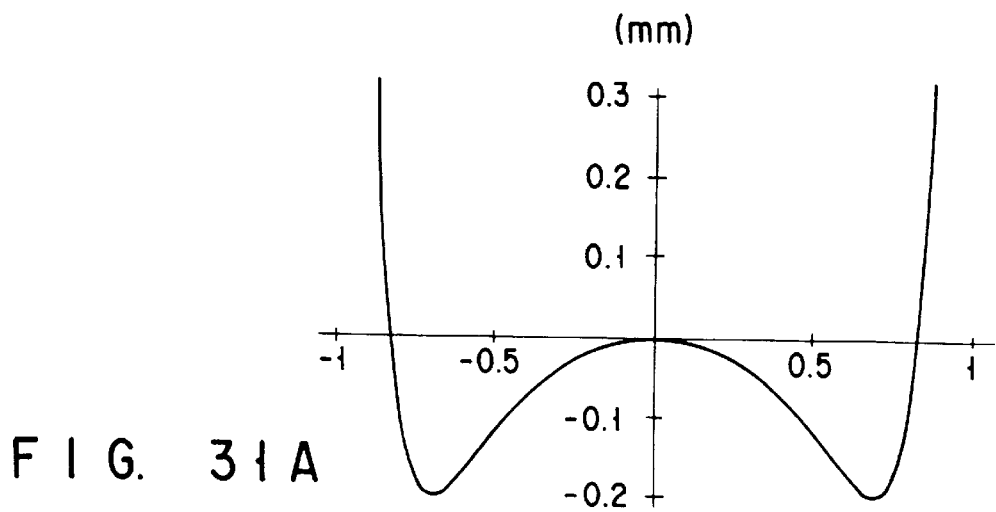
F I G. 31A
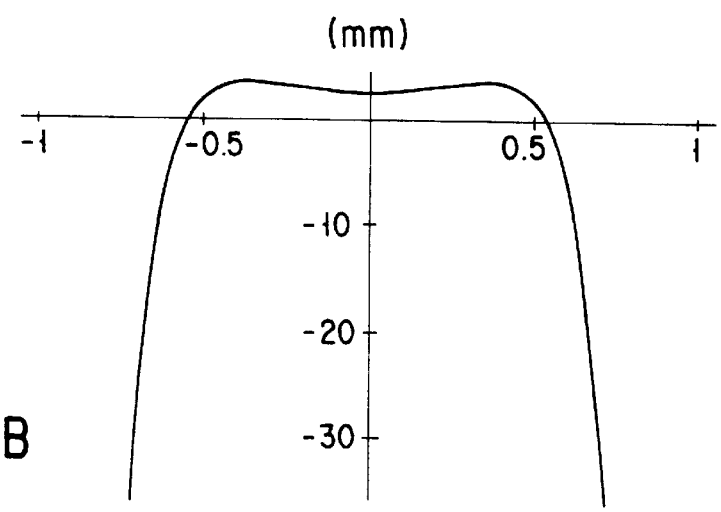
F I G. 31B
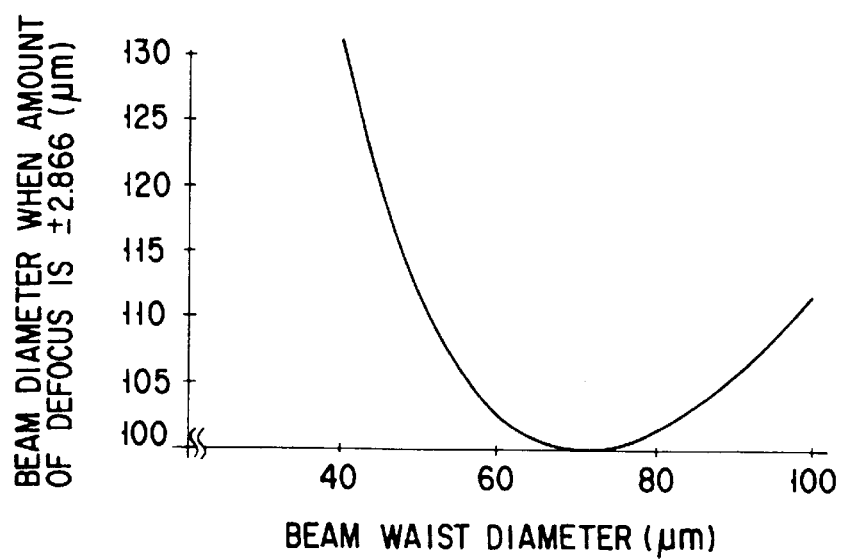
F I G. 32

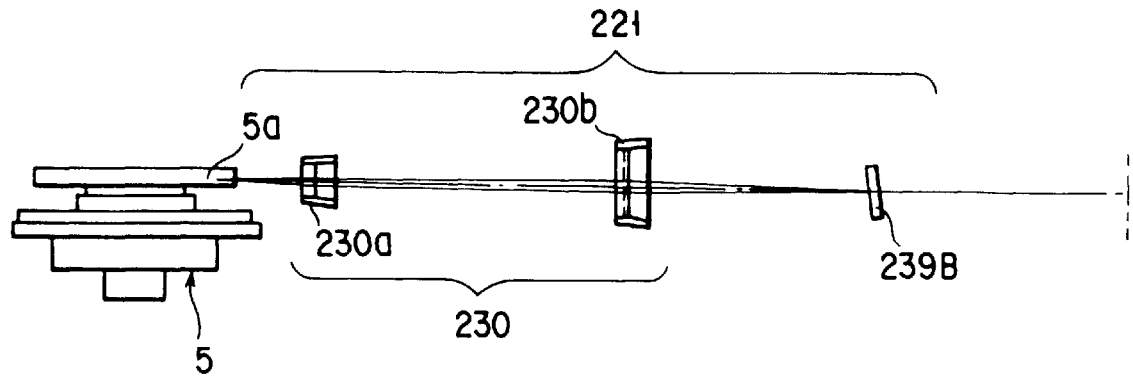
F I G. 34
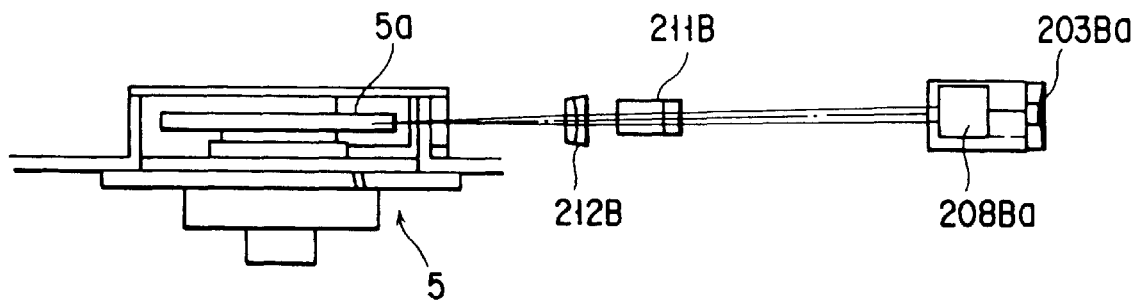
F I G. 35

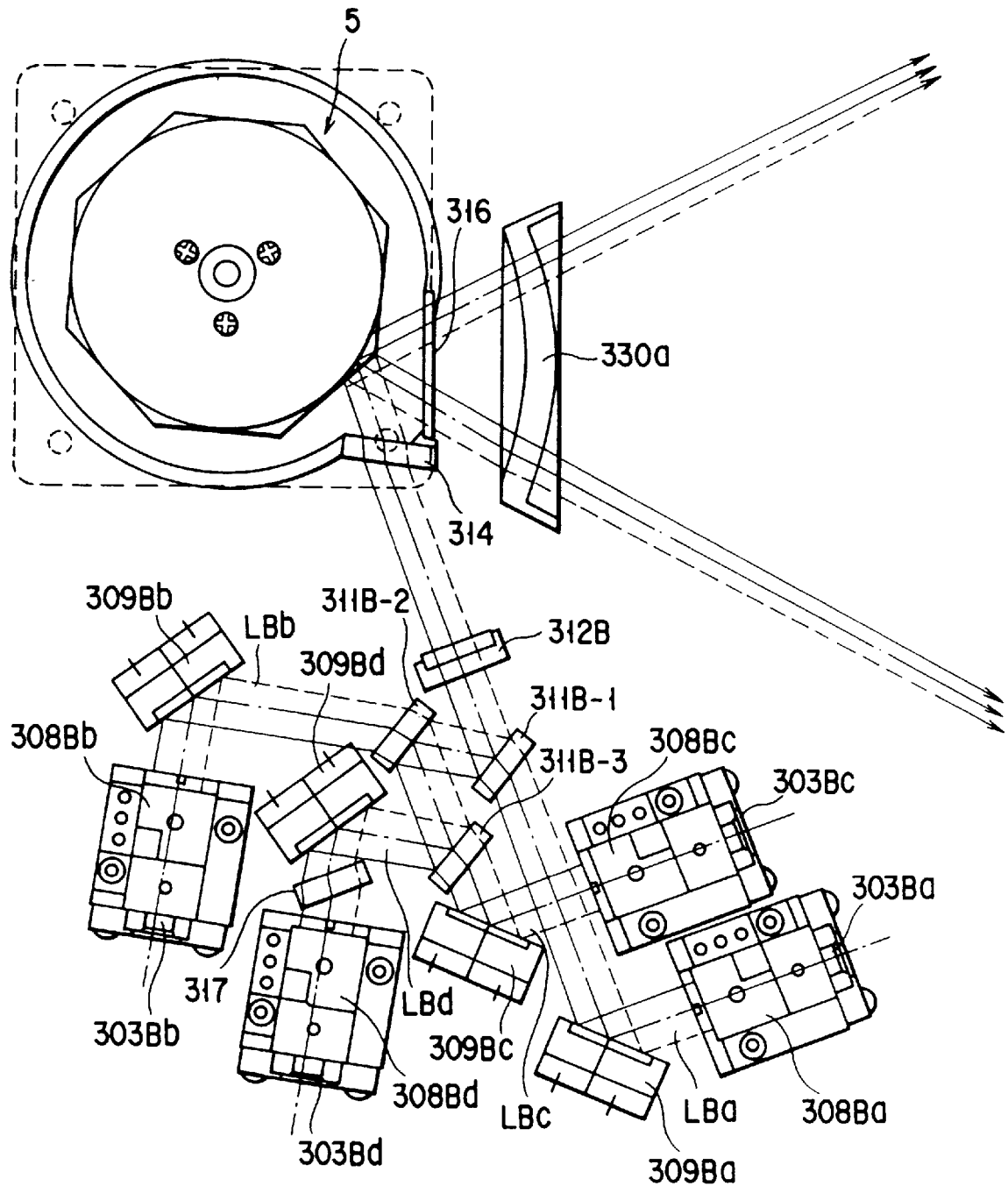
F I G. 36

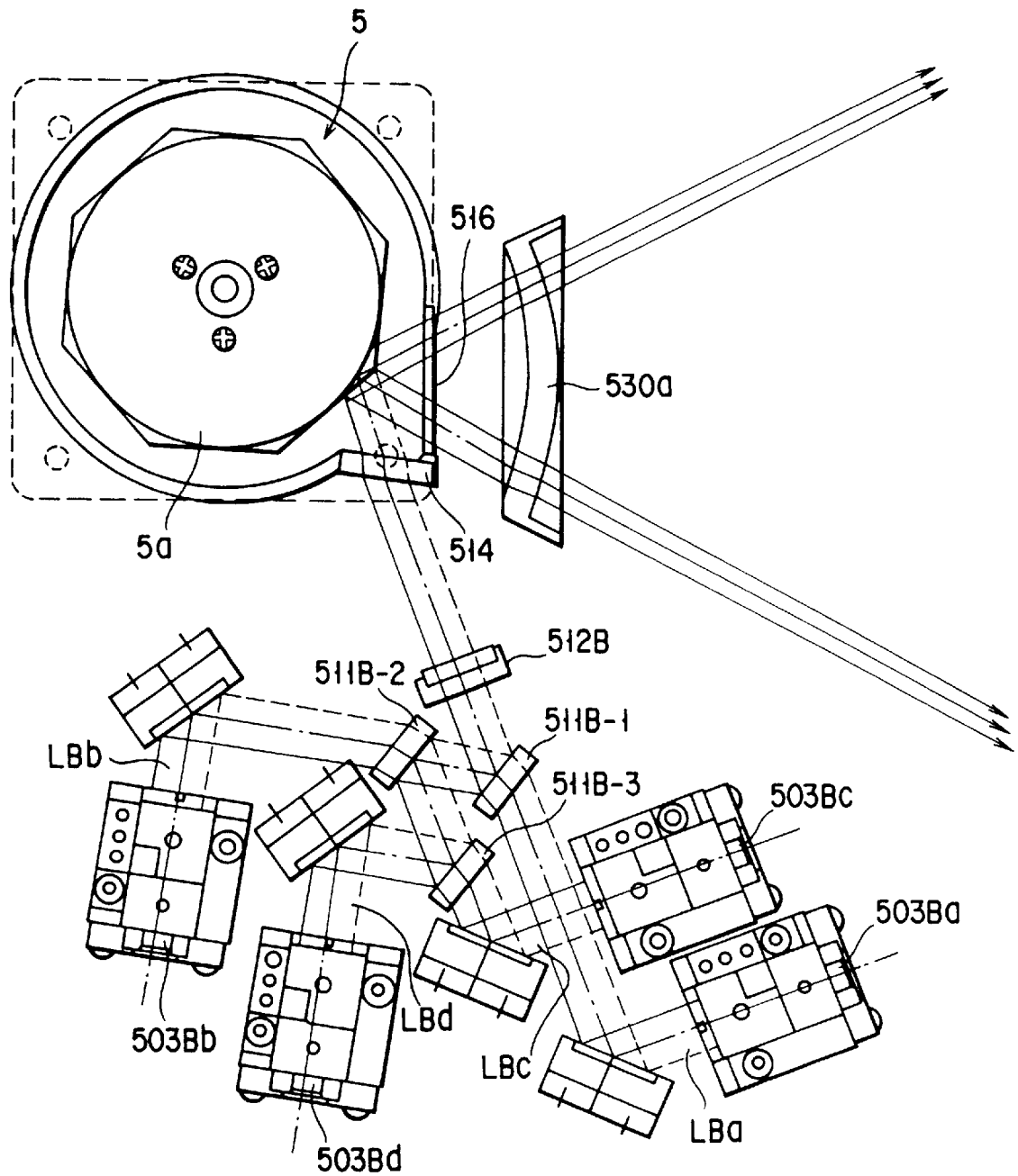
F I G. 38

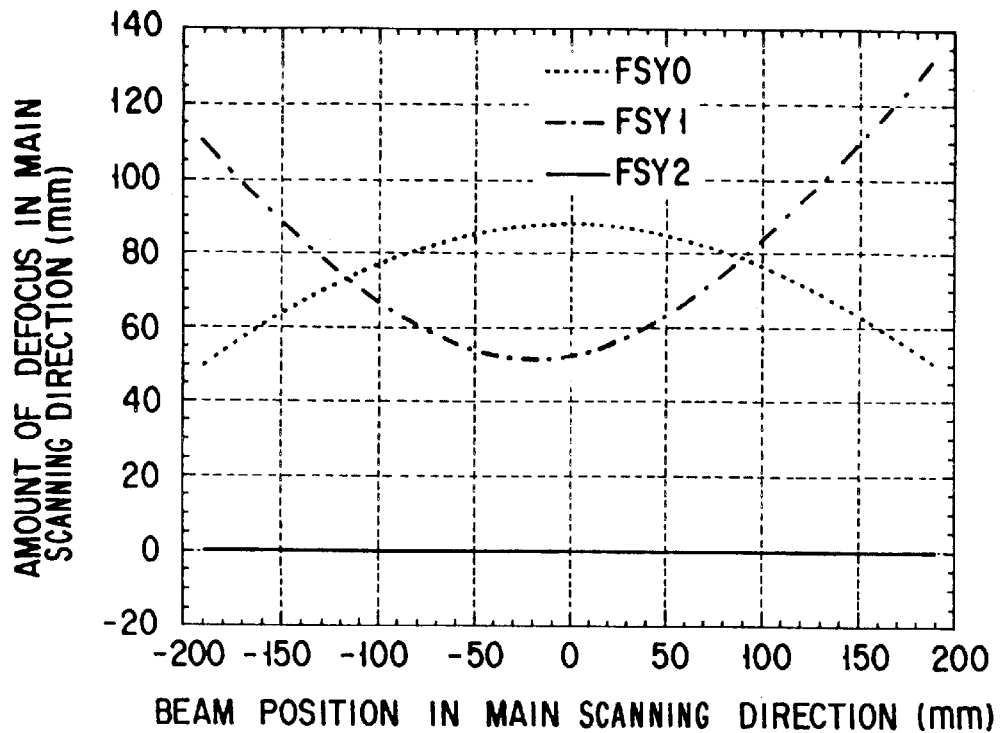
F I G. 40
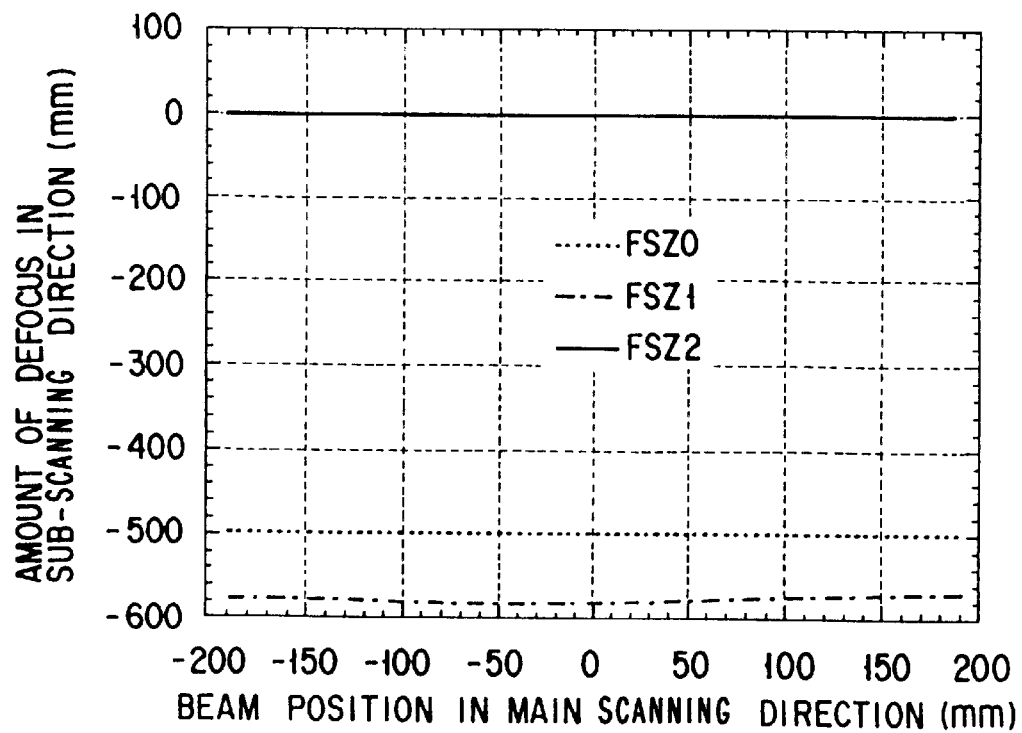
F I G. 41

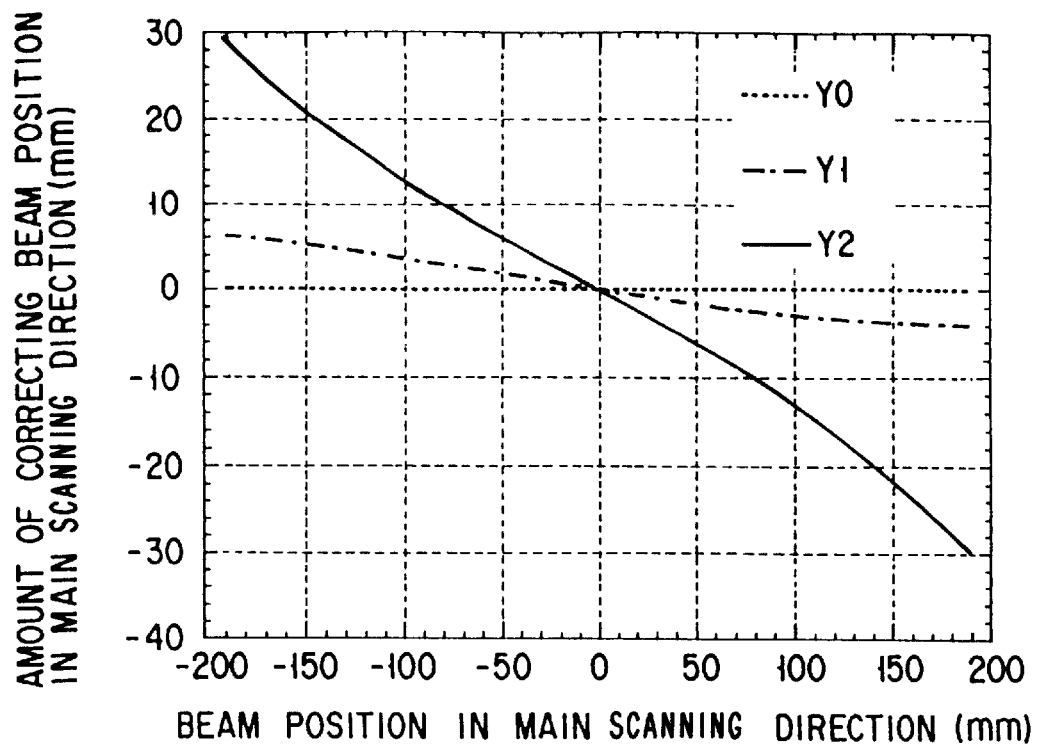
F I G. 42
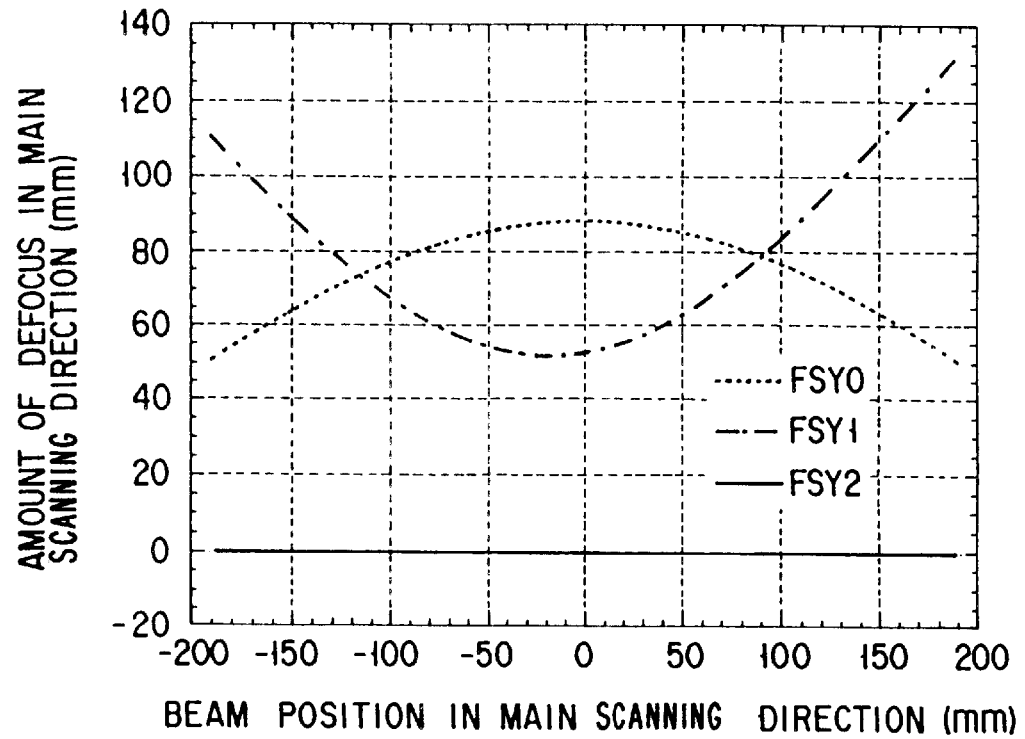
F I G. 44

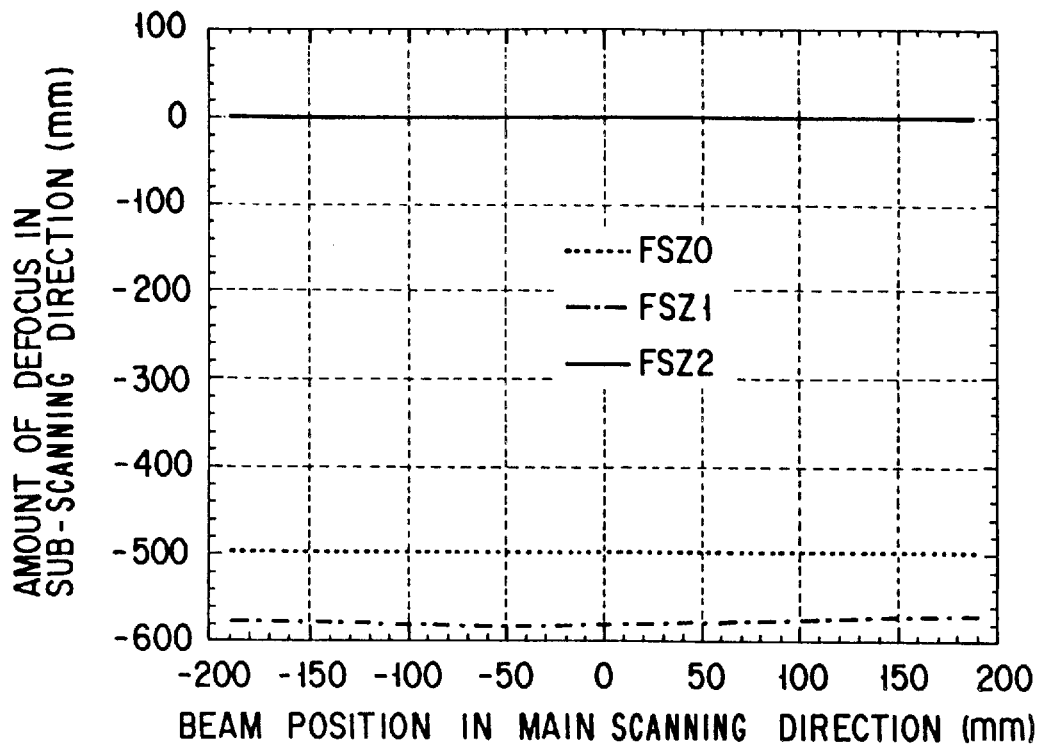
F I G. 45
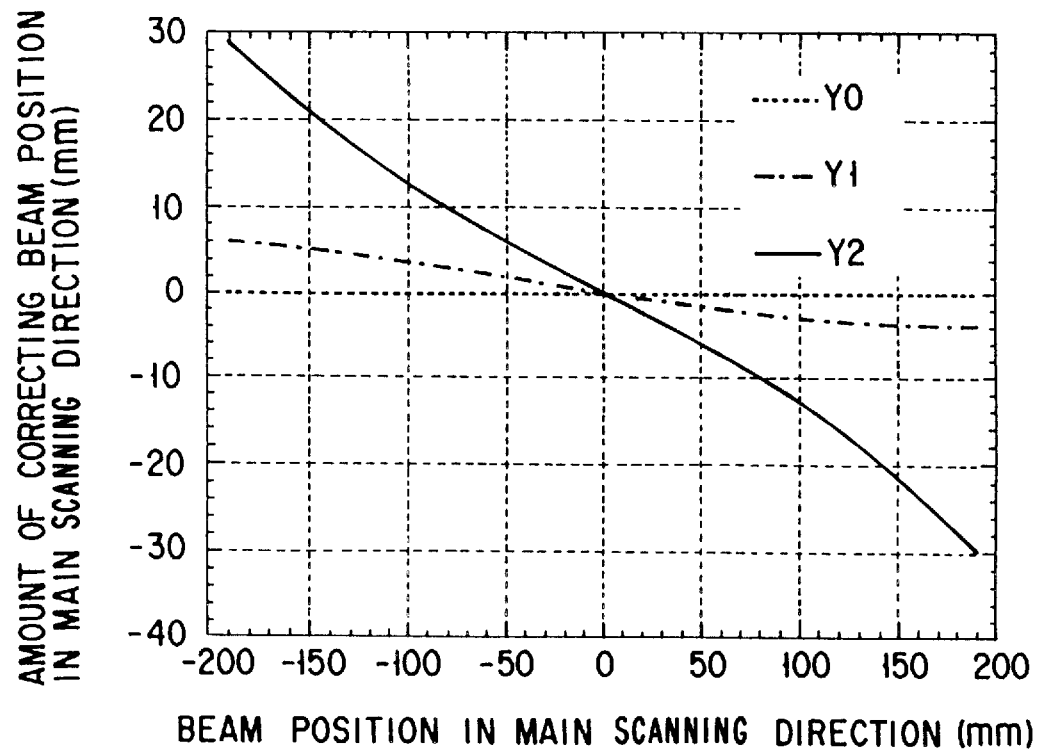
F I G. 46

MULTI-BEAM EXPOSER UNIT

BACKGROUND OF THE INVENTION

The present invention relates to a multi-beam exposer unit, which is used in a color printer device of a plurality of drums type, a color copy machine of a plurality of drums type, a multi-color printer, a multi-color copy machine, a monochromatic high-speed laser printer, a monochromatic high-speed digital copy machine, for scanning a plurality of beams.

For example, in an image forming device such as a color printer or a color copy machine, there are used a plurality of image forming units, and a laser exposer unit or an optical scanning device, which provides image data corresponding to color components, which are color-separated, that is, a plurality of laser beams to the image forming units.

The exposer unit has a first lens group, an optical deflector, and a second lens group. The first lens group reduces a cross-sectional beam diameter of a laser beam emitted from a semiconductor laser element to a predetermined size. The optical deflector is used to continuously deflect the laser beam reduced by the first lens group to a direction perpendicular to a direction where a recording medium is transferred. The second lens group is used to image-form the laser beam deflected by the optical deflector at a predetermined position of the recording medium. In many cases, a direction where the laser beam is deflected by the optical deflector is shown as a main scanning direction. Then, a direction where the recording medium is transferred, that is, a direction, which is perpendicular to the main scanning direction, is shown as a sub-scanning direction.

As this type of the exposer unit, the following examples are known:

Specifically, a plurality of optical scanning devices are arranged to correspond to the respective image forming sections in order to adjust to the image forming device to be applied. Also, a multi-beam exposer unit, which is formed to be capable of providing a plurality of laser beams.

In the following explanation, the direction of the rotational axis of the deflector is called as a sub-scanning direction. Also, the direction, which is perpendicular to the direction of the optical axis of the optical system and that of the rotational axis of the deflector, is called as a main scanning direction. In the image forming device, the sub-scanning direction of the optical system corresponds to the transfer direction of the transfer material. The main scanning direction shows the direction, which is perpendicular to the transfer direction in the surface of the transfer material. Also, in the following explanation, the image surface is a transfer material surface, and the image-formed surface is a surface where the beam is actually formed.

For example, there is an optical system comprising M sets of light sources, a pre-deflection optical system, serving as first optical means, and a post-deflection optical system serving as second optical means. The light sources emit Ni light beams, and at least one set of the light sources satisfies $Ni \geq 2$. The pre-deflection optical system includes a plurality of finite focal lenses, a half mirror, which is $$\sum_{i=1}^{M}(Ni-1)$$

first synthetic reflection mirrors, a cylinder lens, which is M sets of optical materials, and M−1 second synthetic reflection mirrors. The finite focal lenses convert light emitted from the light source to convergent light. The half mirror puts together emission light from the respective finite focal lenses as one light beam in which the emission light is substantially overlaid on each other. Then, one light beam is synthesized to be M beam groups. The half mirror reflects a predetermined percentage of incident light and transmits a predetermined percentage of incident light. To further converge the light beams, which are synthesized to be M beam groups in the sub-scanning direction, the cylinder lens is provided with positive power having an absolute value larger than in the main scanning direction. The second synthetic reflection mirrors reflect M beam groups from the cylinder lens to be substantially overlaid on each other in the first direction.

The post-deflection optical system includes a polygon mirror, serving as one deflection means, and a pair of fθ lens. The polygon mirror has reflected surfaces formed to be rotatable and to deflect light in a predetermined direction. The fθ lens image-forms $$\sum_{i=1}^{M} Ni$$

beams deflected by the polygon mirror (deflection means) on a predetermined image surface to be scanned at an equal speed, and corrects influence caused by a difference between inclinations of the respective reflection surfaces of the polygon mirror.

To make the transmitting convergent light beam incident obliquely on the half mirror, the beam transmitting through the first synthetic reflection mirror generates a variation of a focal length, a spherical aberration, a coma aberration, and astigmatism.

If the thickness of the half mirror, a refractive index, and an incident angle are t, n, and u, respectively, the amount of each of the variation of a focal length, a spherical aberration, a coma aberration, and astigmatism can be shown as follows:

Variation of focal length: $(t \times (1-1/n))$
Spherical aberration: $Bi=-t \times u^4 \times (n^2-1)/n^3$
Coma aberration: $Fi=-t \times u^3 \times (n^2-1)/n^3$
Astigmatism: $Ci=-t \times u^2 \times (n^2-1)/n^2$ In this case, the variation of the focal length can be completely canceled by increasing a length of an optical path between the finite lens and a hybrid cylinder lens by $t \times (1-1/n)$.

Regarding the spherical aberration, the distance between the finite lens and the cylinder lens, and the length of the optical path between the cylinder lens and the polygon mirror reflected point are suitably set such that the image surface can be moved to the center of the position where the peripheral light beam of each of the respective main scanning and sub-scanning directions intersects at the main light beam. Thereby, influence caused by the spherical aberration can be reduced.

Regarding astigmatism, the length of the optical path between the finite lens and the cylinder lens, and the length of the optical path between the cylinder length and the polygon mirror reflected point are suitably set, so that astigmatism can be completely canceled.

However, regarding the coma aberration, no correction method is proposed so far, and influence is exerted on a characteristic of the image-formation at the image surface.

In the optical system having no aberration, if the laser beam having a beam waist diameter of ω0 is defocused by z, the beam waist diameter of ω can be obtained by the following equation:

$$\omega=\omega_0(1+(\lambda z/(\pi\omega_0^2))^2)^{1/2} \quad (A)$$

where λ is a wavelength.

In other words, if the amount of defocus is z, the beam diameter changes from ω0 to ω. Due to the variation of the beam diameter, the thickness of the lines of the image and image density are varied.

It is assumed that fθ lens is formed of a plastic lens separately from the above structure.

In this case, if the lens is separated from the image surface to reduce the size of the optical system itself, the amount of defocus of the sub-scanning direction is varied by the change in temperature and humidity. In this case, the beam position of the main scanning direction is varied.

BRIEF SUMMARY OF THE INVENTION

An object of the present invention is to reduce the influence in coma aberration of a multi-beam exposer unit scanning a plurality of beams.

According to a first aspect of the prevent invention, there is provided a multi-beam exposer unit comprising:

M sets of light sources for emitting Ni (i=1–M) light beams wherein at least one set of the light sources satisfies i≧2;

first optical means including a plurality of finite focal lenses for converting light beams emitted from the respective light sources to convergent light, $$\sum_{i=1}^{M}(Ni-1)$$

first synthesizing reflection mirror for reflecting a predetermined rate of incident light and transmitting a predetermined rate of incident light so as to synthesize light to M groups of beams passing through the finite focal lenses, thereby combining $$\sum_{i=1}^{M}Ni$$

emission light from the respective finite focal lenses as one beam, M sets of optical members, having positive power with a large absolute value as compared with a case of a main scanning direction, for further converging the beam in a sub-scanning direction, and M−1 second synthesizing reflection mirror for reflecting M groups of beams from M sets of optical members to be substantially overlaid on each other in a first direction;

deflecting means, having reflection surfaces formed to be rotatable, for deflecting light to a predetermined direction;

second optical means having lenses for image-forming $$\sum_{i=1}^{M}Ni$$

beams on a predetermined image surface at an equal speed, and for correcting an inclination of the deflecting means; and a parallel plate provided in an optical path between the light source and the deflecting means to be inclined to a side opposite to the first synthesizing reflection mirror, seeing from the light beam transmitting through the first synthesizing reflection mirror.

According to the second aspect of the prevent invention, there is provided a multi-beam exposer unit comprising:

at least light sources and an image forming optical system, wherein an image forming position provided by the image forming optical system is placed such that a beam passing through a portion close to a main beam is defined to be a light source side than an image surface, and that a beam passing through a portion close to an outermost beam is defined to be a side away from the light source seeing from the image surface.

According to the third aspect of the prevent invention, there is provided a multi-beam exposer unit comprising:

M sets of light sources for emitting Ni (i=1–M) light beams;

first optical means including a plurality of finite focal lenses for converting light beams emitted from the respective light sources to convergent light, $$\sum_{i=1}^{M}(Ni-1)$$

first synthesizing reflection mirror for reflecting a predetermined rate of incident light and transmitting a predetermined rate of incident light so as to synthesize M groups of beams passing through the finite focal lenses, thereby combining $$\sum_{i=1}^{M}Ni$$

emission light from the respective finite focal lenses as one beam, M sets of optical members, having positive power with a large absolute value as compared with a case of a main scanning direction, for further converging the beam in a sub-scanning direction, and M−1 second synthesizing reflection mirror for reflecting M groups of beams from M sets of optical members to be substantially overlaid on each other in a first direction;

deflecting means, having reflection surfaces formed to be rotatable, for deflecting light to a predetermined direction;

second optical means having two plastic lenses for image-forming $$\sum_{i=1}^{M}Ni$$

beams on a predetermined image surface at an equal speed, and for correcting an inclination of the deflecting means, wherein the two plastic lenses include an image forming characteristic of one lens showing that each of the two lens is positioned such that a distance from a reflection point on the deflecting means is shorter than a distance from the an image surface, one plastic lens placed on the side of the deflecting means side has a function of moving an image forming position to the side of the deflecting means at a portion close to the center of the lens, and moving the image forming position of the scanning direction to a side opposite to the deflecting means at a portion close to the lens end portion.

According to the fourth aspect of the prevent invention, there is provided a multi-beam exposer unit comprising:

M sets of light sources for emitting one Ni (i=1–M) light beams;

first optical means including a plurality of finite focal lenses for converting light beams emitted from the respective light sources to convergent light, $$\sum_{i=1}^{M}(Ni-1)$$

first synthesizing reflection mirror for reflecting a predetermined rate of incident light and transmitting a predetermined rate of incident light so as to synthesize M groups of beams passing through the finite focal lenses, thereby combining $$\sum_{i=1}^{M} Ni$$

emission light from the respective finite focal lenses as one beam, M sets of optical members, having positive power with a large absolute value as compared with a case of a main scanning direction, for further converging the beam in a sub-scanning direction, and M−1 second synthesizing reflection mirror for reflecting M groups of beams from M sets of optical members to be substantially overlaid on each other in a first direction;

deflecting means, having reflection surfaces formed to be rotatable, for deflecting light to a predetermined direction;

second optical means having two plastic lenses for image-forming $$\sum_{i=1}^{M} Ni$$

beams on a predetermined image surface at an equal speed, and for correcting an inclination of the deflecting means, wherein each of the two plastic lenses is positioned to include an image forming characteristic showing that a distance from a reflection point on the deflecting means is shorter than a distance from the image surface, one plastic lens placed on the side of the deflecting means side has a function of moving an image forming position of a scanning direction and an image forming position of a perpendicular direction to the side of the deflecting means seeing from the image surface at a portion close to the center of the lens.

According to the fifth aspect of the prevent invention, there is provided a multi-beam exposer unit comprising:

M sets of light sources for emitting Ni (i=1–M) light beams;

first optical means including a plurality of finite focal lenses for converting light beams emitted from the respective light sources to convergent light, $$\sum_{i=1}^{M}(Ni-1)$$

first synthesizing reflection mirror for reflecting a predetermined rate of incident light and transmitting a predetermined rate of incident light so as to synthesize M groups of beams passing through the finite focal lenses, thereby combining $$\sum_{i=1}^{M} Ni$$

emission light from the respective finite focal lenses as one beam, M sets of optical members, having positive power with a large absolute value as compared with a case of a main scanning direction, for further converging the beam in a sub-scanning direction, and M−1 second synthesizing reflection mirror for reflecting M groups of beams from M sets of optical members to be substantially overlaid on each other in a first direction;

deflecting means, having reflection surfaces formed to be rotatable, for deflecting light to a predetermined direction;

second optical means having two plastic lenses for image-forming $$\sum_{i=1}^{M} Ni$$

beams on a predetermined image surface at an equal speed, and for correcting an inclination of the deflecting means, wherein each of the two plastic lenses is positioned to include an image forming characteristic showing that a distance from a reflection point on the deflecting means is shorter than a distance from the image surface, one plastic lens placed on the side of the deflecting means side has a function of moving a beam position of a scanning direction to an optical axis at a portion close to a lens end portion, and the other lens placed on the side of the image surface has a function of further moving the beam position of the scanning direction to the optical axis at a portion close to the lens end portion.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a graph explaining a state that a characteristic of an image formation of the laser beam is improved by the multi-beam exposer unit of FIGS. 2 and 3, that is, a graph showing the relationship between a maximum amount of flare in the main scanning direction and the position of the main scanning direction and the relationship between a maximum amount of flare in the sub-scanning direction and the position of the main scanning direction when a position of the image surface is moved by ±2 mm from a design value, in connection with laser beam LYa;

FIG. 7 is a graph explaining a state that a characteristic of an image formation of the laser beam is improved by the multi-beam exposer unit of FIGS. 2 and 3, that is, a graph showing the relationship between a maximum beam diameter in the main scanning direction and the position of the main scanning direction and the relationship between a minimum beam diameter in the main scanning direction and the position of the main scanning direction when a position of the image surface is moved by ±2 mm from a design value, in connection with laser beam LMa;

FIG. 8 is a graph explaining a state that a characteristic of an image formation of the laser beam is improved by the multi-beam exposer unit of FIGS. 2 and 3, that is, a graph showing the relationship between a maximum beam diameter in the sub-scanning direction and the position of the main scanning direction and the relationship between a minimum beam diameter in the sub-scanning direction and the position of the main scanning direction when a position of the image surface is moved by ±2 mm from a design value, in connection with laser beam LMa;

FIG. 9 is a graph explaining a state that a characteristic of an image formation of the laser beam is improved by the multi-beam exposer unit of FIGS. 2 and 3, that is, a graph showing the relationship between a maximum amount of flare in the main scanning direction and the position of the main scanning direction and the relationship between a maximum amount of flare in the sub-scanning direction and the position of the main scanning direction when a position of the image surface is moved by ±2 mm from a design value, in connection with laser beam LMa;

FIG. 10 is a graph explaining a state that a characteristic of an image formation of the laser beam is improved by the multi-beam exposer unit of FIGS. 2 and 3, that is, a graph showing the relationship between a maximum beam diameter in the main scanning direction and the position of the main scanning direction and the relationship between a minimum beam diameter in the main scanning direction and the position of the main scanning direction when a position of the image surface is moved by ±2 mm from a design value, in connection with laser beam LCa;

FIG. 11 is a graph explaining a state that a characteristic of an image formation of the laser beam is improved by the multi-beam exposer unit of FIGS. 2 and 3, that is, a graph showing the relationship between a maximum beam diameter in the sub-scanning direction and the position of the main scanning direction and the relationship between a minimum beam diameter in the sub-scanning direction and the position of the main scanning direction when a position of the image surface is moved by ±2 mm from a design value, in connection with laser beam LCa;

FIG. 12 is a graph explaining a state that a characteristic of an image formation of the laser beam is improved by the multi-beam exposer unit of FIGS. 2 and 3, that is, a graph showing the relationship between a maximum amount of flare in the main scanning direction and the position of the main scanning direction and the relationship between a maximum amount of flare in the sub-scanning direction and the position of the main scanning direction when a position of the image surface is moved by ±2 mm from a design value, in connection th laser beam LCa;

FIG. 13 is a graph showing the relationship between an amount of defocus (amount of change in the position of image-formation) of the main scanning direction and the position of the main scanning direction in a state that the image forming lens is detached in connection with the laser beams LY in the multi-beam exposer unit of FIGS. 2 and 3 (LYa and LYb are arrayed with a predetermined distance in a predetermined sub-scanning direction);

FIG. 20 is a graph showing the relationship between an a amount of defocus of the sub-scanning direction and the position of the main scanning direction in a state that the image forming lens is detached in connection with the laser beams LC in the multi-beam exposer unit of FIGS. 2 and 3;

FIG. 21 is a graph showing the relationship between an amount of a beam position correction, which includes a difference between an actual position of the image forming in the main scanning direction and a logical position of the image formation, and the position of the main scanning direction in connection with the laser beams LC from the multi-beam exposer unit of FIGS. 2 and 3;

FIGS. 23A and 23B are graphs each showing that the image-forming position close to the main ray and the image-forming position close to the outermost ray in a state that first and second finite focal lenses of the multi-beam exposer unit of FIG. 22 are estimated based on a spherical aberration of Table 3 so that the position of the image surface (surface of the photosensitive drum) is set to 0;

FIGS. 24A and 24B are graphs each showing a form of a wave-surface aberration and a corresponding amount of defocus when the spherical aberration is optimized to minimize the maximum beam diameter within the amount of defocus of ±2.9 mm to the second degree;

FIGS. 25A and 25B are graphs each showing a form of a wave-surface aberration and a corresponding amount of defocus when the spherical aberration is optimized to minimize the maximum beam diameter within the amount of defocus of ±2.9 mm to the fourth degree;

FIGS. 26A and 26B are graphs each showing a form of a wave-surface aberration and a corresponding amount of defocus when the spherical aberration is optimized to minimize the maximum beam diameter within the amount of defocus of ±2.9 mm to the sixth degree;

FIGS. 27A and 27B are graphs each showing a form of a wave-surface aberration and a corresponding amount of defocus when the spherical aberration is optimized to minimize the maximum beam diameter within the amount of defocus of ±2.9 mm to the eighth degree;

FIGS. 29A and 29B are graphs each showing a form of a wave-surface aberration and a corresponding amount of defocus when the spherical aberration is optimized to minimize the maximum beam diameter within the amount of defocus of ±2.9 to the twelfth degree;

FIGS. 31 and 31B are graphs each showing a form of a wave-surface aberration and a corresponding amount of defocus when the spherical aberration is optimized to minimize the maximum beam diameter within the amount of defocus of ±2.9 mm to the sixteenth degree;

FIGS. 32 is a graph showing a maximum beam diameter in a predetermined defocus at the time of each beam waist in a case where the first and second finite focal lenses of the multi-beam exposer unit of FIG. 22 are not estimated based on the spherical aberration;

FIG. 34 is a schematic cross-sectional view of the post-deflection optical system of the multi-beam exposer unit of FIG. 33;

FIG. 35 is a schematic cross-sectional view of the pre-deflection optical system of the multi-beam exposer unit of FIG. 33;

FIG. 36 is a schematic plain view showing a second modification of the pre-deflection optical system of the optical scanning device of FIGS. 2 and 3;

FIG. 38 is a schematic plain view showing a second modification of the pre-deflection optical system of the optical scanning device of FIGS. 2 and 3;

FIG. 40 is a graph showing the relationship between an amount of defocus of the main scanning direction and the position of the main scanning direction in a state that the image-forming lens is detached in connection with the laser beams LM in the multi-beam exposer unit in which the post-deflection optical system described by use of Tables 4 and 5 is combined with the multi-beam exposer unit of FIGS. 2 and 3;

FIG. 41 is a graph showing the relationship between an amount of defocus of the sub-scanning direction and the position of the main scanning direction in a state that the image-forming lens is detached in connection with the laser beams LM in the multi-beam exposer unit in which the post-deflection optical system described by use of Tables 4 and 5 is combined with the multi-beam exposer unit of FIGS. 2 and 3;

FIG. 42 is a graph showing the relationship between an amount of a beam position correction, which includes a difference between an actual position of the image forming in the main scanning direction and a logical position of the image formation, and the position of the main scanning direction in connection with the laser beams LM in which the post-deflection optical system described by use of Tables 4 and 5 is combined with the multi-beam exposer unit of FIGS. 2 and 3;

FIG. 44 is a graph showing the relationship between an amount of defocus of the main scanning direction and the position of the main scanning direction in a state that the image-forming lens is detached in connection with the laser beam LM in the multi-beam exposer unit in which the post-deflection optical system described by use of Tables 6 and 7 is combined with the multi-beam exposer unit of FIGS. 2 and 3;

FIG. 45 is a graph showing the relationship between an amount of defocus of the sub-scanning direction and the position of the main scanning direction in a state that the image-forming lens is detached in connection with the laser beam LM in the multi-beam exposer unit in which the post-deflection optical system described by use of Tables 6 and 7 is combined with the multi-beam exposer unit of FIGS. 2 and 3; and FIG. 46 is a graph showing the relationship between an amount of a beam position correction, which includes a difference between an actual position of the image forming in the main scanning direction and a logical position of the image formation, and the position of the main scanning direction in connection with the laser beam LM in which the post-deflection optical system described by use of Tables 6 and 7 is combined with the multi-beam exposer unit of FIGS. 2 and 3.

DETAILED DESCRIPTION OF PREFERRED EMBODIMENTS

Embodiments of the present invention will be described with reference to the drawings.

Figure 1:
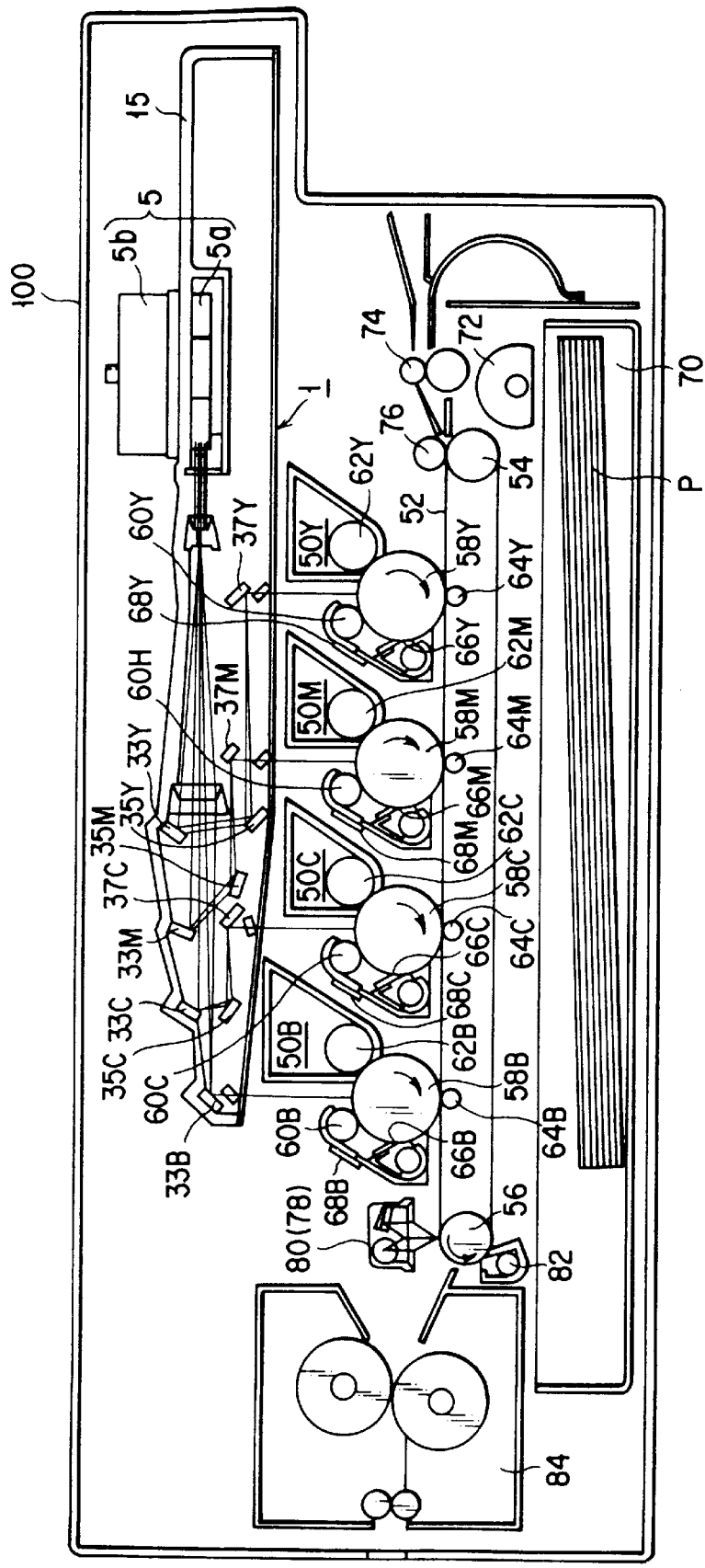
FIG. 1 a schematic cross-sectional view of an image forming device in which a multi-beam exposer unit is used according to an embodiment of the present invention.

FIG. 1 shows a color image forming apparatus in which a multi-beam exposer unit of the embodiment of the present invention is used. In this kind of color image forming apparatus, four kinds of image data are used, which are color-separated into color components, Y (Yellow), M (Magenta), C (Cyan), and B (Black), and four sets of various devices for forming an image corresponding to each of the color components. In the following explanation, marks Y, M, C, and B are added to the respective reference numerals to differentiate between the image data of each color component and the corresponding device.

As shown in FIG. 1, an image forming device 100 has first to fourth image forming units 50Y, 50m, 50C, and 50B for forming an image of each of components, which are color-separated into Y (Yellow), M (Magenta), C (Cyan), and B (Black).

The respective image forming units 50 (Y, M, C, B) are provided under a laser exposer unit 1 in series in order of 50Y, 50M, 50C, and 50B so as to correspond to the position where the laser beams LY, LM, LC, and LB corresponding to the respective color components are emitted through the respective mirrors 37B, 37Y, 37M, and 37C.

A transfer belt 52 is stretched onto a belt drive roller 56, which is rotated in a direction of an arrow, and a tension roller 54. The transfer belt 52 is rotated in a direction where the belt drive roller 56 is driven at a predetermined speed.

The respective image forming units 50Y, 50M, 50C, and 50B include photosensitive drums 58Y, 58M, 58C, and 58B.

Each of the photosensitive drums is cylindrically shaped to be rotatable in a direction of an arrow, and forms an electrostatic latent image corresponding to the image exposed by the exposer unit 1.

There are arranged charge units 60 (Y, M, C, B), developing units 62 (Y, M, C, B), transfer units 64 (Y, M, C, B), cleaner 66 (Y, M, C, B), and units 68 (Y, M, C, B) around the photosensitive drums 58 (Y, M, C, B) in order along the direction where the photosensitive drums 58 (Y, M, C, B) are rotated.

Each of the charge units 60 provides a predetermined voltage onto the surface of each of the respective photosensitive drums 58 (Y, M, C, B).

Each of the developing units 62 develops the characteristic latent image on the surface of each of the photosensitive drums 58 (Y, M, C, B) with toner to which the corresponding color is provided.

Each of the transfer units 64 transfers a toner image, which is formed on each of the photosensitive drums 58, to a recording medium, which is transferred through the transfer belt 52, in a state that the transfer belt 52 is provided between each photosensitive drum 58 and each transfer unit 64 so that it is opposite to each photosensitive drum 58.

Each of the cleaners 66 removes the residual toner, which is left on each of the photosensitive drums 58 after each toner image is transferred through each of the transfer units 64.

Each of the discharge units 68 removes the residual voltage, which is left on each of the photosensitive drums after each toner image is transferred through each of the transfer units 64.

Irradiation of the laser beams LY, LM, LC, and LB, which are respectively guided to the photosensitive drums 58 through the respective mirrors 37Y, 37M, 37C, and 33B, is provided between each of the charge units 60 (Y, M, C, B) and each of the developing units 62 (Y, M, C, B).

A paper cassette 70 is provided under the transfer belt 62 to contain the recording medium for transferring the image formed by each of the image forming units 50 (Y, M, C, B), that is, paper P.

A feeding roller 72 having a semicircular cross section is provided at the position, which is one end portion of the paper cassette 70 and a portion close to the tension roller 54, so as to pick up paper P contained in the paper cassette 70 one by one from the uppermost section.

A resist roller 74 is provided between the feeding roller 72 and the tension roller 54. The resist roller 74 is used to conform to the top end of one paper P, which is picked up from the cassette 70, to the top end of each toner image formed on the respective image forming units 50, particularly the toner image formed on the photosensitive drum 58 by the image forming unit 50B.

An absorption roller 76 is provided at a portion between the resist roller 74 and the first image forming unit 50Y, that is, a portion close to the tension roller 54, substantially on an outer periphery of the tension roller 54. The absorption roller 76 provides a predetermined electrostatic absorption onto one paper P transferred at a predetermined timing by the resist roller 72.

Resist sensors 78 and 80 are provided at a portion which is an end portion of the transfer belt 52, and close to the belt drive roller 56, substantially on an outer periphery of the belt drive roller 56 to have a predetermined distance in an axial direction of the belt drive roller 56. The resist sensors 78 and 80 detect the position of the image formed on the transfer belt 52 (FIG. 1 is the front cross-sectional view showing only the back sensor 80).

A transfer belt cleaner 82 is provided on the transfer belt 52 corresponding to the outer periphery of the belt drive roller 56. The transfer belt cleaner 82 removes toner adhered onto the transfer belt 52 or paper dust from paper P.

A fixing unit 84 is provided in a direction where paper P transferred through the transfer belt 52 is detached from the belt drive roller 56 and further transferred. The fixing unit 84 is used to fix the toner image, which is transferred onto paper P, to paper P.

Figure 2:
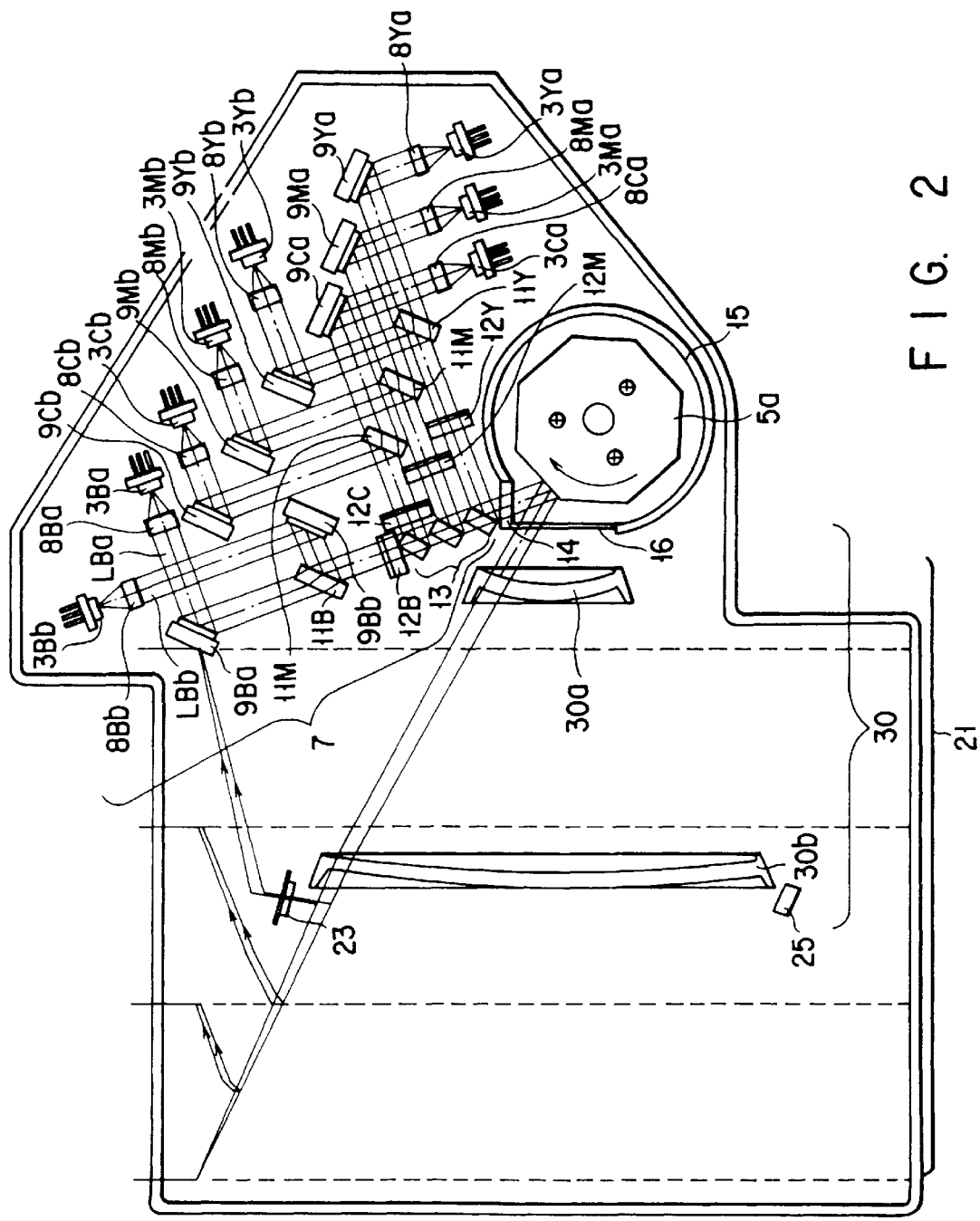
FIG. 2 is a schematic plain view of a multi-beam exposer unit, which is incorporated into the image forming device of FIG. 1, according to an embodiment of the present invention.
Figure 3:
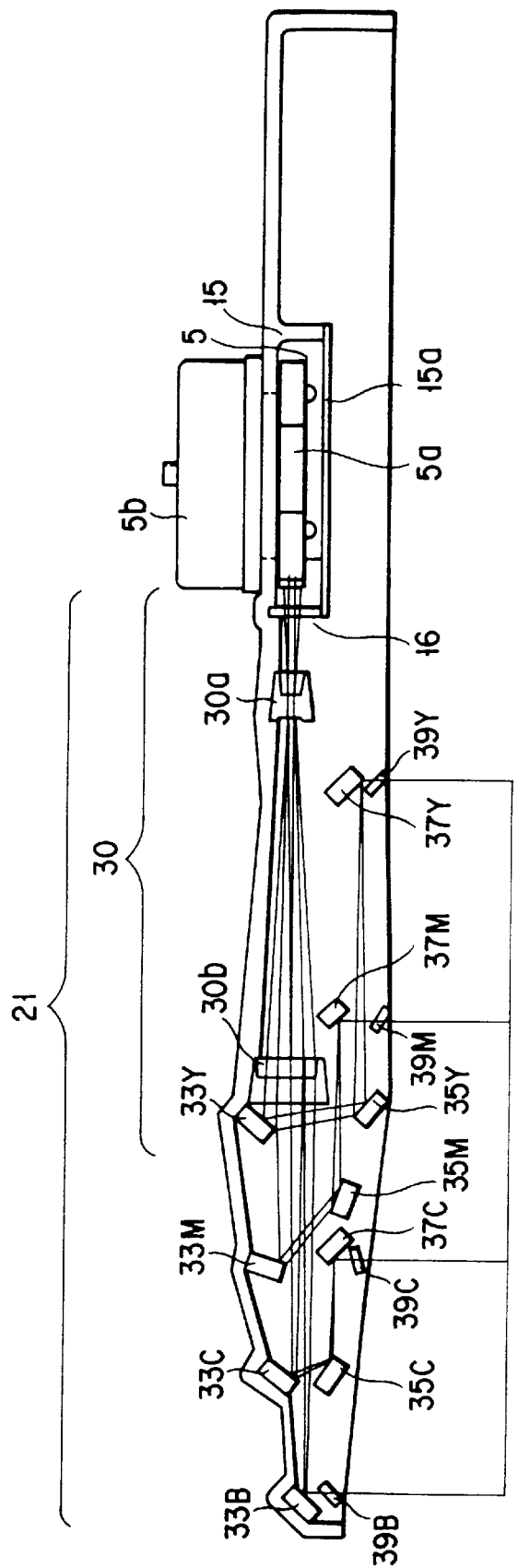
FIG. 3 is a schematic cross-sectional view showing that a laser beam deflected by an optical deflector is image-formed at a minimum distance in the optical scanning device of FIG. 2.

FIGS. 2 and 3 show the multi-beam exposer unit, which is used in the image forming apparatus of FIG. 1. In the color image forming apparatus of FIG. 1, used four kinds of image data are used, which are color-separated into color components, Y (Yellow), M (Magenta), C (Cyan), and B (Black), and four sets of various devices for forming an image corresponding to each of the color components. In the following explanation, marks Y, M, C, and B are added to the respective reference numerals to make discrimination between image data of each color component and the corresponding device.

As shown in FIGS. 2 and 3, the multi-beam exposer apparatus 1 has only one polygon mirror unit 5 as deflecting means for deflecting the laser beams. The polygon mirror unit 5 deflects each of the laser beams emitted from each of the laser elements, serving as a light source, to a predetermined position of each of the image surfaces, that is, each of the photosensitive drums 58 (Y, M, C, B) of the first to fourth image forming sections 50 (Y, M, C, B) at a predetermined linear speed. In this case, a direction where the laser beam is deflected by each of the reflection surfaces of the polygon mirror unit 5 is hereinafter called the main scanning direction. Moreover, a direction, which is perpendicular to the main scanning direction and which is parallel to each reflection surface of a polygon mirror body 5*a*, is called the sub-scanning direction.

The polygon mirror unit 5 has the polygon mirror body 5*a* in which eight-face plane reflectors (surfaces) are arranged in a shape of a regular polygon, and a motor 5*b*, which rotates the polygon mirror body 5*a* to the main scanning direction at a predetermined speed.

The polygon mirror body 5*a* may be formed of, for example, aluminum. Each of the reflection surfaces of the polygon mirror body 5*a* is cut along the surface including a direction where the polygon mirror body 5*a* is rotated, that is, the surface perpendicular to the main scanning direction. In other words, after the surface is cut along the sub-scanning direction, and a surface protection layer such as silicon oxide ($SiO_2$) is deposited on the cut surface.

A post-deflection optical system 21 is provided between the polygon mirror unit 5 and the image surface in order to provide a predetermined optical characteristic to each of the laser beams L (Y, M, C, B) deflected to a predetermined direction by each of the reflected surfaces of the polygon mirror unit 5.

In order to adjust the horizontal synchronization of the respective laser beams L (Y, M, C, and B) deflected by the polygon mirror unit 5, the post-deflection optical system 21 comprises a horizontal synchronization detector 23, a mirror 25 for horizontal synchronization, an image forming lens 30 including first and second image forming lenses 30*a* and 30*b*, a plurality of mirrors 33Y (first yellow), 35Y (second yellow), 37Y (third yellow), 33M (first magenta), 35M (second magenta), 37M (third magenta), 33C (first cyan), 35C (second cyan), 37C (third cyan), and 33B (for black), and dust prevention glasses 39 (Y, M, C, M).

The horizontal synchronization detector 23 detects each laser beam L. The mirror 25 is used to reflect each laser beam L toward the detector 23. The image forming lens 30 is used to optimize the shape and position of a beam spot on the image surface (photosensitive drum 58 of FIG. 1) of each laser beams L (Y, M, C, M) deflected by each reflection surface of the polygon mirror body 5*a*. The plurality of the mirrors are used to guide each laser beam L (Y, M, C, and B) emitted from the second image forming lens 30*b* to each photosensitive drum 58 (Y, M, C, B) corresponding to each laser beam. The dust prevention glasses 39 are used to prevent the laser exposer unit 1 from being accumulated.

The following will explain the pre-deflection optical system between the light source (laser element) and the polygon mirror unit as a first embodiment of the present invention.

The laser exposer unit 1 has first to fourth light source 3Y, 3M, 3C, and 3B (M, M=positive integral number, 4 in this case) including first and second (N1=N1=N2=N3=N4=2) (for yellow, magenta, cyan, and black) laser elements satisfying $Ni \geq 2$. Then, the first to fourth light sources generate the laser beam corresponding to image data, which is color-seperated into color components.

The first to fourth light sources 3Y, 3M, 3C, and 3B include first and second yellow lasers 3Ya and 3Yb for emitting laser beams corresponding to yellow images, first and second magenta lasers 3Ma and 3Mb for emitting laser beams corresponding to magenta images, first and second cyan lasers 3Ca and 3Cb for emitting laser beams corresponding to cyan images, and first and second black lasers 3Ma and 3Mb for emitting laser beams corresponding to black images. In this case, first to fourth laser beams, that is, paired LYa and LYb, paired LMa and LMb, paired LCa and LCb, and paired LBa and LBb are emitted from each of the laser elements.

Four pairs of pre-deflection optical systems 7 (Y, M, C, B) are arranged between the respective laser beam elements 3Ya, 3Ma, 3Ca, 3Ba and the polygon mirror unit 5*a*. The respective pre-deflection optical systems 7 are used to provide a predetermined shape of a cross section beam spot of each of the laser beams LYa, LMa, LCa, and LBa emitted from each of the light sources 3Ya, 3Ma, 3Ca, and 3Ba.

The following will explain the characteristics of half mirrors 11B and cylinder lens 12B of the pre-deflection optical system 7 in which the laser beam LBa guided to the polygon mirror unit 5 from the first black laser 3Ba and the laser beam LBb guided to the polygon mirror unit 5 from the second black laser 3Bb are shown as a typical example.

A predetermined convergence is provided to the dispersive laser beam LBa emitted from the first black laser 3Ba by a finite focus lens 8Ba. The laser beam LBa is reflected to the half mirror 11B by mirror 9Ba. The laser beam LBa reflected by the mirror 9Ba is passed through the half mirror 11B to be made incident onto the cylinder lens 12B. The laser beam LBa, which is made incident on the cylinder lens 12B, is further converged in only the sub-scanning direction by the lens 12 so as to be guided to the polygon mirror unit 5.

Similarly, a predetermined convergence is provided to the dispersive laser beam LBb emitted from the second black laser 3Bb by a finite focus lens 8Bb. The laser beam LBb is reflected to the half mirror 11B by mirror 9Bb. The laser beam LBb reflected by the mirror 9Bb is made incident onto the surface, which is opposite to the surface where the laser beam LBa is made incident from the first black laser 3Ba, to have a predetermined beam distance between the laser beams LBa and LBb in the sub-scanning direction. The laser beam LBb is further reflected by the half mirror 11B to be made incident onto the cylinder lens 12B.

The laser beam LBb, which is made incident on the cylinder lens 12B, is further converged in only the sub-scanning direction by the lens 12B so as to be guided to the polygon mirror unit 5.

The finite focus lenses 8Ba and 8Bb use a single lens, which is formed by adhering a plastic aspherical lens (not shown) onto aspherical glass lens, or a single aspherical glass lens. As a plastic aspherical glass lens, a UV curing plastic aspherical lens, which is cured by irradiation of an ultraviolet ray, is preferably used. Also, substantially the same characteristic is provided to each of the finite focus lenses 8Ba and 8Bb.

As mirrors 9Ba and 9Bb, there is a motor drive mirror (galvano mirror), which is formed such that the angle of the reflection surface (not shown) can be changed to an arbitrary angle by a galvano motor or a voice coil in a state such that each of the main scanning and sub-scanning directions is used as a rotation axis. The half mirror 11B is formed to have a thickness tm of 5 mm by depositing the metal film on one surface of the parallel plane glasses having the same thickness and material so that a ratio between transmittance and reflectance is controlled to a predetermined value.

The cylinder lens 12B is a hybrid lens, which is obtained by bonding a plastic cylinder lens formed of PMMA and a glass cylinder lens formed of FD 60 to each other or pressing these lenses to a positioning member (not shown) from a predetermined direction to be integral with each other. In this case, curvature of the surface where the plastic cylinder lens and the glass cylinder lens contact each other in the sub-scanning direction is equally set. Moreover, the plastic cylinder lens is molded to be integral with the glass cylinder lens. In the plastic cylinder lens, the cross section in the sub-scanning direction is formed on a part of the cylindrical surface such that the surface contacting air has power in the sub-scanning direction.

The positions of the laser beams LBa and LBb passing through the cylinder lens 12B are out of the optical axis of the cylinder lens 12B. In other words, the laser beams LBa and LBb are decentered and inclined in the sub-scanning direction to be incident on the cylinder lens 12B. That is, the laser beams LBa and LBb directing to the polygon mirror unit 5 from the half mirror 11B are arranged so as to cancel the coma aberration, which is generated when the laser beams LBa and LBb pass through the first and second image forming lenses 30a and 30b. Also, the laser beam LBb is incident to be asymmetrical to the laser beam LBa with respect to the optical axis of the cylinder lens.

The respective laser beams LBa and LBb are combined as substantially one laser beam having a predetermined beam distance in the sub-scanning direction through the half mirror 11B. The laser beams LBa and LBb are passed through a non-reflection area of a laser synchronization mirror 13, that is, a predetermined position of the mirror 13 having no mirror portion formed to be guided to the polygon mirror unit 5.

The laser beams LBa and LBb guided to the polygon mirror unit 5 are substantially linearly focused nearby each reflection surface of the polygon mirror body 5a. Then, the laser beams LBa and LBb are made incident on the incident surface of the first image forming lens 30a included in the image forming lens 30 of the post-deflection optical system 21 at a predetermined angle.

Thereafter, predetermined convergence and directivity are given to the laser beams LBa and LBb by the second image forming lens 30b to have predetermined shape and size of the beam spot on the surface of the photosensitive drum 58B. The laser beams LBa and LBb are reflected at a predetermined angle by the mirror 33B, and passed through the dust prevention glass 39B. Then, the photosensitive drum 58 is irradiated with the laser beams LBa and LBb.

Next, the following will explain the characteristic of the half mirrors 11 (Y, M, C, and B).

The laser beams LYa, LMa, LCa, and LBa emitted from the laser elements 3Ya, 3Ma, 3Ca and 3Ba are transmitted through the half mirrors 11 (Y, M, C, and B), respectively. The laser beams LYb, LMb, LCb, and LBb emitted from the laser elements 3Yb, 3Mb, 3Cb and 3Bb are reflected by the half mirrors 11 (Y, M, C, B), respectively. Since the number of the respective light sources 3 (Y, M, C, B) is Ni (Ni= positive integral number, in this case, N1=N2=N3=N4=2), it is needless to say that (Ni−1)=1 half mirrors 11 (Y, M C, and B) is used for each light source.

The number of times of the transmission of the laser beams L (Ya, Yb, Ma, Mb, Ca, Cb, Ba, Bb) through the half mirrors 11 (Y, M, C, B) is 1 or 0, respectively. More specifically, LBa, LMa, LCa, and LYa are passed through the half mirrors 11 (Y, M, C, and B) only one time. The other laser beams LBb, LMb, LCb, and LYb are reflected by the half mirrors 11 (Y, M, C, B), respectively. The respective half mirrors 11 (Y, M, C, B) are inclined in the same direction and at the same angle with respect to the laser beams LBa, LMa, LCa, and LYa directing to the polygon mirror unit 5 through the respective half mirrors 11 (Y, M, C, B). In this case, an angle of each of half mirrors 11 (Y, M, C, B) to be inclined is 45°. Also, a thickness tm of each of the half mirrors 11 (Y, M, C, B) is set to 5 mm.

If the ratio between transmittance and reflectance of the respective half mirrors 11 (Y, M, C, B) is set to 1:1, the outputs of the laser elements 3Ya and 3Yb, 3Ma and 3Mb, 3Ca and 3Cb, and 3Ba and 3Bb of the respective light sources 3 (Y, M, C, B) can be set to substantially the same power. Thereby, the outputs on the image forming surface can be set to the same, and the image forming characteristics of the laser beams L (Ya, Yb, Ma, Mb, Ca, Cb, Ba and Bb) can be easily equalized.

There is provided a holding member 15, which is formed to be integral with a unit housing as a fixing member, and a cover plate 15a for covering the holding member 15 to seal the polygon mirror body 5a around the polygon mirror unit 5.

In a predetermined area of the holding member 15, which is positioned in the vicinity of the line connecting the polygon mirror unit 5 and the laser synchronization mirror 13, a dust prevention glass 14 is provided. The dust prevention glass 14 is used together with the holding member 15. Thereby, the polygon mirror body 5a is sealed, and the respective laser beams L (Ya, Yb, Ma, Mb, Ca, Cb, Ba, and Bb) are transmitted to the respective reflection surfaces of the polygon mirror body 5a.

In a predetermined area of the holding member 15, which is positioned in a direction where the laser beams L (Ya, Yb, Ma, Mb, Ca, Cb, Ba, Bb) deflected by the respective reflection surfaces of the polygon mirror body 5a are emitted, a cover 16 is provided. The cover 16 is formed of the material having the same optical characteristic as the dust prevention glass 14. The cover 16 is used together with the holding member 15. Thereby, the polygon mirror body 5a is sealed, and the respective laser beams L (La, Yb, Ma, Mb, Ca, Cb, Ba, Bb), which are deflected on the respective reflection surfaces, are passed through the cover 16.

The holding member 15, the cover plate 15a, the dust prevention glass 14, and the cover 16 reduce noise, which is generated when the polygon mirror body 5a is rotated at high speed, wind loss of the respective reflection surfaces of the polygon mirror body 5a, and dust adhesion onto a bearing of the holding portion of the polygon mirror body 5a.

As the dust prevention glass 14, a parallel plate, which is formed of the same material as each half mirror 11 (Y, M, C, B) (BK 7 in this case), is used. In the example of FIG. 2, the thickness tg of the dust prevention glass 14 is set to 5 mm. Then, the dust prevention glass 14 is placed in a direction, which is opposite to each half mirror 11 (Y, M, C, B) to sandwich the optical axis with respect to the direction where the respective half mirrors 11 (Y, M, C, B) are inclined, that is, 22.5°. In a case where the direction of the inclination of each half mirror 11 is positive (+), the dust prevention glass 14 is inclined at −22.5°. If the dust prevention glass 14 is inclined at −45°, it is possible to cancel the aberration component, which is given to each of the laser beams LBa, LMa, LCa, LYa transmitted through each of the half mirrors 11 (Y, M, C, B) by each of the half mirrors 11 (Y, M, C, B). However, a new aberration component will be given to the laser beams LBb, LMb, LCb, and LYb reflected by the respective half mirrors 11 (Y, M, C, B). Therefore, an inclination angle ug at which the dust prevention glass 14 is inclined is set to −22.5° such that the aberration components to be given to the laser beams LBa, LMa, LCa, and LYa by the respective half mirrors 11 (Y, M, C, B) and the aberration components to be given to the laser beams LBb, LMb, LCb, and LYb by the dust prevention glass 14 can be set to minimum values (mark "−" shows the direction, which is opposite to the direction of the inclination of the half mirror). The dust prevention glass 14 may be slightly inclined in the sub-scanning direction to prevent stray light (not shown), which is generated by the reflection of the respective laser beams due to the first and second image forming lenses 30a and 30b, from being returned to the polygon mirror unit 5. Or, there may be used a wedge plate whose incident and emission surfaces have inclinations in the sub-scanning direction.

In the multi-beam exposer unit of FIGS. 2 and 3, the laser beams LBa, LMa, LCa, and LYa, which transmit through the half mirrors 11 (Y, M, C, B), respectively, are obliquely incident on the incident surfaces of the half mirrors 11 (Y, M, C, B). Due to this, spherical aberration B, coma aberration F, astigmatism C, and variation of focal length Δf are generated. If the relationship between the inclination of the half mirror 11 and that of the dust prevention glass 14 is evaluated, spherical aberration Σ Bi, comma aberration Σ Fi, astigmatism Σ Ci, and variations of focal length Δf can be shown by the following equations (1) to (4):

$$\Sigma Bi = -ti \times ui^4 \times (ni^2-1)/ni^3 \qquad (1)$$

$$\Sigma Fi = -ti \times ui^3 \times (ni^2-1)/ni^3 \qquad (2)$$

$$\Sigma Ci = -ti \times ui^2 \times (ni^2-1)/ni^3 \qquad (3)$$

$$\Delta f = (ti \times (1-1/ni)) \qquad (4)$$

wherein the order of the arrangement of the half mirrors and the dust prevention glass is i, the thickness of the half mirror is t, reflectance is n, and the incident angle is u.

The variation of the focal length Δf can be completely canceled by increasing the length of the optical path by Σ (ti×(1−1/ni)). In this case, the length of the optical path is the distance between the finite lenses (8Ya, 8Ma, 8Ca, 8Ba) and the corresponding cylinder lenses 11 (Y, M, C, B).

The comma aberration Σ Fi can be canceled by setting the mark, ui, reversely, that is, ui "* −ui, as is obvious from equation (2). Therefore, the components, which generate the coma aberration having the reverse mark, are arranged such that the absolute value of the sum of the aberrations generated by the half mirrors 11 and the dust prevention glass 14 becomes minimum. In other words, if the angle, which is formed by the dust prevention glass 39 and the incident laser beam, is 45°, the dust prevention glass 39 is inclined in the opposite direction with respect to the angle, which is formed by the half mirror 11 and the laser beam passing through the half mirror 11. Thereby, the absolute value of the entire coma aberration can be reduced. It is assumed that a coma aberration, which is generated when a certain beam passes through the i-th half mirror, is Fi. Then, if the beam passes through a (i=1 to a) half mirrors in all, a thickness tg of a correction plate g (corresponding to the dust prevention glass 14 in this application though the parallel plane plate is generally used) to be inserted to the optical path to cancel the coma aberration and an inclination angle ug can be set based on the following equation (5):

$$-tg \times ug^3 \times (ng^2-1)/ng^3 = -(F1+F2+ \ldots +Fa) \qquad (5)$$

In order to make the number of the correction plates (the parallel plane plates) minimum, there can be considered a method in which the absolute values of the coma aberration of the laser beam whose coma aberration is maximum and the laser beam whose coma aberration is minimum are set to be the same.

For example, it is assumed that the laser beam whose coma aberration is maximum is shown by (F1+F2+ . . . +Fa) as shown in equation (5) and the coma aberration of the laser beam whose coma aberration is minus is 0 (there exists the laser beam, which does not transmit through the parallel plate).

The thickness tg of the correction plate g is set to satisfy the following equation (6), and the correction plate g is placed such that the angle, which is formed by the incident laser beam and the correction plate g, becomes ug:

$$-tg \times ug^3 \times (ng^2-1)/ng^3 = -(F1+F2+ \ldots +Fa)/2 \qquad (6)$$

As a result, the maximum absolute value of the coma aberration can be set to (F1+F2+ . . . .Fa)/2, that is, the half of the case in which no correction plate g exists.

In the multi-beam exposer unit of FIGS. 2 and 3, only the half mirrors are used. It is assumed that the coma aberration generated by the half mirror 11 is F1.

The correction plate (parallel plane plate) having the thickness tg satisfying the following equation (7) is placed such that the angle ug, which is formed by the incident laser beam and the correction plate g, becomes ug.

$$-tg \times ug^3 \times (ng^2-1)/ng^3 = -F1/2 \qquad (7)$$

As a result, the maximum absolute value of the coma aberration can be ½ of F1. This conforms to the inclination angle of the dust prevention glass 14.

Next, the following will specifically explain the advantage, which is brought about by the dust prevention glass 14.

FIGS. 4 to 6, FIGS. 7 to 9, and FIGS. 10 to 12 are graphs each showing the characteristic of the laser beam guided from the multi-beam exposer unit to the corresponding photosensitive drum.

Figure 4:
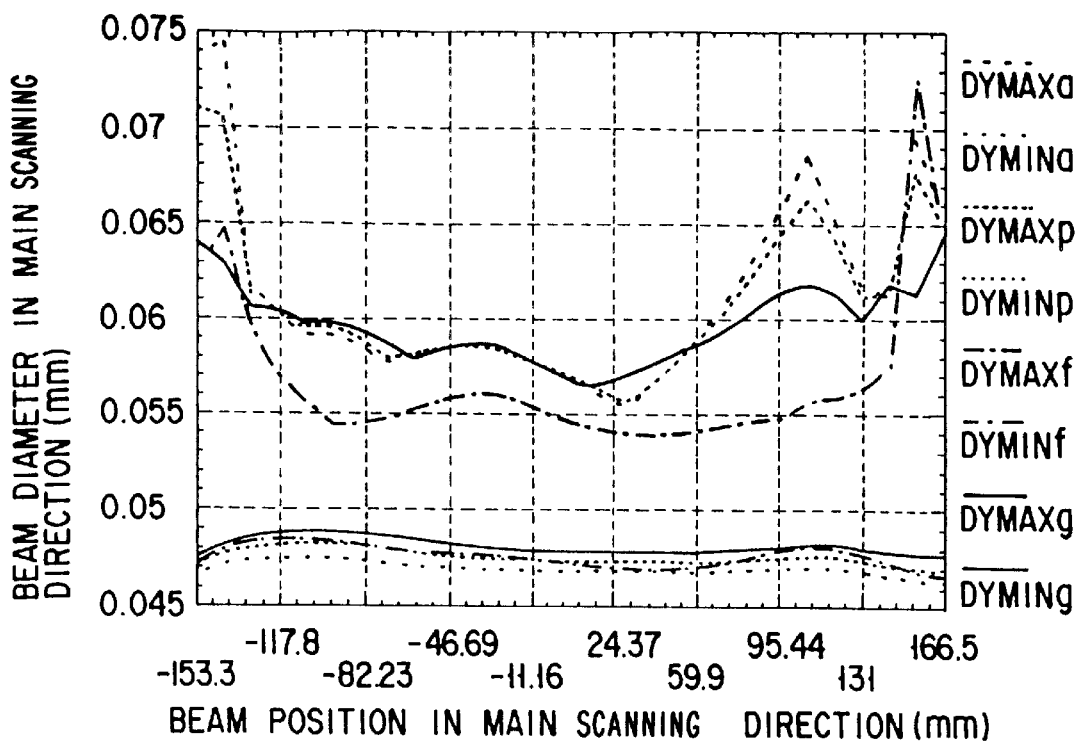
FIG. 4 is a graph explaining a state that a characteristic of an image formation of the laser beam is improved by the multi-beam exposer unit of FIGS. 2 and 3, that is, a graph showing the relationship between a maximum beam diameter in the main scanning direction and the position of the main scanning direction and the relationship between a minimum beam diameter in the main scanning direction and the position of the main scanning direction when a position of the image surface is moved by ±2 mm from a design value, in connection with laser beam LYa.
Figure 5:
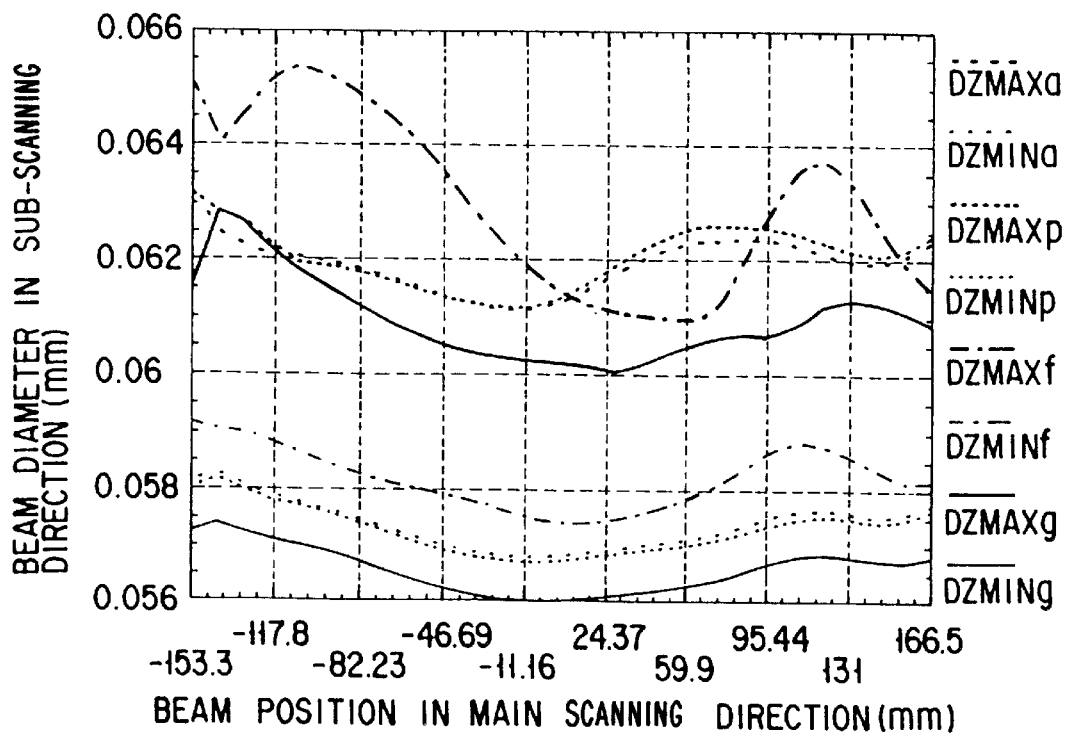
FIG. 5 is a graph explaining a state that a characteristic of an image formation of the laser beam is improved by the multi-beam exposer unit of FIGS. 2 and 3, that is, a graph showing the relationship between a maximum beam diameter in the sub-scanning direction and the position of the main scanning direction and the relationship between a minimum beam diameter in the sub-scanning direction and the position of the main scanning direction when a position of the image surface is moved by ±2 mm from a design value, in connection with laser beam LYa.

FIG. 4 is a graph explaining a state that a characteristic of an image formation of the laser beam is improved by the multi-beam exposer unit of FIGS. 2 and 3, that is, a graph showing the relationship between a maximum beam diameter in the main scanning direction and the position of the main scanning direction and the relationship between a minimum beam diameter in the main scanning direction and the position of the main scanning direction when a position of the image surface is moved by ±2 mm from a design value, in connection with laser beam LYa. FIG. 5 is a graph explaining a state that a characteristic of an image formation of the laser beam is improved by the multi-beam exposer unit of FIGS. 2 and 3, that is, a graph showing the relationship between a maximum beam diameter in the sub-scanning direction and the position of the main scanning direction and the relationship between a minimum beam diameter in the sub-scanning direction and the position of the main scanning direction when a position of the image surface is moved by ±2 mm from a design value, in connection with laser beam LYa. FIG. 6 is a graph explaining a state that a characteristic of an image formation of the laser beam is improved by the multi-beam exposer unit of FIGS. 2 and 3, that is, a graph showing the relationship between a maximum amount of flare in the main scanning direction and the position of the main scanning direction and the relationship between a maximum amount of flare in the sub-scanning direction and the position of the main scanning direction when a position of the image surface is moved by ±2 mm from a design value, in connection with laser beam LYa.

In FIGS. 4 to 6, curves DYMAXa and DYMAXp show the change of the maximum beam diameter of the main scanning direction, curves DYMINa and DYMINp show the change of the minimum beam diameter of the main scanning direction. Curves DZMAXa and DZMAXp show the change of the maximum beam diameter of the sub-scanning direction, curves DZMINa and DZMINp show the change of the minimum beam diameter of the sub-scanning direction. Curves FLRYMAXa and FLRYMAXp show the change of the maximum amount of flare of the main scanning direction, and curves FLRZMAXa and FLRZMAXp show the change of the maximum amount of flare of the sub-scanning direction. A subscript p, which is added to the display of each curve shows the characteristic of the case in which the dust prevention glass (correction plate) 14 of the multi-beam exposer unit is provided. A subscript a shows the state in which the dust prevention glass 14 is intentionally detached for comparison. Subscripts f, g, and h show that the characteristics provided by the modification to be described later are displayed on the same scale.

FIGS. 7 to 9 show the characteristic of the laser beam LMa from the first magenta laser 3Ma under the same condition as FIGS. 4 to 6. Since the marks of the curves of these figures are the same as the cases of FIGS. 4 to 6, the specific explanation is omitted.

FIGS. 10 to 12 show the characteristic of the laser beam LCa from the first cyan laser 3Ma under the same condition as FIGS. 4 to 6. Since the marks of the curves of these figures are the same as the cases of FIGS. 4 to 6, the specific explanation is omitted.

Since the laser beam LBa emitted from the first black laser 3Ba has substantially the same characteristic as the laser beam LYa from the first yellow laser 3Ya, the specific explanation of the laser beam LBa is omitted.

As explained above, in the pre-deflection optical system 7, the coma aberration components, which are generated in only the laser beams LYa, LMa, LCa, and LBa passing through the half mirrors 11 (Y, M, C, B) are set so as to have the minimum difference of the absolute value between the above coma aberration and the coma aberration among the laser beams LYb, LMb, LCb, LBb reflected without passing through the half mirrors 11 (Y, M, C, B) by the dust prevention glass 14 (parallel plane plate). The dust prevention glass 14 is placed at the angle which corresponds to ½ angle and each half mirror 11 is inclined in the direction opposite to the direction where each half mirror 11 is inclined with respect to the optical axis. Thereby, the variation of the beam diameter of the main scanning direction and that of the beam diameter of the sub-scanning direction can be reduced. It is recognized that the amount of flare can be improved in both the main and sub-scanning directions.

The following will specifically explain the post-deflection optical system between the polygon mirror unit and the image surface according to the second embodiment of the present invention.

As shown in FIGS. 2 and 3, the post-deflection optical system 21 has one set of image forming lenses 30 including first and second image forming lenses 30a and 30b. By use of Tables 1 and 2, and equation (8), the following optical characteristic and shape are given. Each of the image forming lenses 30a and 30b is placed at a predetermined position, which is defined such that the distance from the reflection point of each reflection surface of the polygon mirror becomes shorter than the distance from the image surface.

$$X = \frac{CUYy^2 + CUZz^2}{1 + \sqrt{1 - CUYy^2 - CUZz^2}} + \sum_{n=0}^{4}\sum_{m=0}^{10} Amn Y^m Z^n \tag{8}$$

TABLE 1

| Post-deflection optical system | | | absolute coordinates: Decentering in y direction −4.333 | |
|---|---|---|---|---|
| curvature | | | lens surface | |
| CUY | CUZ | Thickness | number | material |
| 0.019021 | −0.0147546 | −35.435 | 1 | air |
| 0.02040817 | 0.01793626 | −6.524 | 2 | PMMA |
| 0.0029042340 | −0.00634328 | −106.530 | 3 | air |
| 0.002112237 | 0.01552636 | −6.0077405 | 4 | PMMA |
| plane | plane | −9.0000 | | air |
| plane | plane | −2.000 | | BK7 |
| plane | plane | −164.000 | | air |

TABLE 2

Lens surface number: 1

| n\m | 0 | 1 | 2 | 3 | 4 | 5 |
|---|---|---|---|---|---|---|
| 0 | 0.000E + 00 | −5.175E − 02 | 0.000E + 00 | 3.402E − 05 | −5.413E − 06 | −8.876E − 09 |
| 1 | 0.000E + 00 | −5.988E − 06 | 1.407E − 07 | 1.467E − 07 | 1.155E − 08 | −6.891E − 10 |
| 2 | −8.696E − 05 | −3.944E − 06 | −4.335E − 07 | 5.183E − 08 | −1.916E − 09 | 4.486E − 11 |
| 3 | 1.008E − 05 | 7.221E − 08 | 2.189E − 08 | −1.459E − 09 | 1.338E − 10 | −8.773E − 12 |
| 4 | −2.309E − 07 | −1.553E − 10 | −5.827E − 10 | 4.448E − 11 | −9.423E − 13 | 0.000E + 00 |

| n\m | 6 | 7 | 8 | 9 | 10 |
|---|---|---|---|---|---|
| 0 | −3.297E − 10 | 3.380E − 11 | −6.406E − 13 | −1.116E − 14 | 7.120E − 16 |
| 1 | 6.566E − 12 | −5.297E − 13 | 1.169E − 14 | 5.802E − 16 | −1.260E − 17 |
| 2 | 3.950E − 12 | −2.012E − 13 | −4.174E − 15 | −3.424E − 16 | 1.399E − 17 |
| 3 | −1.468E − 13 | 1.466E − 14 | −1.448E − 16 | 2.661E − 17 | −9.120E − 19 |
| 4 | 0.000E + 00 | 0.000E + 00 | 0.000E + 00 | 0.000E + 00 | 0.000E + 00 |

TABLE 2-continued

Lens surface number: 2

| n\m | 0 | 1 | 2 | 3 | 4 | 5 |
|---|---|---|---|---|---|---|
| 0 | 0.000E + 00 | −6.667E − 02 | 0.000E + 00 | 2.044E − 05 | −4.684E − 06 | 7.391E − 09 |
| 1 | 0.000E + 00 | −1.127E − 06 | −2.689E − 06 | 1.774E − 07 | −1.558E − 09 | −2.888E − 10 |
| 2 | 2.387E − 05 | −4.140E − 06 | −3.284E − 07 | 3.799E − 08 | 2.264E − 12 | 6.067E − 12 |
| 3 | −8.930E − 06 | 1.961E − 07 | 1.661E − 08 | −2.529E − 09 | 6.180E − 11 | 2.810E − 12 |
| 4 | 2.522E − 07 | −3.095E − 09 | −5.120E − 10 | 4.207E − 11 | −9.508E − 13 | 0.000E + 00 |

| n\m | 6 | 7 | 8 | 9 | 10 |
|---|---|---|---|---|---|
| 0 | −9.888E − 10 | 1.234E − 11 | −2.037E − 13 | −9.521E − 17 | 2.607E − 16 |
| 1 | 2.046E − 11 | −7.927E − 13 | 5.657E − 15 | −3.536E − 16 | 1.618E − 17 |
| 2 | −2.478E − 12 | −6.435E − 14 | 3.196E − 15 | 1.237E − 16 | −3.821E − 18 |
| 3 | −2.949E − 14 | −6.090E − 15 | 6.149E − 17 | 4.649E − 18 | −6.623E − 20 |
| 4 | 0.000E + 00 | 0.000E + 00 | 0.000E + 00 | 0.000E + 00 | 0.000E + 00 |

Lens surface number: 3

| n\m | 0 | 1 | 2 | 3 | 4 | 5 |
|---|---|---|---|---|---|---|
| 0 | 0.000E + 00 | 1.660E − 02 | 0.000E + 00 | −3.927E − 06 | −2.133E − 07 | 3.818E − 10 |
| 1 | 0.000E + 00 | −2.644E − 05 | 5.823E − 07 | −1.140E − 10 | 8.057E − 11 | 1.705E − 13 |
| 2 | −8.028E − 06 | −5.092E − 08 | 1.020E − 11 | 1.569E − 11 | −6.288E − 15 | −2.339E − 16 |
| 3 | −3.363E − 09 | 1.290E − 10 | 3.133E − 12 | 5.319E − 14 | −8.741E − 17 | −2.001E − 18 |
| 4 | 2.025E − 10 | 1.118E − 12 | −8.987E − 15 | −1.688E − 16 | −9.048E − 18 | 0.000E + 00 |

| n\m | 6 | 7 | 8 | 9 | 10 |
|---|---|---|---|---|---|
| 0 | 1.505E − 11 | 2.572E − 14 | −8.037E − 16 | 1.475E − 18 | −1.904E − 20 |
| 1 | −1.613E − 14 | 7.102E − 17 | −8.131E − 19 | 3.084E − 21 | 1.349E − 23 |
| 2 | 1.893E − 17 | −6.265E − 19 | 1.203E − 21 | 3.247E − 23 | −1.577E − 25 |
| 3 | 1.135E − 19 | −3.473E − 22 | 6.745E − 24 | −4.288E − 27 | −5.142E − 29 |
| 4 | 0.000E + 00 | 0.000E + 00 | 0.000E + 00 | 0.000E + 00 | 0.000E + 00 |

Lens surface number: 4

| n\m | 0 | 1 | 2 | 3 | 4 | 5 |
|---|---|---|---|---|---|---|
| 0 | 0.000E + 00 | 1.022E − 02 | 0.000E + 00 | −4.091E − 06 | −4.387E − 08 | 4.082E − 10 |
| 1 | 0.000E + 00 | −1.972E − 05 | 3.253E − 07 | −1.081E − 09 | 2.945E − 11 | 2.841E − 13 |
| 2 | −8.691E − 06 | −5.126E − 08 | 2.922E − 10 | 1.530E − 11 | −1.618E − 15 | −1.539E − 15 |
| 3 | −8.160E − 09 | 4.185E − 11 | 1.989E − 12 | 4.893E − 14 | 2.992E − 16 | 2.713E − 18 |
| 4 | 1.656E − 10 | 1.372E − 12 | −3.279E − 15 | −1.813E − 16 | −7.667E − 18 | 0.000E + 00 |

| n\m | 6 | 7 | 8 | 9 | 10 |
|---|---|---|---|---|---|
| 0 | 1.591E − 12 | 9.148E − 16 | 2.739E − 16 | 4.265E − 18 | −7.011E − 20 |
| 1 | −9.708E − 16 | 1.800E − 17 | −1.643E − 18 | 1.058E − 20 | −3.151E − 23 |
| 2 | −3.743E − 18 | −6.221E − 20 | 2.589E − 21 | −1.455E − 23 | −9.009E − 26 |
| 3 | 7.095E − 20 | −6.659E − 22 | −5.008E − 24 | −4.140E − 26 | 1.614E − 27 |
| 4 | 0.000E + 00 | 0.000E + 00 | 0.000E + 00 | 0.000E + 00 | 0.000E + 00 |

The shapes shown in Tables 1 and 2 and equation (8) are given to the first and second image forming lenses 30a and 30b, so that the positional shift of the beam on the image surface in the sub-scanning direction caused by the tilt of the reflection surface of the polygon mirror can be controlled to 3 μm. In other words, the post-deflection optical system has a function of correcting the positional shift of the beam, which is generated by influence caused by the difference between inclinations of the respective reflection surfaces of the polygon mirror. Thereby, the shape, which satisfies the interpolation relationship in the sub-scanning direction, is given to the first and second image forming lenses 30a and 30b over the entire scanning area. As a result, as compared with the case having no function of correcting the positional shift, that is, 192 μm, the positional shift of the beam on the image surface in the sub-scanning direction can be controlled to 3 μm, a correction magnification is 1/64 (in the case in which the inclination of each reflection mirror of the polygon mirror body 5a is one minute (1/60 degree)). In the case where the post-deflection optical system has no function of correcting the positional shift, the upper limit of an allowable value of inclination of each reflection mirror of the polygon mirror body 5a is about one second (1/3600 degree). In this case, to satisfy the allowable value of the inclination by only the accuracy of working the polygonal mirror body 5a, the working is extremely complicated, so that the yield becomes worse. Even if the allowable value is satisfied, the manufacturing cost is greatly increased.

FIGS. 13 to 15, and FIGS. 16 to 18, and FIGS. 19 to 21 show graphs each showing the optical function of each of the image forming lenses 30a and 30b to explain the state that the laser beams having the characteristics given as explained by use of FIGS. 4 to 6, FIGS. 7 to 9, and FIGS. 10 to 12 in a state that the first image forming lens 30a or the second image forming lens 30b is intentionally detached.

FIG. 13 shows the relationship between an amount of defocus of the main scanning direction (amount of change in the position of image-formation) and the position of the main scanning direction in a state that the image forming lens 30 is detached in connection with the laser beams LY (LYa and LYb are arrayed with a predetermined distance in a predetermined sub-scanning direction). A curve FSY0 shows a state that each of the first and second image forming lenses 30a and 30b is detached. A curve FSY1 shows a state that only the second image forming lens 30b (only the first image forming lens 30a is set) is detached. A curve FSY2 corresponds to a state that each of image forming lenses 30a and 30b is set.

Figure 14:
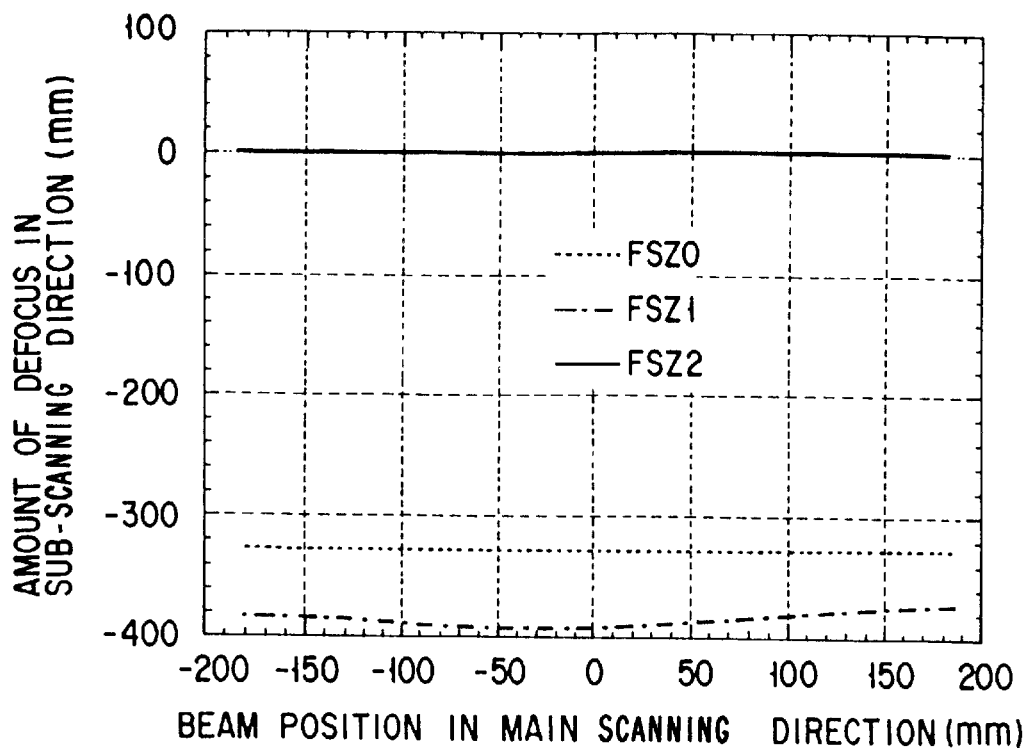
FIG. 14 is a graph showing the relationship between an amount of defocus of the sub-scanning direction and the position of the main scanning direction in a state that the image forming lens is detached in connection with the laser beams LY in the multi-beam exposer unit of FIGS. 2 and 3.

FIG. 14 shows the relationship between an amount of defocus of the sub-scanning direction and the position of the main scanning direction in a state that each of the image-forming lenses 30a and 30b is detached in connection with the laser beams LY. A curve FSZ0 shows a state that each of the first and second image forming lenses 30a and 30b is detached. A curve FSZ1 shows a state that only the second image forming lens 30b (only the first image forming lens 30a is set) is detached. A curve FSZ2 corresponds to a state that each of image forming lenses 30a and 30b is set.

Figure 15:
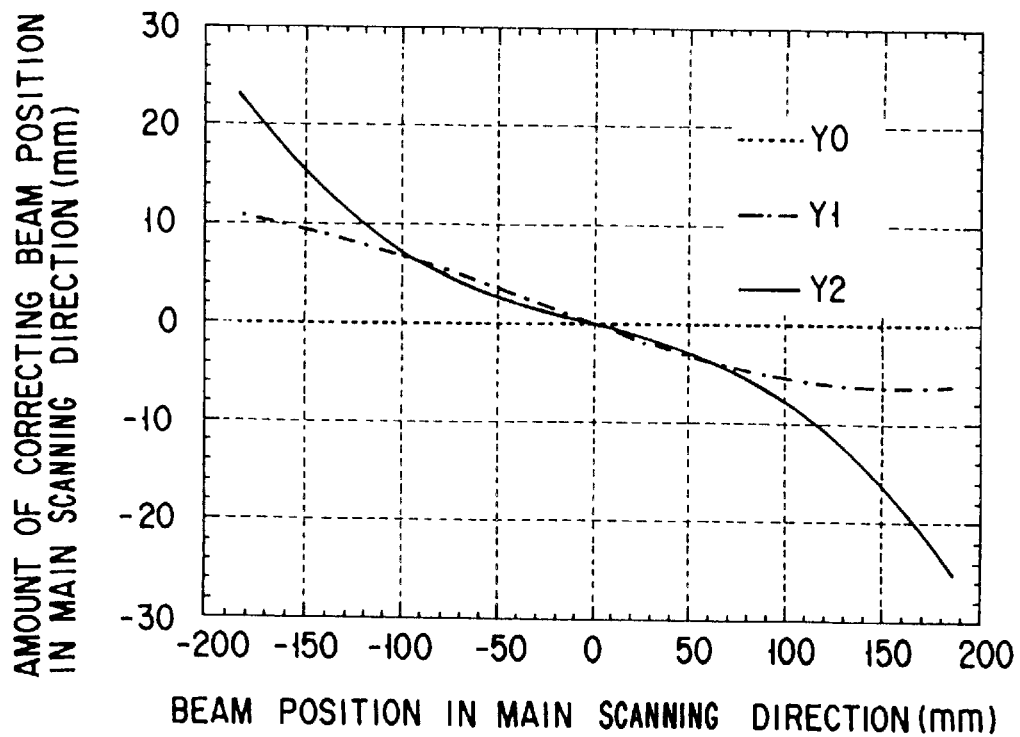
FIG. 15 is a graph showing the relationship between an amount of a beam position correction, which includes a difference between an actual position of the image forming in the main scanning direction and a logical position of the image formation, and the position of the main scanning direction in connection with the laser beams LY in the multi-beam exposer unit of FIGS. 2 and 3.

FIG. 15 shows the relationship between an amount of a beam position correction, which includes a difference between an actual position of the image forming in the main scanning direction and a logical position of the image formation, and the position of the main scanning direction in connection with the laser beams LY. A curve Y0 shows a state that each of the first and second image forming lenses 30a and 30b is detached. A curve Y1 shows a state that only the second image forming lens 30b (only the first image forming lens 30a is set) is detached. A curve Y2 corresponds to a state that each of image forming lenses 30a and 30b is set.

Figure 16:
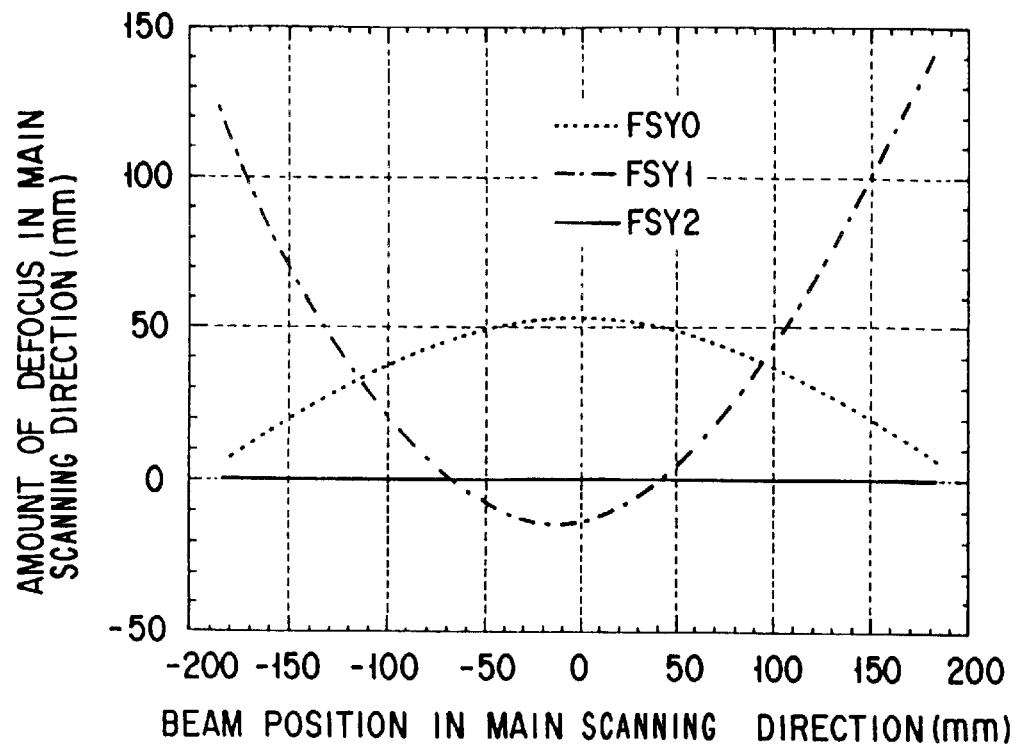
FIG. 16 is a graph showing the relationship between an amount of defocus of the main scanning direction and the position of the main scanning direction in a state that the image forming lens is detached in connection with the laser beams LM in the multi-beam exposer unit of FIGS. 2 and 3.

FIG. 16 shows the relationship between an amount of defocus of the main scanning direction and the position of the main scanning direction in a state that each of the image-forming lenses 30a and 30b is detached in connection with the laser beam LMa.

Figure 17:
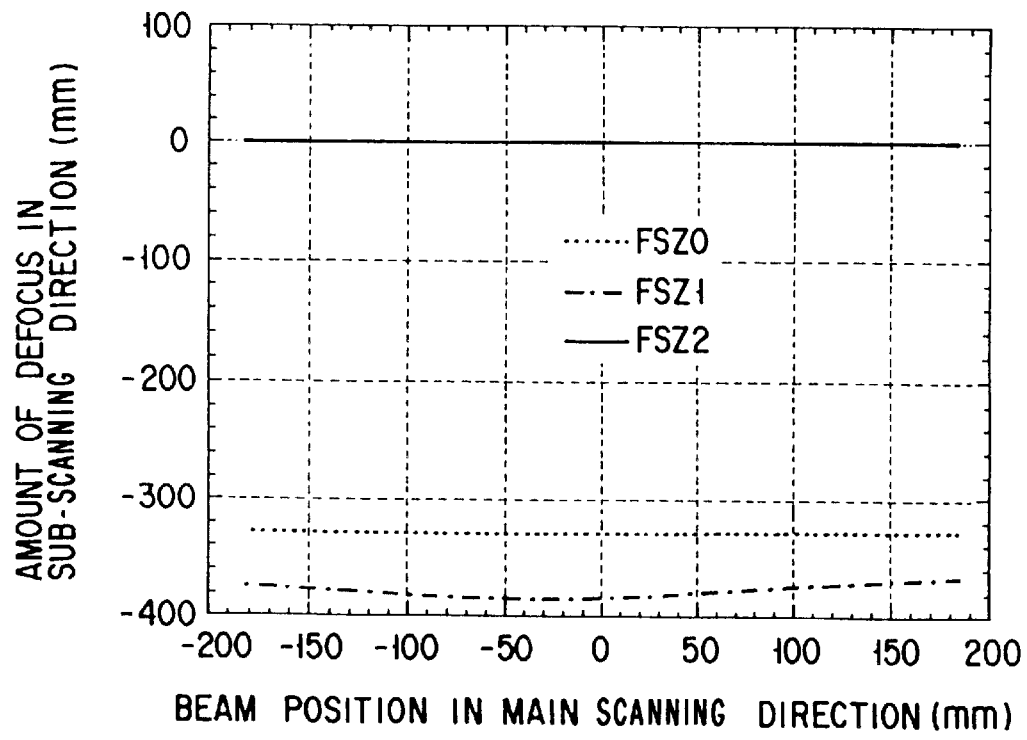
FIG. 17 is a graph showing the relationship between an amount of defocus of the main scanning direction and the position of the sub-scanning direction in a state that the image forming lens is detached in connection with the laser beams LM in the multi-beam exposer unit of FIGS. 2 and 3.

FIG. 17 shows the relationship between an amount of defocus of the sub-scanning direction and the position of the main scanning direction in a state that each of the image forming lenses 30a and 30b is detached in connection with the laser beam LMa.

Figure 18:
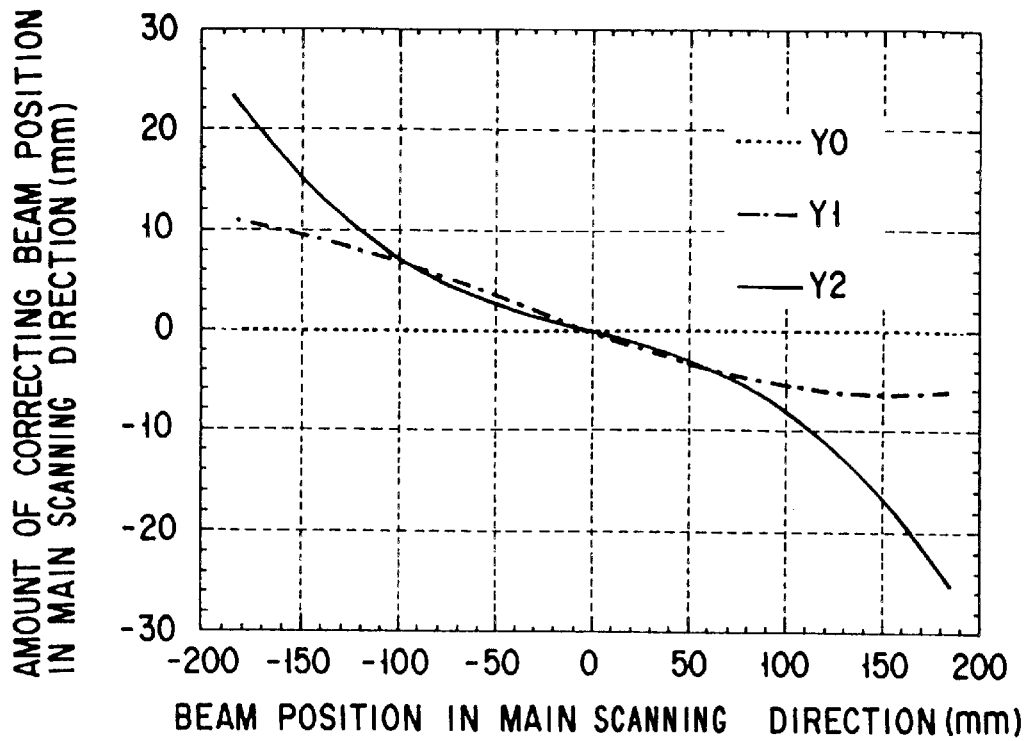
FIG. 18 is a graph showing the relationship between an amount of a beam position correction, which includes a difference between an actual position of the image forming in the main scanning direction and a logical position of the image formation, and the position of the main scanning direction in connection with the laser beams LM in the multi-beam exposer unit of FIGS. 2 and 3.

FIG. 18 shows the relationship between an amount of a beam position correction, which includes a difference between an actual position of the image forming in the main scanning direction and a logical position of the image formation, and the position of the main scanning direction in connection with the laser beam LMa.

Figure 19:
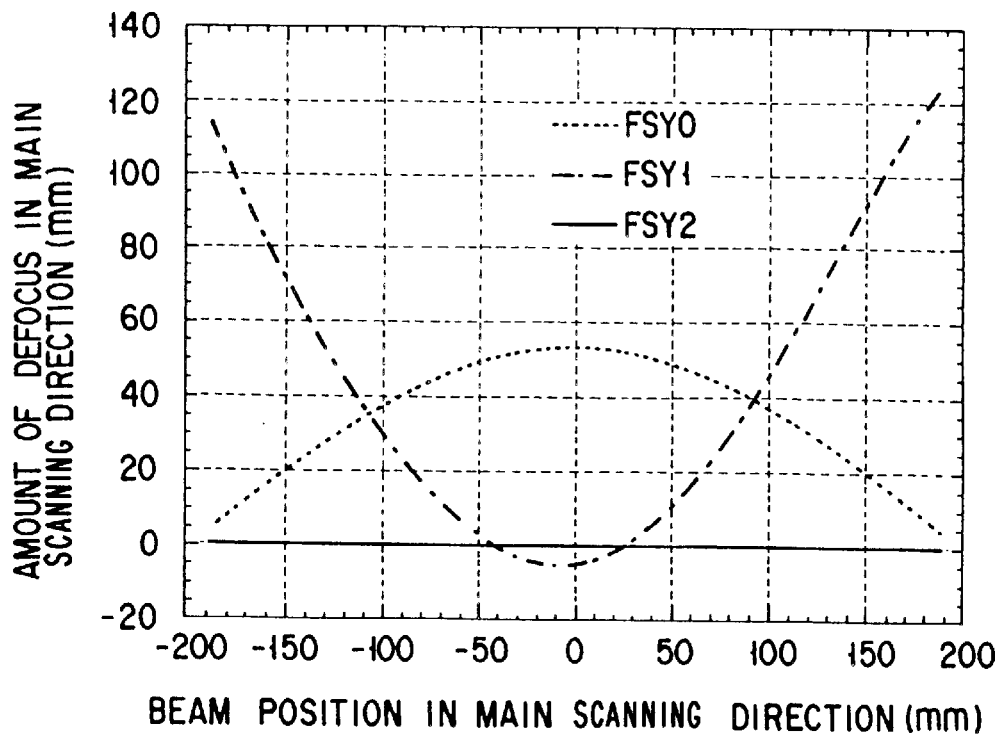
FIG. 19 is a graph showing the relationship between an amount of defocus of the main scanning direction and the position of the main scanning direction in a state that the image forming lens is detached in connection with the laser beams LC in the multi-beam exposer unit of FIGS. 2 and 3.

FIG. 19 shows the relationship between an amount of defocus of the main scanning direction and the position of the main scanning direction in a state that each of the image forming lenses 30a and 30b is detached in connection with the laser beam LCa.

FIG. 20 shows the relationship between an amount of defocus of the sub-scanning direction and the position of the main scanning direction in a state that each of the image forming lenses 30a and 30b is detached in connection with the laser beam LCa.

FIG. 21 shows the relationship between an amount of a beam position correction, which includes a difference between an actual position of the image forming in the main scanning direction and a logical position of the image formation, and the position of the main scanning direction in connection with the laser beam LCa.

The laser beam LBa emitted from the first black laser 3Ba has substantially the same characteristic as the laser beam LYa emitted from the first yellow laser 3Ya. For this reason, the specific explanation of the laser beam LBa is omitted.

As shown in FIGS. 13, 16, and 19, if the image forming lens of the post-deflection optical lens is intentionally detached, the laser beams L (Y, M, C, B) emitted from the light sources 3 (Y, M, C, B) are image-formed on the portion, which is further than the image surface with respect to the main scanning direction by convergence provided from the pre-deflection optical system 7 (FSY0).

In this case, if only the first image forming lens 30a is inserted, the laser beam, which is passed through the center of the lens, is image-formed on a minus side, that is, a portion close to the polygon mirror unit 5. On the other hand, the laser beam, which is passed through the lens end portion, is image-formed on a plus side, that is, the direction opposite to the polygonal mirror unit 5. In other words, the first image forming lens 30a has power with which the image forming position of the main scanning direction can be moved to the side of the polygon mirror unit at the central portion of the lens. Also, the second image forming lens 30a has a function of moving the image forming position to the side opposite to the polygon mirror unit at the portion close to the lens end portion (FSY1). Moreover, if the second image forming lens 30b is set, the laser beam, which is passed through the center of the first image forming lens, and the laser beam, which is passed through the end portion, are substantially linearly image-formed on a predetermined image surface, respectively. In other words, the second image forming lens 30a has power with which the image forming position of the main scanning direction can be moved to the direction opposite to the polygon mirror unit at the central portion of the lens. Also, the second image forming lens 30b has a function of moving the image forming position to the polygon mirror unit at the portion close to the end portion. That is, the second image forming lens 30b is formed to have power, which is increased as the lens 30b is away from the center of the lens with respect to the main scanning direction (FSY2). Thereby, even if the temperature and humidity are changed, the image forming optical system (post-deflection optical system) having little change of the image forming position can be provided.

As shown in FIGS. 14, 17, and 20, if the first and second image forming lenses 30a and 30b of the post-deflection optical system are intentionally detached, the laser beams L (Y, M, C, B) emitted from the light sources 3 (Y, M, C, B) are image-formed on a portion close to the reflection point of each reflection surface of the polygon mirror body 5a with respect to the sub-scanning direction perpendicular to the main scanning direction by the pre-deflection optical system 7 (FSZ0). At this time, if only the first image forming lens 30a is inserted, the laser beam, which is passed through substantially the center of the lens, is image-formed on the minus side, that is, a portion much closer to the pre-deflection optical systems 7 (Y, M, C, B) than the reflection point of each of the reflection surface of the polygon mirror body 5a. In other words, the first image forming lens 30a has a function of moving the image forming position of the sub-scanning direction to the direction, which is further than the image surface. The amount of movement of the image forming position of the sub-scanning direction becomes large at the central portion of the lens as compared with the end portion of the lens (FSZ1). Moreover, by inserting the second image forming lens 30b, the laser beam, which is passed through the center of the first image forming lens, and the laser beam, which is passed through the end portion of the lend, are substantially linearly image-formed on a predetermined image surface. In other words, the second image lens 30b has power with which the image forming position of the sub-scanning direction can be moved to the image surface side in the entire area of the main scanning direction of the lens. That is, the power of the second image forming lens 30b of the sub-scanning direction in the central area of the lens is set to be smaller than the lens end portion (FSZ2). Thereby, even if the amount of correcting inclination of each reflection surface of the polygon mirror body 5a is large and the temperature and humidity are changed, a post-deflection optical system having little change of the image forming position can be provided.

As shown in FIGS. 15, 18, and 21, if the first and second image forming lenses 30a and 30b of the post-deflection optical system are intentionally detached, the laser beams L (Y, M, C, B), which are emitted from the light sources 3 (Y, M, C, B), and which are passed through the position corresponding to the center of the lens in the case in which the image forming lens 30 exists, are image-formed on a predetermined image surface (Y0). In this case, if only the first image forming lens 30a is inserted, the laser beam, which is passed through the center of the lens, is image-formed at substantially the equal position with respect to the main scanning direction of the lens. Then, the laser beam, which is passed through the lens end portion, is shifted to the center of the lens so as to be image-formed in proportion to the distance between the position of the main scanning direction where the laser beams are passed and the center of the main scanning direction of the lens (Y1). Also, if the second image forming lens 30b is further inserted, the laser beam, which is passed through the center of the lens, is image-formed at a substantially equal position with respect to the main scanning direction of the lens. Then, the laser beam, which is passed through the lens end portion, is further shifted to the center of the lens so as to be image-formed in proportion to the distance between the position of the main scanning direction where the laser beams are passed and the center of the main scanning direction of the lens (Y2). In other words, the first and second image forming lenses 30a and 30b have the function of moving the laser beam to the center of the main scanning direction with respect to the main scanning direction as the distance of the main scanning direction from the center of the lens is increased. The function of moving the laser beam is increased by a predetermined function as the distance of the main scanning direction from the center of the lens is increased. Therefore, there can be obtained a good constant velocity in deflecting the laser beam in the main scanning direction. Also, the variation of the position of the main scanning direction caused by the change of the temperature and humidity can be reduced.

As explained above, the optical characteristics of FIG. 1 are given to the image forming lens 30 of the multi-beam exposer unit of FIGS. 2 and 3. Thereby, as explained with reference to FIGS. 13 to 21, there can be provided the post-deflection optical system in which the amount of defocus of the main scanning direction, that of the sub-scanning direction, and the position of the laser beam of the main scanning direction are not changed by depending on the variations of the temperature and humidity even if two plastic lenses are used.

The first and second image forming lenses 30a and 30b are placed at the position, which is defined such that the distance from the reflection point of each reflection surface of the polygon mirror body 5a is shorter than the distance from the image surface, that is, the portion close to the polygon mirror unit 5 than the center of the distance between each reflection point of each reflection surface of the polygon mirror body 5a and the image surface. As a result, the size of the multi-beam exposer unit can be reduced.

The following will explain the first modification of the pre-deflection optical system of the first embodiment between the light source (laser element) and the polygon mirror unit.

A multi-beam exposer unit 101 comprises first to fourth light sources 103Y, 103M, 103C, and 103B for generating the laser beam corresponding to image data, which is color-separated into color components. Each of four light sources includes two laser elements for each color (yellow, magenta, cyan, black). Just for simplifying the explanation, the following will describe the structure of the laser beam LB (black). In this case, the same reference numerals are added to the same structure as the structure of FIGS. 2 and 3, and the specific explanation is omitted. Since the number of the respective light sources 103 (Y, M, C, B) is Ni (Ni=positive integral number, in this case, N1=N2=N3=N4= 2, i=1+0M, $$M = \text{number of colors}) = \sum_{i=1}^{M} Ni,$$

it is needless to say that $$(Ni-1) = 1 \text{ half mirrors } 111 \ (Y, M, C, \text{and } B) = \sum_{i=1}^{M} (Ni-1)$$

is used for each light source.

Figure 22:
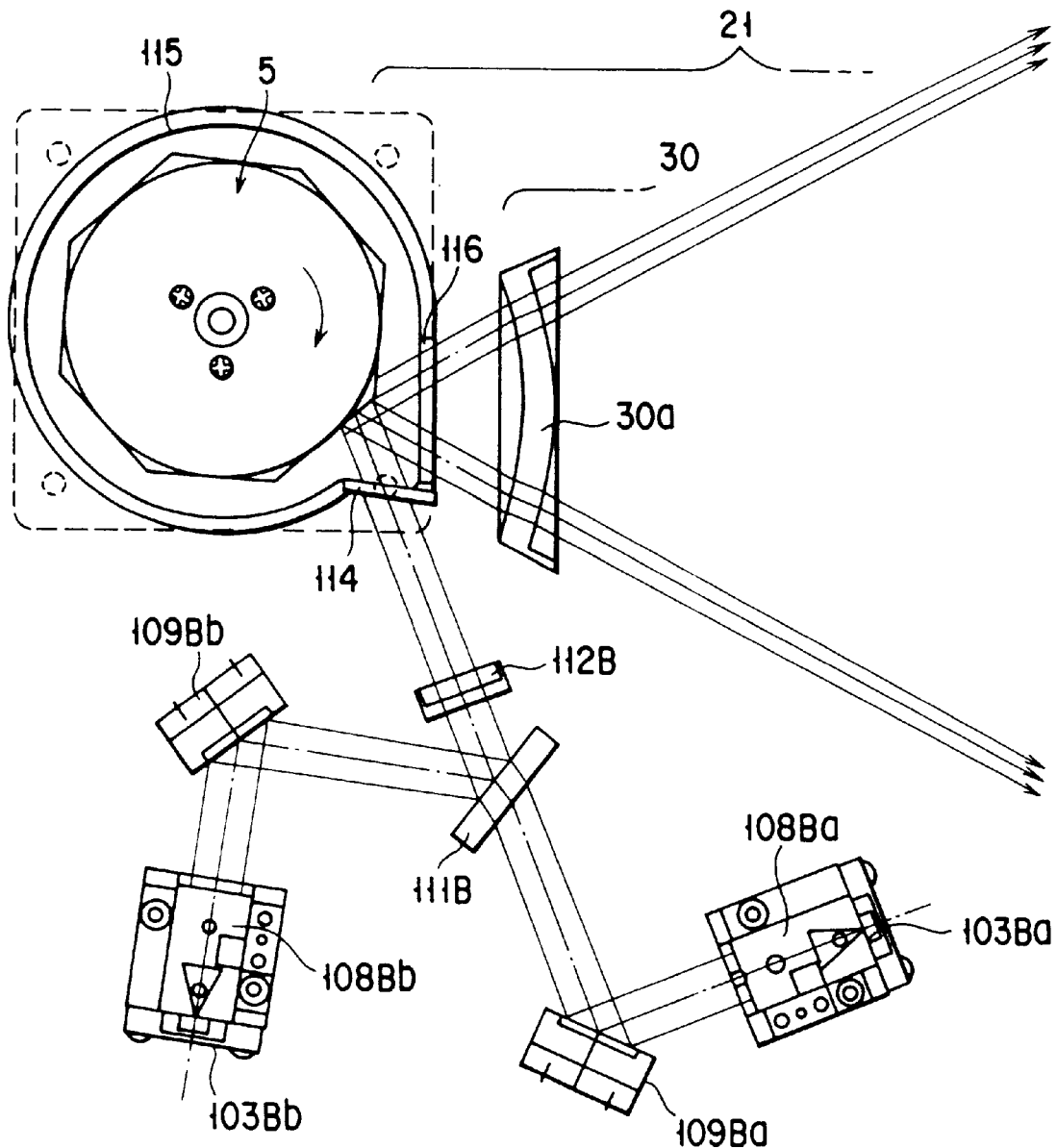
FIG. 22 is schematic plain view showing a first modification of the pre-deflection optical system of the multi-beam exposer unit of FIGS. 2 and 3.

As shown in FIG. 22, the multi-beam exposer unit 101 comprises light sources, that is, first and second lasers 103Ba and 103Bb, polygon mirror unit 5, pre-deflection optical systems 107Ba and 107Bb, first and second finite focal lenses 108Ba, 108Bb, and a half mirror 111B. The pre-deflection optical system 107Ba is provided between the first black laser 103Ba and the polygon mirror unit 5 to set the cross-section beam spot of the laser beam LBa from the laser 103Ba to a predetermined shape. The pre-deflection optical system 107Bb is provided between the second black laser 103Bb and the polygon mirror unit 5 to set the cross-section beam spot of the laser beam LBb from the laser 103Bb to a predetermined shape. Each of the first and second finite focal lenses 108Ba and 108Bb, which is positioned to be integral with each of lasers 103Ba and 103Bb, provides a predetermined convergence to each of the laser beams LBa and LBb emitted from each laser. The half mirror 111B is used to put together the laser beams LBa and LBb as one light beam. Pre-deflection optical systems 107Ba and 107Bb can be differentiated by checking whether or not the respective pre-deflection optical systems 107Ba and 107Bb are transmitted through a half mirror 111B, or whether or not the respective pre-deflection optical systems 107Ba and 107Bb are reflected by the half mirror 11B.

Each of mirrors 109Ba and 109Bb is provided between each of the first and second finite focal lenses 108Ba and 108Bb and the half mirror 111B. The mirrors 109Ba and 109Bb reflect laser beams LBa and LBb, to which the predetermined convergence is given by the finite focal lenses 108Ba and 108Bb, toward the half mirror 111B. The cylinder lens 112B, holding member 115, and dust prevention glass 114 are provided between the half mirror 111B and the polygon mirror unit 5. The cylinder lens 112B further converges the laser beam LB synchronized by the half mirror 111B in only the sub-scanning direction. The holding member 115 surrounds the polygon mirror unit 5. The dust prevention glass 114 is used together with the holding member 115. Thereby, the polygon mirror body 5a is sealed, and the respective laser beams LBa, and Bb are transmitted to the respective reflection surfaces of the polygon mirror body 5a.

Then, the spherical aberration generated by the optical system shown in table 3 is given to the fist and second finite focal lenses 108Ba and 108Bb to provide an image forming characteristic shown by FIGS. 23A and 23B. In other words, the spherical aberration is used to improve the characteristic of the main scanning direction as the part of the characteristic of the sub-scanning direction provided by the first embodiment is partially changed. In this case, equation (9) shows the shapes of the first and second finite focal lenses surfaces 108Ba and 108Bb.

$$\chi = \frac{CH^2}{1 + \sqrt{1 - ccC^2H^2}} + adH^4 + aeH^6 + afH^8 + agH^{10} \quad (9)$$

in this case, $H = \sqrt{y^2 + z^2}$

TABLE 3

| curvature | thickness | material |
|---|---|---|
| plane | 1 | air |
| plane | 0.3 | BK7 |
| −0.006725 | 12.479 | air |
| −0.078554 | 6.000 | n = 1.7978 |
| −0.0812677 | 0.020 | n = 1.5036 |
| plane | | air | cc = 0.133716000000000
ad = −8.377423603344442D-007
ae = 1.592401449469098D-008
af = 9.787118666580858D-010
ag = −9.475692204982494D-013

FIGS. 23A and 23B are graphs each showing that the image-forming position close to the main ray and the image-forming position close to the outermost ray in a state that first and second finite focal lenses of the multi-beam exposer unit of FIG. 22 are estimated based on the spherical aberration generated by the optical system of Table 3 so that the position of the image surface (surface of the photosensitive drum 58) is set to 0. FIG. 23A shows the change of the image forming position (amount of defocus) of the component of the main scanning direction of the laser beam LB. FIG. 23B shows the change of the image forming position of the component of the sub scanning direction of the laser beam LB. A curve a is the image-forming position close to the chief ray and a curve b is the image-forming position close to the outermost ray. Regarding the amount of defocus, a portion close to the light source 103B (polygon mirror unit 5) is negative (−).

Regarding the image forming state of the main scanning direction, as shown in FIG. 23A, in the entire area of the main scanning direction, the image-forming position close to the outermost ray is set to be positive, and the image-forming position close to the main ray is set to be negative. In other words, in the multi-beam exposer unit 101 of FIG. 22, the horizontal magnification of the main scanning direction, which is obtained by the combination of the pre-deflection optical system 7 and the post-deflection optical system 21, is set to be negative, and that of the sub-scanning direction is set to be positive. That is, an image surface area (entire area in this case) and a direction (the main scanning direction in this case) are provided to the optical system including the light sources 103Ba and 103Bb, pre-deflection optical system 107, and the image forming lens 30 (post-deflection optical system 21). In this case, the image surface area and the direction are set such that the image-forming position close to the chief ray is placed at the light source side (outside of the photosensitive drum 58) than the surface of the photosensitive drum 58 (image surface) and that the image-forming position close to the outermost ray is placed at the opposite side of the light source (inner side of the photosensitive drum 58) than the surface of the photosensitive drum 58 (image surface). Thereby, as compared with the multi-beam exposer unit of FIGS. 2 and 3, the characteristic of the sub-scanning direction is slightly changed, but the characteristic of the main scanning direction is improved.

The thickness tm of half mirror 111B is set to 5 mm. The half mirror 111b is inclined at 30°, to the axial direction of the laser beam LB.

As dust prevention glass 114, a parallel plate having the same material as the half mirror 111B (BK7) and a thickness tg of 2.5 mm is used. In the multi-beam exposer unit 101 of FIG. 22, if the direction where the half mirror 111B is inclined is +, the direction where the dust prevention glass 114 and the value are −30° from equation (6). In other words, the dust prevention glass 114 is placed at 30° to the direction, which is opposite to the direction where the half mirror 111B is inclined. The wedge plate whose incident surface and emission surface are non-parallel to each other with respect to the sub-scanning direction may be used as the dust prevention glass 114 to shift stray light (not shown), which is generated by the incident surface and the emission surface, to the sub-scanning direction.

The following will specifically explain the advantage, which is brought about by the dust prevention glass 114. Just for comparison, the image forming characteristics of this first modification are shown on the same scale in each of the graphs of FIGS. 4 to 6, FIGS. 7 to 9, and FIGS. 10 to 12 showing the image forming characteristics of the first embodiment.

In each of FIGS. 4 to 6 (the image forming characteristic of the laser beam LYa from the first yellow laser 3Ya is shown, and the emission laser beam LBa from the first black laser 3Ba has the characteristic, which is substantially equal to the first yellow laser 3Ya), a curve DYMAXf shows the change of the maximum beam diameter of the main scanning direction. A curve DYMINf shows the change of the minimum beam diameter of the main scanning direction. A curve DZMAXf shows the change of the maximum beam diameter of the sub-scanning direction. A curve DZMINf shows the change of the minimum beam diameter of the sub-scanning direction. A curve FLRYMAXf shows the change of the maximum amount of flare of the main scanning direction. A curve FLRZMAXf shows the change of the maximum amount of flare of the sub-scanning direction. FIGS. 7 to 9 show the characteristic of the laser beam LMa from the first magenta laser 3Ma, which is omitted in FIG. 22, under the same condition as FIGS. 4 to 6. FIGS. 10 to 12 show the characteristic of the laser beam LCa from the first cyan laser 3Ca, which is omitted in FIG. 22, under the same condition as FIGS. 4 to 6. Since the marks of the curves of these figures are the same as the cases of FIGS. 4 to 6, the specific explanation is omitted.

As is obvious from FIGS. 4 to 6, FIGS. 7 to 9, and FIGS. 10 to 12, the spherical aberration is provided to the finite lenses 8Ba and 8Bb to form finite focal lenses 108Ba, 108Bb (first modification of the first embodiment). Thereby, the image forming characteristic of the main scanning direction, which has room to be improved, can be improved. In other words, the width variation of the sub-scanning direction, which is originally small, is unchanged, and the width variation of the main scanning direction, which is originally large, is reduced. Also, the amount of flare can be improved in the main scanning direction.

Next, the following will explain the method for optimizing the amount of the spherical aberrations of the finite focal lenses 108Ba and 108Bb, which are incorporated to the multi-beam exposer unit 101 of FIG. 22, from a wave surface aberration.

It is assumed that the position 170 mm away from the image surface is an emission pupil in connection with the laser beam having a Gaussian distribution in which $e^{-2}$ beam diameter on the image surface is 50 $\mu$m. Each of FIGS. 24A, 25A, 26A, 27A, 28A, 29A, 30A, and 31A shows a wave surface aberration coefficient and the state of the wave surface aberration when the optimized wave surface aberration is added to the density distribution and the wave surface coefficient on the emission pupil. In FIGS. 24B, 25B, 26B, 27B, 28B, 29B, 30B, and 31B, each wave surface aberration is replaced with the amount of defocus.

In this case, the wave surface aberration can be expressed as follows:

$$c_1 x^2 + c_2 x^4 + c_3 x^6 + c_4 x^8 + \ldots + c_8 x^{16} (rad) \tag{10}$$

wherein x is a value, which is obtained by defining the distance from the main ray at the emission pupil by $e^{-2}$ beam radius, and a contracted diameter is equal to $e^{-2}$ beam radius.

The minimum and maximum beam diameters are calculated for each wave surface aberration shown at each of FIGS. 24A, 25A, 26A, 27A, 28A, 29A, 30A, and 31A within the amount of defocus of ±2.9 mm.

In case of FIG. 24A, the minimum and maximum beam diameters are 52.60 to 60.94 $\mu$m when the degree of the wave surface aberration is set to second degree ($x^2$). In case of FIG. 25A, the minimum and maximum beam diameters are 60.30 to 64.00 $\mu$m when the degree of the wave surface aberration is set to fourth degree ($x^4$). In case of FIG. 26A, the minimum and maximum beam diameters are 62.20 to 64.00 $\mu$m when the degree of the wave surface aberration is set to sixth degree ($x^6$). In case of FIG. 27A, the minimum and maximum beam diameters are 61.50 to 63.20 $\mu$m when the degree of the wave surface aberration is set to eighth degree ($x^8$). In case of FIG. 28A, the minimum and maximum beam diameters are 61.20 to 63.00 $\mu$m when the degree of the wave surface aberration is set to tenth degree ($x^{10}$). In case of FIG. 29A, the minimum and maximum beam diameters are 61.10 to 62.90 $\mu$m when the degree of the wave surface aberration is set to twelfth degree ($x^{12}$). In case of FIG. 30A, the minimum and maximum beam diameters are 60.70 to 62.70 $\mu$m when the degree of the wave surface aberration is set to fourteenth degree ($x^{14}$). In case of FIG. 31A, the minimum and maximum beam diameters are 60.50 to 62.60 $\mu$m when the degree of the wave surface aberration is set to sixteenth degree ($x^{16}$).

In FIGS. 24A and 24B, $c_1 = 0.00587777012848$

Curve $P_1$ in FIG. 24A can be obtained from equation (9) as follows:

$$P_1 = \{(c_1 x^2), (x, -1, 1)\}$$

In FIGS. 25A and 25B, $c_1$ and $C_2$ are shown as follows:
$c_1 = -4.680959835990669$
$c_2 = 6.524161634311780$ Curve $P_2$ in FIG. 25A can be obtained from equation (9) as follows:

$$P_2 = \{(c_1 x^2 + C_2 x^4), (x, -1, 1)\}$$

In FIGS. 26A and 26B, $c_1$, $c_2$, $C_3$ are shown as follows:
$c_1 = -2.326913380539070$
$C_2 = -0.184605948401750$
$C_3 = 5.216107608502032$ Curve $P_3$ in FIG. 26A can be obtained from equation (9) as follows:

$$P_3 = \{(c_1 x^2 + c_2 x^4 + c_3 x^6), (x, -1, 1)\}$$

In FIGS. 27A and 27B, $c_1$, $c_2$, $c_3$, and $c_4$ are shown as follows:
$c_1 = -0.558659050233116$
$c_2 = -1.171632940388197$
$c_3 = -0.989319620337984$
$c_4 = -6.039418148065442$ Curve $P_4$ in FIG. 27A can be obtained as follows:

$$P_4 = \{(C_1 x^2 + c_2 x^4 + c_3 x^6 + c_4 x^8), (x, -1, 1)\}$$

Figure 28A:
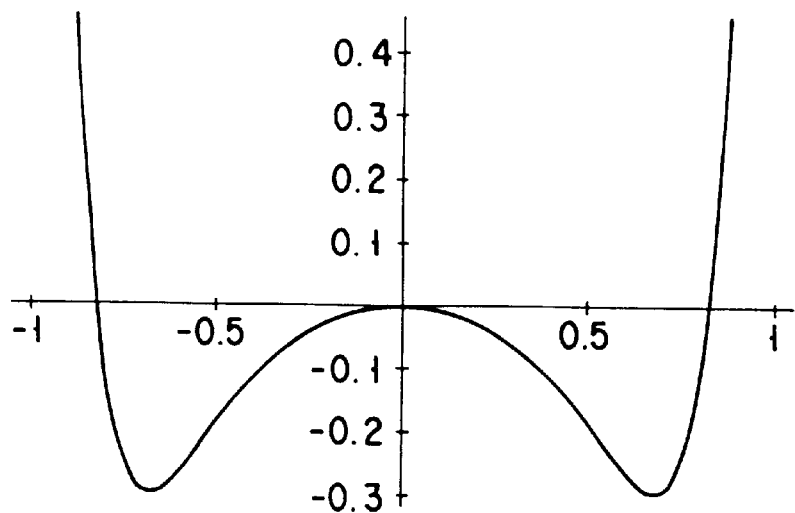
FIGS. 28A and 28B are graphs each showing a form of a wave-surface aberration and a corresponding amount of defocus when the spherical aberration is optimized to minimize the maximum beam diameter within the amount of defocus of ±2.9 to the tenth degree.
Figure 28B:
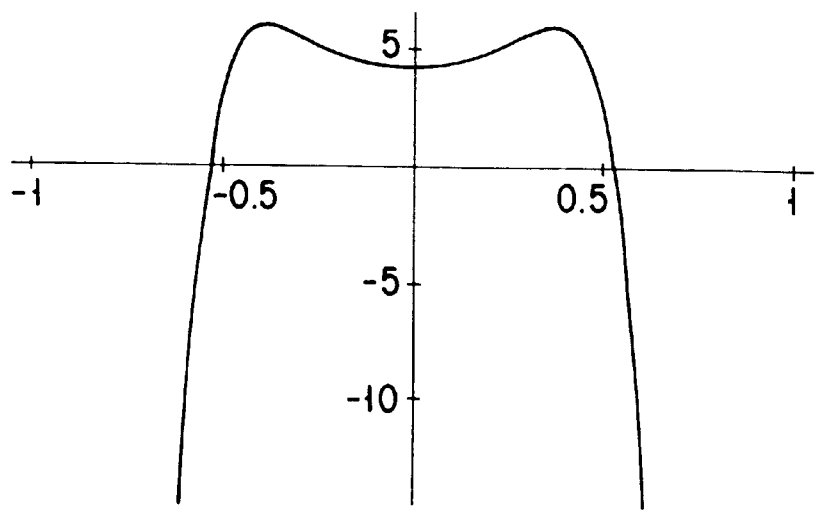

In FIGS. 28A and 28B, $c_1$, $c_2$, $c_3$, $c_4$, and $c_5$ are shown as follows:
$c_1 = -0.668726579771422$
$c_2 = -0.307726562086162$
$c_3 = -0.699563088118124$
$c_4 = 1.774129048350784$
$c_5 = 3.206003854830932$ Curve $P_5$ in FIG. 28A can be obtained as follows:

$$P_5 = \{(c_1 x^2 + c_2 x^4 + c_3 x^6 + c_4 x^8 + c_5 x^{10}), (x, -1)\}$$

In FIGS. 29A and 29B, $c_1$, $c_2$, $C_3$, $c_4$, $c_5$, and $c_6$ are shown as follows:
$c_1 = -0.519076679796795$
$c_2 = -0.831509074620663$
$c_3 = 0.553755848546272$
$c_4 = 1.014426983095962$
$c_5 = 1.313237340598540$
$c_6 = 1.770200577167844$ Curve $P_6$ in FIG. 29A can be obtained as follows:

$$P_6 = \{(c_1 x^2 + c_2 x^4 + c_3 x^6 + c_4 x^8 + c_5 x^{10} + C_6 x^{12}), (x, -1, 1)\}$$

Figure 30A:
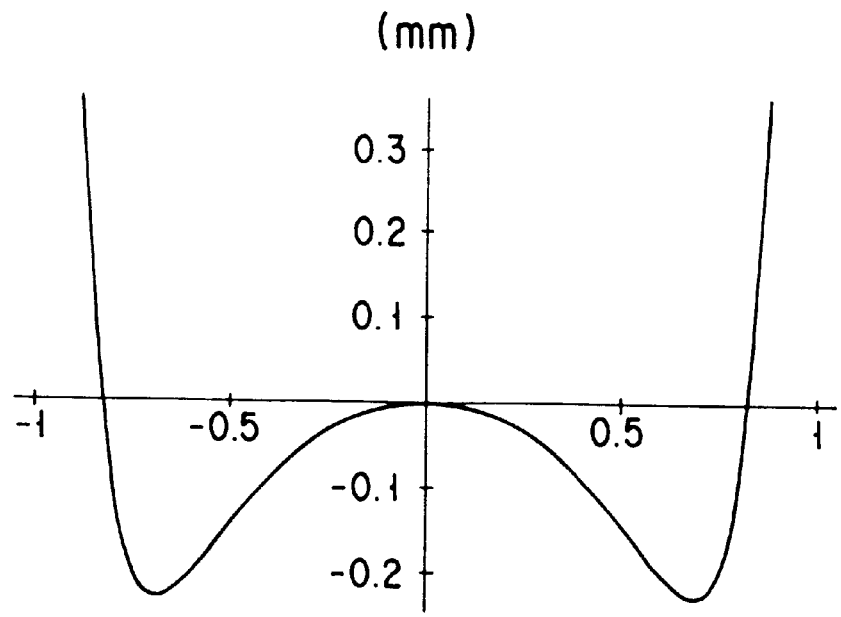
FIGS. 30A and 30B are graphs each showing a form of a wave-surface aberration and a corresponding amount of defocus when the spherical aberration is optimized to minimize the maximum beam diameter within the amount of defocus of ±2.9 mm spherical aberration of Table 3 to the fourteenth/degree.
Figure 30B:
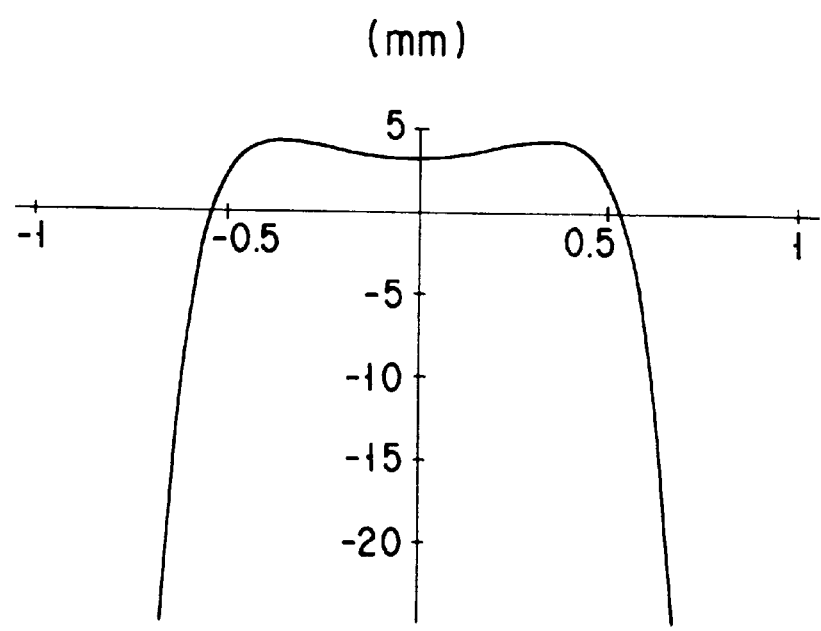

In FIGS. 30A and 30B, $c_1$, $c_2$, $c_3$, $c_4$, $c_5$, $c_6$, and $c_7$ are shown as follows:
$c_1 = -0.507800431424249$
$c_2 = -0.388376123162095$
$c_3 = 0.366157207180402$
$c_4 = 0.433944380660281$
$c_5 = 0.655750585204756$
$c_6 = 1.104614195605661$
$c_7 = 1.615135888818497$ Curve $P_7$ in FIG. 30A can be obtained as follows:

$$P_7 = \{(c_1 x^2 + c_2 x^4 + c_3 x^6 + c_4 x^8 + c_5 x^{10} + C_6 x^{12} + c_7 x^{14}), (x, -1, 1)\}$$

In FIGS. 31A and 31B, $c_1$, $c_2$, $C_3$, $c_4$, $c_5$, $c_6$, and $c_7$ are shown as follows:
$c_1 = -0.422615757350724$
$c_2 = -0.346786191715331$
$c_3 = 0.322282923310823$
$c_4 = 0.396397953991157$
$c_5 = 0.392181124779868$
$c_6 = 0.639157455530054$
$c_7 = 0.968726875224168$
$c_8 = 1.311991087479074$ Curve $P_8$ in FIG. 31A can be obtained as follows:

$$P_7 = \{(c_1 x^2 + c_2 x^4 + c_3 x^6 + c_4 x^8 + c_5 x^{10} + C_6 x^{12} + c_7 x^{14} + c_8 x^{16}), (x, -1, 1)\}$$

From each graph, the wave surface aberration becomes smaller as the wave surface aberration is separated from the central portion, and the wave surface aberration is gradually increased at the peripheral portion to obtain a large value.

The relationship between a geometrical aberration and the wave surface aberration satisfies the following equation:

$$\delta y \propto -\alpha \frac{\partial w}{\partial x} \quad (11)$$

Therefore, the above point shows that the image forming position (wave surface aberration) of the beam close to the main beam is defined at the object point than the image surface and that the image forming position (wave surface aberration) of the beam close to the outermost beam is defined in the image surface area and the direction opposite to the object point (+side shows the direction of the object).

As mentioned above, if a predetermined spherical aberration, e.g., $x^{16}$ (sixteenth) is given to the finite lens, the maximum beam diameter can be controlled to 62.60 $\mu$m within the amount of defocus of ±2.9 mm.

FIG. 32 shows that the beam waist diameter of the Gaussian (distribution) beam having no aberration is changed to obtain the variation of the maximum beam diameter within the amount of defocus of ±2.9 mm.

As is obvious from FIG. 32, in the Gaussian (distribution) beam having no aberration, the maximum beam diameter can be controlled to less than 100 $\mu$m within the amount of defocus of ±2.9 mm.

Therefore, as in the multi-beam exposer unit explained with reference to FIG. 22, the optimized wave surface aberration is given to the finite lens for providing a predetermined convergency to the laser beam from the laser. Thereby, the beam diameter can be prevented from being enlarged at the defocus time.

Figure 33:
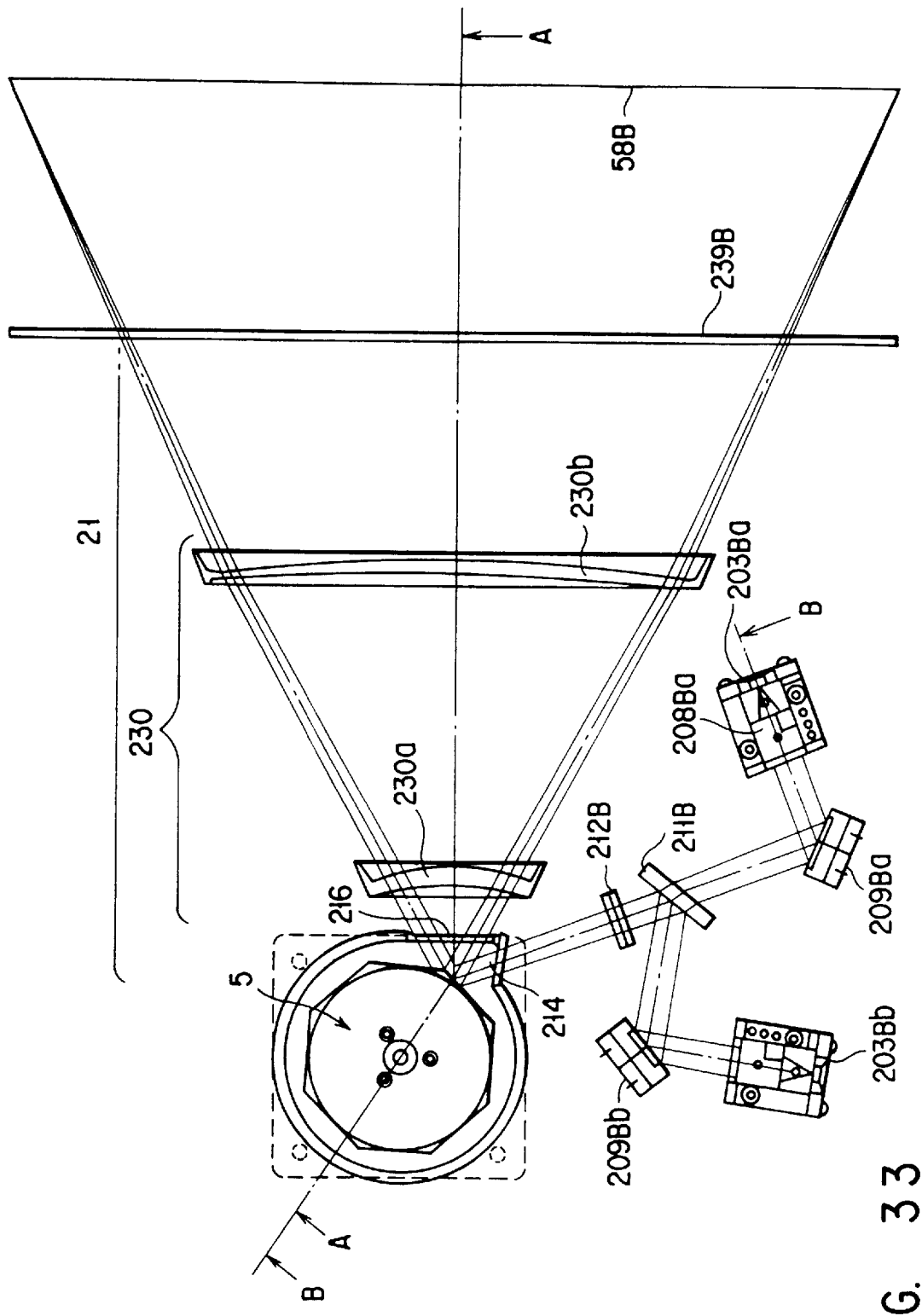
FIG. 33 is a schematic plain view showing an example in which the finite lens used in the multi-beam exposer unit of FIG. 22 is applied to the multi-beam exposer unit for a non-color.

FIGS. 33 to 35 show an example in which the finite lenses used in the multi-beam exposer unit of FIG. 22 is applied to the multi-beam exposer for a single color (monochrome). In this case, i (number of laser beams in the light source)=2, and M (number of light sources)=1. The same reference numerals are added to the same structure as the structure of FIGS. 2 and 3 or FIGS. 22, and the specific explanation is omitted.

As shown in FIGS. 33 to 35, a multi-beam exposer unit 201 comprising only first and second black laser elements 203Ba and 203Bb and a light source 203 for monochrome.

The multi-beam exposer unit 201 further comprises a pre-deflection optical system 207a, a post-deflection optical system 21, first and second finite focal lenses 208Ba, 208Bb, and a half mirror 211. The pre-deflection optical system 207a is provided between the first laser 203Ba and the polygon mirror unit 5 to set the cross section beam shape of the laser beam LBa from the laser 203Ba to a predetermined shape. The pre-deflection optical system 207a is provided between the second laser 203Bb and the polygon mirror unit 5 to set the cross section beam shape of the laser beam LBb from the laser 203Bb to a predetermined shape. Each of the first and second finite focal lenses 208Ba and 208Bb, which is positioned to be integral with each of lasers 203Ba and 203Bb, provides a predetermined convergence to each of the laser beams LBa and LBb emitted from each laser. The half mirror 211 is used to put together the laser beams LBa and LBb as one light beam. Pre-deflection optical systems 207Ba and 207Bb can be differentiated by checking whether or not the respective pre-deflection optical systems 207Ba and 207Bb are transmitted through a half mirror 211, or whether or not the respective pre-deflection optical systems 207Ba and 207Bb are reflected by the half mirror 211.

The cylinder lens 12B, holding member 15, and dust prevention glass 214 are provided between the half mirror 211 and the polygon mirror unit 5. The cylinder lens 12B further converges the laser beam LB synchronized by the half mirror 211 in only the sub-scanning direction. The holding member 15 surrounds the polygon mirror unit 5. The dust prevention glass 214 is used together with the holding member 15. Thereby, the polygon mirror body 5a is sealed, and the respective laser beams LBa, and Bb are transmitted to the respective reflection surfaces of the polygon mirror body 5a.

As dust prevention glass 214, a parallel plate having the same material as the half mirror 211 (BK7) and a thickness tg of 2.5 mm is used. In the multi-beam exposer unit 201, if the direction where the half mirror 211 is inclined is +, the direction where the dust prevention glass 214 and the value are −30° from equation (6).

Similar to the explanation in FIGS. 2 and 3, and FIG. 22, the dust prevention glass 214 may be set such that the incident angle and the emission surface are inclined at a predetermined angle to the sub-scanning direction.

Next, the following will explain a second modification of the pre-deflection optical system between the light source (laser beam) and the polygon mirror unit according to the first embodiment of the present invention with reference to FIG. 36.

As explained in FIGS. 2 and 3, a multi-beam exposer unit 301 has three sets of two laser elements for each of three colors (yellow, magenta, cyan), and M set of laser elements for black. That is, the multi-beam exposer unit 301 has first to fourth light sources 303Y (having first and second yellow lasers 303Ya, 303Yb), 303M (having first and second magenta lasers 303Ma, 303Mb), 303C (having first and second cyan lasers 303Ca, 303Cb), and 303B (having first to fourth black lasers 303Ba, 303Bb, 303Bc, 303Bd). Just for simplifying the explanation, the following will describe the structure of the laser beams LB (black). In this case, the specific explanation of the same structure as the structure of FIGS. 2 and 3 is omitted. In this case, the finite lenses are substantially the same as the case of FIG. 22, and a post-deflection optical system 321 is substantially the same as the case of FIGS. 2 and 3. Due to this, the specific explanation is omitted.

A predetermined convergence characteristic is provided to the laser beam LBa from first black laser 303Ba by a finite focal lens 308Ba of a pre-deflection optical system 307Ba. The laser beam LBa is reflected by a mirror 309Ba, passed through a first half mirror 311B-1 and a cylinder lens 312B, and guided to each reflection mirror of the polygonal mirror body 5a.

A predetermined convergence characteristic is provided to the laser beam LBb from a second black laser 303Bb by a finite focal lens 308Bb of a pre-deflection optical system 307Bb. The laser beam LBb is reflected by a mirror 309Bb, and guided to a second half mirror 311B-2.

The laser beam LBb guided to the second half mirror 311B-2 is passed through the mirror 311B-2, reflected by the first half mirror 311B-1, and passed through a cylinder lens 312B.

A predetermined convergence characteristic is provided to the laser beam LBc from third black laser 303Bc by a finite focal lens 308Bc of a pre-deflection optical system 307Bc. The laser beam LBc is reflected by a mirror 309Bc, and guided to a third half mirror 311B-3.

The laser beam LBc guided to the third half mirror 311B-3 is passed through the mirror 311B-3, reflected by the second half mirror 311B-2 and first half mirror 311B-1 in order, and passed through a cylinder lens 312B.

A predetermined convergence characteristic is provided to the laser beam LBd from fourth black laser 303Bd by a finite focal lens 308Bd of a pre-deflection optical system 307bd. The laser beam LBd is reflected by a mirror 309Bd, and guided to third half mirror 311B-3. In this case, the laser beam LBd is reflected by only the half mirror, and the transmitted beam is not incident onto the polygon mirror unit 5. A coma aberration compensation plate 317 is provided at an arbitrary position between the third half mirror 311B-3 and the finite focal lens 308Bd, e.g., a position between the finite focal lens 308Bd and the mirror 309Bd. The coma aberration compensation plate 317 generates the same coma aberration as the comma aberration characteristic generated when each of the laser beams LBa, LBb, and LBc. The laser beam LBd guided to the third half mirror 311B-3 is passed through the coma aberration compensation plate 317, and reflected by the third half mirror 311B-3.

The laser beam LBd reflected by the third half mirror 311B-3 is reflected by the mirror 311B-3. The laser beam LBd is further guided to the second half mirror 311B-2, and guided to the first half mirror 311B-1.

The laser beam LBd guided to the first half mirror 311B-1 is further reflected by the mirror 311B-1, and guided to the cylinder lens 312B.

A holding member 315, and dust prevention glass 314 are provided between the cylinder lens 312B and the polygon mirror unit 5. The holding member 315 is surrounded around the polygon mirror unit 5. The dust prevention glass 314 is used together with the holding member 315. Thereby, the polygon mirror body 5a is sealed, and all laser beams LBa, Bb, LBc, and LBd, LYa, LYb, LMa, LMb, LCa, and LCb are transmitted to the respective reflection surfaces of the polygon mirror body 5a. The respective laser beams, to which convergence is provided to only sub-scanning direction by the cylinder lens 312B, are passed through the dust prevention glass 314, and guided to each reflection surface of the polygon mirror body 5a.

The following will specifically explain the half mirrors 311B-1, 311B-2, 311B-3, the dust prevention glass 314, and the coma aberration compensation plate 317.

The first half mirror 311B-1 is formed to have a thickness tm-1 of 5 mm. The first half mirror 311B-1 is placed to be inclined at 30° such that a portion shown by a dotted line of laser beam LBa is incident late as compared with a perpendicular incident time.

The second half mirror 311B-2 is formed to have a thickness tm-2 of 5 mm. The second half mirror 311B-2 is placed to be inclined at 30° in the same direction as the direction where the half mirror 311B-1 is inclined seeing from the beam passing through the half mirror 311B-2 such that a portion shown by a dotted line of laser beam LBb is incident late as compared with a perpendicular incident time.

The third half mirror 311B-3 is formed to have a thickness tm-3 of 5 mm. The third half mirror 311B-3 is placed to be inclined at 30° in substantially the same direction as the direction where the half mirror 311B-1 is inclined seeing from the beam passing through the half mirror 311B-3 such that a portion shown by a dotted line of laser beam LBc is incident late as compared with a perpendicular incident time.

In other words, the phases of the beams passing through the half mirrors 311B-2 and 311B-3 are symmetrical to the center of the beam. The beam passing through the half mirror 311B-3 is reflected by the half mirror 311B-2, and further reflected by the half mirror 311B-1 so as to be overlaid on the beam passed through the half mirror 311B-1. The beam passing through the half mirror 311B-2 is reflected by only the half mirror 311B-1 so as to be overlaid on the beam passed through the half mirror 311B-1. That is, the beam passing through the half mirror 311B-2 must be placed to have an opposite phase to the beam passing through the half mirror 311B-3.

The coma aberration compensation plate 317 is formed of substantially the same material as each of the half mirrors 311B, e.g., thickness tp of 5 mm (BK7). The coma aberration compensation plate 317 is placed to be inclined at 30° such that a portion shown by a dotted line of laser beam LBd is incident late as compared with a perpendicular incident time. In other words, the respective first to third laser beams LBa, LBb, and LBc are passed through the half mirror only one time until being made incident on the cylinder lens 312. The fourth laser beam LBd is guided to the cylinder lens 312 without transiting through the parallel plate. Therefore, the fourth laser beam LBd is transmitted through the parallel plate having the characteristic corresponding to the half mirror so as to provide the coma aberration, which is equal to the coma aberration, which is provided to each of the first to third laser beams LBa, LBb, LBc from each of the half mirror. Thereby, all coma aberrations are equal.

The dust prevention glass 314 is formed of the material, which is equal to the material of each half mirror (e.g. BK7), to have a thickness tg of 5 mm. The dust prevention glass 314 is placed to be inclined at 30° such that a portion shown by a dotted line, of the laser beam is incident early as compared with a perpendicular incident time. The dust prevention glass 314 may be formed of the wedge plate, which is slightly inclined in the sub-scanning direction as in the other explained examples.

Next, the following will specifically explain the advantage, which is brought about by the dust prevention glass 314. In this case, just for comparison, the image forming characteristics of this first modification are shown on the same scale in each of the graphs of FIGS. 4 to 6, FIGS. 7 to 9, and FIGS. 10 to 12 showing the image forming characteristics of the first embodiment.

In each of FIGS. 4 to 6 (the image forming characteristic of the laser beam LYa from the first yellow laser 3Ya is shown, and the emission laser beam LBa from the first black laser 3Ba has the characteristic, which is substantially equal to the first yellow laser 3Ya), a curve DYMAXg shows the change of the maximum beam diameter of the main scanning direction. A curve DYMINg shows the change of the minimum beam diameter of the main scanning direction. A curve DZMAXg shows the change of the maximum beam diameter of the sub-scanning direction. A curve DZMINg shows the change of the minimum beam diameter of the sub-scanning direction. A curve FLRYMAXg shows the change of the maximum amount of flare of the main scanning direction. A curve FLRZMAXg shows the change of the maximum amount of flare of the sub-scanning direction. FIGS. 7 to 9 show the characteristic of the laser beam LMa from the first magenta laser 303Ma, which is omitted in the figure, under the same condition as FIGS. 4 to 6. FIGS. 10 to 12 show the characteristic of the laser beam LCa from the first cyan laser 303Ca, which is omitted in FIG. 36, under the same condition as FIGS. 4 to 6. Since the marks of the curves of these figures are the same as the cases of FIGS. 4 to 6, the specific explanation is omitted.

As is obvious from FIGS. 4 to 6, FIGS. 7 to 9, and FIGS. 10 to 12, according to the multi-beam exposer unit 301 of FIG. 36, the image forming characteristic of the main scanning direction, which has room to be improved in the first embodiment (FIGS. 2 and 3), can be improved. Also, the amount of flare can be entirely improved in both main and sub-scanning directions.

Figure 37:
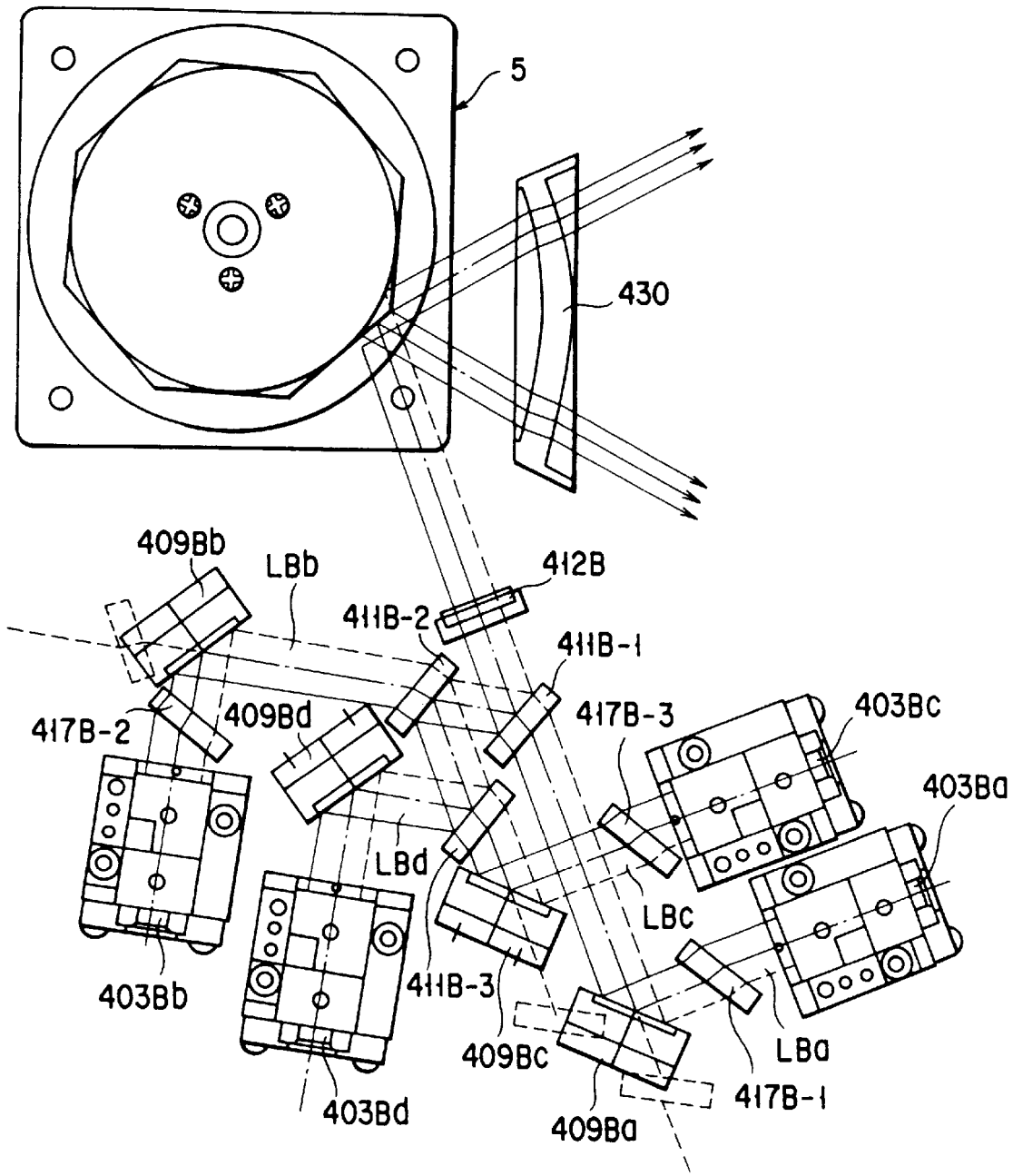
FIG. 37 is a schematic plain view showing a third modification of the pre-deflection optical system of the optical scanning device of FIGS. 2 and 3.

Next, the following will explain a third modification of the pre-deflection optical system between the light source (laser beam) and the polygon mirror unit according to the first embodiment of the present invention with reference to FIG. 37.

As explained in FIGS. 2 and 3, a multi-beam exposer unit 401 has three sets of two laser elements for each of three colors (yellow, magenta, cyan), and M set of laser elements for black. That is, the multi-beam exposer unit 401 has first to fourth light sources 403Y (having first and second yellow lasers 403Ya, 403Yb), 403M (having first and second magenta lasers 403Ma, 403Mb), 403C (having first and second cyan lasers 403Ca, 403Cb), and 403B (having first to fourth black lasers 403Ba, 403Bb, 403Bc, 403Bd). Just for simplifying the explanation, the following will describe the structure of the laser beams LB (black). In this case, the specific explanation of the same structure as the structure of FIGS. 2 and 3, FIG. 22, and 36 is omitted. In this case, the finite lenses are substantially the same as the case of FIG. 22, and a post-deflection optical system 321 is substantially the same as the case of FIGS. 2 and 3. Due to this, the specific explanation is omitted.

A predetermined convergence characteristic is provided to the laser beam LBa from first black laser 403Ba by a finite focal lens 408Ba of a pre-deflection optical system 407Ba. The laser beam LBa is passed through a coma aberration compensation plate 417B-1, and guided to a mirror 409Ba. The laser guided to the mirror 409Ba is passed through a first half mirror 411B-1 and a cylinder lens 412B, and guided to each reflection mirror of the polygonal mirror body 5a.

A predetermined convergence characteristic is provided to the laser beam LBb from second black laser 403Bb by a finite focal lens 408Bb of a pre-deflection optical system 407Bb. The laser beam LBb is passed through a coma aberration compensation plate 417B-2, and guided to the mirror 409Bb. The laser beam Bb guided to the mirror 409Bb is reflected by the mirror 409Bb, and guided to a second half mirror 411B-2.

The laser beam LBb guided to the second half mirror 411B-2 is passed through the mirror 411B-2, reflected by the first half mirror 411B-1, and passed through a cylinder lens 412B.

A predetermined convergence characteristic is provided to the laser beam LBc from third black laser 403Bc by a finite focal lens 408Bc of a pre-deflection optical system 407Bc. The laser beam LBc is passed through a coma aberration compensation plate 417B-3 and reflected by a mirror 409Bc, and guided to a third half mirror 411B-3.

The laser beam LBc guided to the third half mirror 411B-3 is passed through the mirror 411B-3, reflected by the second half mirror 411B-2 and first half mirror 411B-1 in order, and passed through a cylinder lens 412B.

A predetermined convergence characteristic is provided to the laser beam LBd from fourth black laser 403Bd by a finite focal lens 408Bd of a pre-deflection optical system 407bd. The laser beam LBd is reflected by the mirror 409Bd, third half mirror 411B-3, second half mirror 411B-2, and first half mirror 411B-1 so as to be made incident on the cylinder lens 412. Therefore, the laser beam LBd from the laser 403Bd is guided to the polygon mirror unit 5 without being passed through the coma aberration compensation plate and the half mirror.

The following will specifically explain the coma aberration compensation plates 417B-1, 417B-2, 417B-3, and the half mirrors 411B-1, 411B-2, and the 411B-3.

The first coma aberration compensation plate 417B-1 is formed to have a thickness tp-1 of 5 mm. The first coma aberration compensation plate 417B-1 is placed to be inclined at 30 to a direction where a portion shown by a dotted line of laser beam LBa is incident early as compared with a perpendicular incident time.

The second coma aberration compensation plate 417B-2 is formed to have a thickness tp-2 of 5 mm. The second coma aberration compensation plate 417B-2 is placed to be inclined at 30° to a direction where a portion shown by a dotted line of laser beam LBb is incident early as compared with a perpendicular incident time, that is, the same direction as the direction where the first coma aberration compensation plate 417B-1 is inclined, seeing from the transmission beam.

The third coma aberration compensation plate 417B-3 is formed to have a thickness tp-3 of 5 mm. The third coma aberration compensation plate 417B-3 is placed to be inclined at 30° to a direction where a portion shown by a dotted line of laser beam LBc is incident early as compared with a perpendicular incident time, that is, the same direction as the direction where the first coma aberration compensation plate 417B-1 is inclined.

The first half mirror 411B-1 is formed to have a thickness tm-1 of 5 mm. The first half mirror 411B-1 is placed to be inclined at 30° to a direction where a portion shown by a dotted line of laser beam LBa passing therethrough is incident late as compared with a perpendicular incident time. Therefore, the laser beam LBa emitted from the laser 403Ba is transmitted through the coma aberration compensation plate 417B-1 and the half mirror 411B-1, which are inclined to the opposite direction to each other, and guided to the polygon mirror unit 5. In this case, to clarify the inclination of the coma aberration compensation plate 417B-1 and the half mirror 411B-1, the beam passing through the coma aberration compensation plate 417B-1 is shown as a straight line by a dotted line in a state that the mirror 409Ba is omitted.

The second half mirror 411B-2 is formed to have a thickness tm-2 of 5 mm. The first half mirror 411B-2 is placed to be inclined at 30° to a direction where a portion shown by a dotted line of laser beam LBb is incident late as compared with a perpendicular incident time, that is, the same direction as the direction where the first half mirror 411B-1 is inclined. Therefore, the laser beam LBb emitted from the laser 403Bb is transmitted through the coma aberration compensation plate 417B-2 and the half mirror 411B-2, which are inclined to the opposite direction to each other, and guided to the polygon mirror unit 5. In this case, to clarify the inclination of the coma aberration compensation plate 417B-2 and the half mirror 411B-2, the beam passing through the coma aberration compensation plate 417B-2 is shown as a straight line by a dotted line in a state that the mirror 409Bb is omitted.

The second half mirror 411B-3 is formed to have a thickness tm-3 of 5 mm. The first half mirror 411B-3 is placed to be inclined at 30° to a direction where a portion shown by a dotted line of laser beam LBc is incident late as compared with a perpendicular incident time, that is, the same direction as the direction where the first half mirror 411B-1 is inclined. Therefore, the laser beam LBc emitted from the laser 403Bc is transmitted through the coma aberration compensation plate 417B-3 and the half mirror 411B-3, which are inclined to the opposite direction to each other, and guided to the polygon mirror unit 5. In this case, to clarify the inclination of the coma aberration compensation plate 417B-3 and the half mirror 411B-3, the beam passing through the coma aberration compensation plate 417B-3 is shown as a straight line by a dotted line in a state that the mirror 409Bc is omitted.

Next, the following will specifically explain the advantages, which are brought about by the multi-beam exposer unit 401 of FIG. 37.

According to the multi-beam exposer unit 401, the respective laser beams guided to the polygon mirror unit 5 are passed through each coma aberration compensation plate and each half mirror, which are inclined to be opposite to each other. The image forming characteristic of the main scanning direction, which has room to be improved in the first embodiment (FIGS. 2 and 3), can be improved. Also, the amount of flare can be improved in both the main and sub-scanning directions. In this case, just for comparison, the image forming characteristics of this first modification are shown on the same scale in each of the graphs of FIGS. 4 to 6, FIGS. 7 to 9, and FIGS. 10 to 12 showing the image forming characteristics of the first embodiment.

In each of FIGS. 4 to 6 (the image forming characteristic of the laser beam LYa from the first yellow laser 3Ya is shown, and the emission laser beam LBa from the first black laser 3Ba has the characteristic, which is substantially equal to the first yellow laser 3Ya), a curve DYMAXh shows the change of the maximum beam diameter of the main scanning direction. A curve DYMINh shows the change of the minimum beam diameter of the main scanning direction. A curve DZMAXh shows the change of the maximum beam diameter of the sub-scanning direction. A curve DZMINh shows the change of the minimum beam diameter of the sub-scanning direction. A curve FLRYMAXh shows the change of the maximum amount of flare of the main scanning direction. A curve FLRZMAXh shows the change of the maximum amount of flare of the sub-scanning direction. FIGS. 7 to 9 show the characteristic of the laser beam LMa from the first magenta laser 3Ma, which is omitted in the figure, under the same condition as FIGS. 4 to 6. FIGS. 10 to 12 show the characteristic of the laser beam LCa from the first cyan laser 3Ca, which is omitted in FIG. 37, under the same condition as FIGS. 4 to 6. Since the marks of the curves of these figures are the same as the cases of FIGS. 4 to 6, the specific explanation is omitted.

Next, the following will explain a fourth modification of the pre-deflection optical system between the light source (laser beam) and the polygon mirror unit according to the first embodiment of the present invention with reference to FIG. 38.

As explained in FIGS. 2 and 3, a multi-beam exposer unit 501 has three sets of two laser elements for each of three colors (yellow, magenta, cyan), and M sets of laser elements for black. That is, the multi-beam exposer unit 501 has first to fourth light sources 503Y (having first and second yellow lasers 503Ya, 503Yb), 503M (having first and second magenta lasers 503Ma, 503Mb), 503C (having first and second cyan lasers 503Ca, 503Cb), and 503B (having first to fourth black lasers 503Ba, 503Bb, 503Bc, 503Bd). Just for simplifying the explanation, the following will describe the structure of the laser beams LB (black). In this case, the specific explanation of the same structure as the structure of FIGS. 2 and 3, FIG. 22, is omitted. In this case, the finite lenses are substantially the same as the case of FIG. 22, and a post-deflection optical system 321 is substantially the same as the case of FIGS. 2 and 3. Due to this, the specific explanation is omitted.

A predetermined convergence characteristic is provided to the laser beam LBa from first black laser 503Ba by a finite focal lens 508Ba of a pre-deflection optical system 507Ba. The laser beam LBa is reflected by the mirror 509Ba, passed through a first half mirror 511B-1 and a cylinder lens 512B, and guided to each reflection mirror of the polygonal mirror body 5a.

A predetermined convergence characteristic is provided to the laser beam LBb from second black laser 503Bb by a finite focal lens 508Bb of a pre-deflection optical system 507Bb. The laser beam LBb is reflected by the mirror 509Bb, and guided to a second half mirror 511B-2. The laser beam LBb guided to the second half mirror 511B-2 is passed through the mirror 511B-2, reflected by the first half mirror 511B-1, and passed through the cylinder lens 512B.

A predetermined convergence characteristic is provided to the laser beam LBc from third black laser 503Bc by a finite focal lens 508Bc of a pre-deflection optical system 507Bc. The laser beam LBc is reflected by the mirror 509Bc, and guided to a third half mirror 511B-3. The laser beam LBc guided to the third half mirror 511B-3 is passed through the mirror 51B-3, reflected by the second half mirror 511B-2 and the first half mirror 511B-1 in order, and passed through the cylinder lens 512B.

A predetermined convergence characteristic is provided to the laser beam LBb from fourth black laser 503Bd by a finite focal lens 508Bd of a pre-deflection optical system 507Bd. The laser beam LBd is reflected by the mirror 509Bd, and guided to the third half mirror 511B-3. The laser beam LBd guided to the third half mirror 511B-3 is reflected by the mirror 511B-3, further reflected by the second half mirror 511B-2, and guided to the first half mirror 511B-1.

The laser beam LBd guided to the first half mirror 511B-1 is reflected by the mirror 511B-1 to be incident on the cylinder lens 512B.

A holding member 515, and dust prevention glass 514 are provided between the cylinder lens 512B and the polygon mirror unit 5. The holding member 515 surrounds the polygon mirror unit 5. The dust prevention glass 514 is used together with the holding member 515. Thereby, the polygon mirror body 5a is sealed, and all laser beams LBa, Bb, LBc, and LBd, LYa, LYb, LMa, LMb, LCa, and LCb are transmitted to the respective reflection surfaces of the polygon mirror body 5a. The respective laser beams, to which convergence is provided to only the sub-scanning direction by the cylinder lens 512B, are passed through the dust prevention glass 514, and guided to each reflection surface of the polygon mirror body 5a.

The following will specifically explain the half mirrors 511B-1, 511B-2, 511B-3, and the dust prevention glass 514.

The first half mirror 511B-1 is formed to have a thickness tm-1 of 5 mm. The first half mirror 511B-1 is placed to be inclined at 30° such that a portion shown by a dotted line of laser beam LBa is incident late as compared with a perpendicular incident time.

The second half mirror 511B-2 is formed to have a thickness tm-2 of 5 mm. The second half mirror 511B-2 is placed to be inclined at 30° in the same direction as the direction where the half mirror 511B-1 is inclined such that a portion shown by a dotted line of laser beam LBb is incident late as compared with a perpendicular incident time.

The third half mirror 511B-3 is formed to have a thickness tm-3 of 5 mm. The third half mirror 511B-3 is placed to be inclined at 30° in substantially the same direction as the direction where the half mirror 511B-1 is inclined such that a portion shown by a dotted line of laser beam LBc is incident late as compared with a perpendicular incident time.

The dust prevention glass 514 is formed of the material, which is equal to the material of each of half mirrors 511B-1, 511B-2, 511B-3 (e.g. BK7), to have a thickness tg of 2.5 mm. The dust prevention glass 514 is placed to be inclined at 30° in the direction, which is opposite to the direction where the first half mirror 511B-1 is inclined, that is, the direction where a portion shown by a dotted line of laser beam is incident early as compared with a perpendicular incident time. In other words, the dust prevention glass 514 is placed between the polygon mirror body 5a and the cylinder lens 512 to satisfy equation (6). The dust prevention glass 514 may be formed of the wedge plate, which is slightly inclined in the sub-scanning direction as in the other explained examples.

The image forming characteristic, which is obtained by the dust prevention glass 514, substantially conforms to the image forming characteristic, which is obtained by the multi-beam exposed unit 301 of FIG. 36. Due to this, the specific explanation is omitted. Specifically, in FIGS. 4 to 6, FIGS. 7 to 9, and FIGS. 10 to 12, a curve DYMAXhg shows the change of the maximum beam diameter of the main scanning direction. A curve DYMINg shows the change of the minimum beam diameter of the main scanning direction. A curve DZMAXg shows the change of the maximum beam diameter of the sub-scanning direction. A curve DZMINg shows the change of the minimum beam diameter of the sub-scanning direction. A curve FLRYMAXg shows the change of the maximum amount of flare of the main scanning direction. A curve FLRZMAXg shows the change of the maximum amount of flare of the sub-scanning direction.

Figure 39:
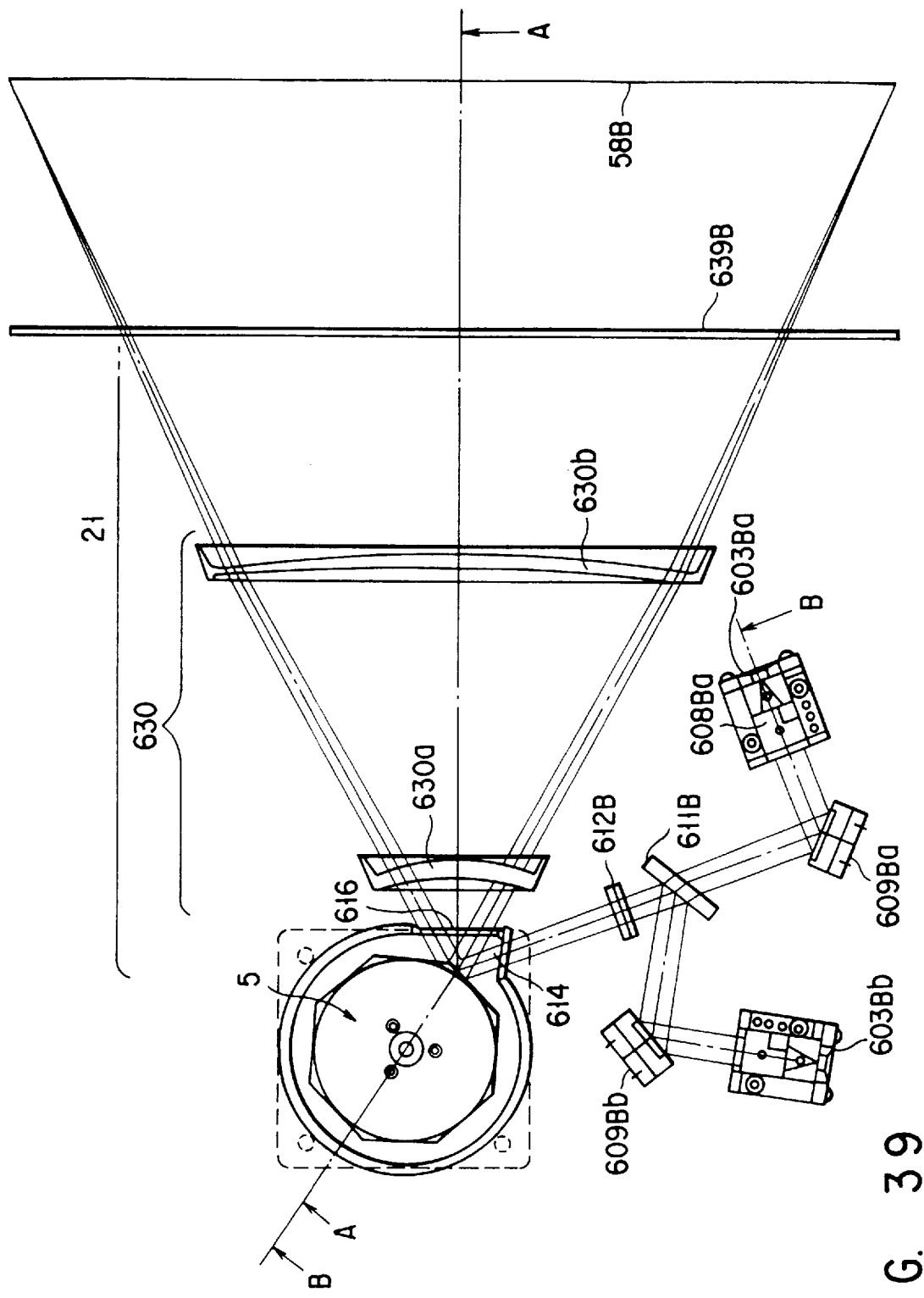
FIG. 39 is a schematic plain view showing a second embodiment of the pre-deflection optical system of the optical scanning device of FIGS. 2 and 3.

Next, the following will specifically explain a first modification of the post-deflection optical system of the second embodiment with reference to FIG. 39. In this case, Tables 4 and 5 show the specific characteristics.

As shown in FIG. 39, a post-deflection optical system of a multi-beam exposer unit 601 has a set of image forming lenses 630 including first and second image forming lenses 630a and 630b, and having optical characteristics and shapes as shown in the following Tables 4 and 5 and equation (8). Each of the image forming lenses 630a and 630b is placed at a predetermined position, which is defined such that the distance from the reflection point of each reflection surface of the polygon mirror body is shorter than the distance from the image surface.

TABLE 4

| Post-deflection optical system | | absolute coordinates: Decentering in y direction −4.333 | | |
|---|---|---|---|---|
| curvature | | | lens surface | |
| CUY | CUZ | Thickness | number | material |
| 0.0191994 | −0.01398596 | −35.435 | 1 | air |
| 0.0203530 | 0.017623888 | −6.524 | 2 | PMMA |
| 0.00207745 | −0.007525851 | −106.530 | 3 | air |
| 0.00193020 | 0.014554485 | −6.0077405 | 4 | PMMA |
| plane | plane | −9.0000 | | air |
| plane | plane | −2.000 | | BK7 |
| plane | plane | −164.000 | | air |

TABLE 5

Lens surface number: 1

| n\m | 0 | 1 | 2 | 3 | 4 | 5 |
|---|---|---|---|---|---|---|
| 0 | 0.000E + 00 | −1.024E − 01 | 0.000E + 00 | 4.199E − 05 | −4.956E − 06 | −8.504E − 09 |
| 1 | 0.000E + 00 | −1.946E − 04 | 2.901E − 06 | 3.304E − 07 | 1.117E − 08 | −8.850E − 10 |
| 2 | −1.117E − 04 | −6.301E − 06 | −4.111E − 08 | 5.560E − 08 | −3.078E − 09 | 3.062E − 11 |
| 3 | 1.011E − 05 | 2.747E − 07 | −8.713E − 10 | −2.335E − 09 | 1.490E − 10 | −1.090E − 12 |
| 4 | −2.274E − 07 | −4.250E − 09 | −1.708E − 10 | 3.997E − 11 | −1.133E − 12 | 0.000E + 00 |

| n\m | 6 | 7 | 8 | 9 | 10 | |
|---|---|---|---|---|---|---|
| 0 | −1.003E − 10 | 3.167E − 11 | −5.521E − 13 | −1.391E − 14 | 5.931E − 16 | |
| 1 | 6.295E − 12 | −5.949E − 13 | 1.447E − 14 | 9.629E − 16 | −2.351E − 17 | |
| 2 | 4.215E − 12 | −2.093E − 13 | 4.220E − 15 | −2.127E − 16 | 5.852E − 18 | |
| 3 | −9.385E − 14 | −5.320E − 15 | −1.699E − 16 | 3.985E − 17 | −8.949E − 19 | |
| 4 | 0.000E + 00 | 0.000E + 00 | 0.000E + 00 | 0.000E + 00 | 0.000E + 00 | |

Lens surface number: 2

| n\m | 0 | 1 | 2 | 3 | 4 | 5 |
|---|---|---|---|---|---|---|
| 0 | 0.000E + 00 | −1.099E − 01 | 0.000E + 00 | 2.775E − 05 | −4.312E − 06 | 7.028E − 09 |
| 1 | 0.000E + 00 | −1.800E − 04 | 3.170E − 07 | 3.155E − 07 | −1.710E − 09 | −4.400E − 10 |
| 2 | −2.347E − 05 | −6.470E − 06 | −8.468E − 09 | 4.092E − 08 | −7.745E − 10 | −1.563E − 11 |
| 3 | −3.233E − 06 | 3.825E − 07 | −5.645E − 09 | −2.683E − 09 | 9.429E − 11 | 3.540E − 12 |
| 4 | −1.497E − 05 | 5.495E − 02 | 1.268E − 06 | −1.386E − 05 | 2.156E − 06 | −2.284E − 08 |

| n\m | 6 | 7 | 8 | 9 | 10 | |
|---|---|---|---|---|---|---|
| 0 | −6.980E − 10 | 1.143E − 11 | −1.355E − 13 | −3.441E − 15 | 2.118E − 16 | |
| 1 | 1.821E − 11 | −6.661E − 13 | 8.933E − 15 | −2.343E − 16 | 8.749E − 18 | |
| 2 | −1.504E − 12 | −2.969E − 14 | 2.727E − 15 | 1.337E − 16 | −4.583E − 18 | |
| 3 | −3.149E − 14 | −7.475E − 15 | 2.478E − 17 | 3.870E − 18 | 6.668E − 21 | |
| 4 | 2.167E − 09 | −3.695E − 11 | 4.422E − 13 | 9.386E − 15 | −6.004E − 16 | |

Lens surface number: 3

| n\m | 0 | 1 | 2 | 3 | 4 | 5 |
|---|---|---|---|---|---|---|
| 0 | 0.000E + 00 | 1.296E − 02 | 0.000E + 00 | −3.605E − 06 | −1.849E − 07 | 2.323E − 10 |
| 1 | 0.000E + 00 | −2.439E − 05 | 6.051E − 07 | −1.086E − 09 | 8.291E − 11 | 3.939E − 14 |

TABLE 5-continued

| | | | | | | |
|---|---|---|---|---|---|---|
| 2 | −6.396E − 06 | −3.822E − 08 | 6.691E − 11 | 1.398E − 11 | −8.191E − 15 | −4.383E − 16 |
| 3 | 1.785E − 09 | 1.367E − 10 | 2.198E − 12 | 5.493E − 14 | −4.323E − 16 | 2.107E − 18 |
| 4 | 1.431E − 10 | −5.451E − 13 | −2.146E − 14 | 2.674E − 18 | −5.170E − 18 | 0.000E + 00 |

| n\m | 6 | 7 | 8 | 9 | 10 |
|---|---|---|---|---|---|
| 0 | 1.594E − 11 | 2.401E − 14 | −7.621E − 16 | 1.189E − 18 | −1.349E − 20 |
| 1 | −1.416E − 14 | 6.108E − 17 | −5.136E − 19 | 1.941E − 21 | 1.858E − 23 |
| 2 | 2.442E − 17 | −6.388E − 19 | 1.625E − 21 | 3.775E − 23 | −1.673E − 25 |
| 3 | 1.372E − 19 | −5.140E − 22 | 6.187E − 24 | −2.356E − 26 | −1.057E − 27 |
| 4 | 0.000E + 00 | 0.000E + 00 | 0.000E + 00 | 0.000E + 00 | 0.000E + 00 |

Lens surface number: 4

| n\m | 0 | 1 | 2 | 3 | 4 | 5 |
|---|---|---|---|---|---|---|
| 0 | 0.000E + 00 | 7.011E − 03 | 0.000E + 00 | −4.689E − 06 | −3.578E − 08 | 4.162E − 10 |
| 1 | 0.000E + 00 | −1.836E − 05 | 3.311E − 07 | −2.139E − 09 | 4.244E − 11 | 1.662E − 13 |
| 2 | −7.224E − 06 | −3.965E − 08 | 2.930E − 10 | 1.361E − 11 | 1.098E − 15 | −1.857E − 15 |
| 3 | −1.843E − 09 | 8.047E − 11 | 1.719E − 13 | 5.319E − 14 | 2.651E − 16 | 3.381E − 18 |
| 4 | 1.054E − 10 | −3.327E − 13 | −5.079E − 16 | 3.219E − 17 | −7.436E − 18 | 0.000E + 00 |

| n\m | 6 | 7 | 8 | 9 | 10 |
|---|---|---|---|---|---|
| 0 | 2.683E − 12 | −1.290E − 14 | 3.640E − 16 | 4.272E − 18 | −6.504E − 20 |
| 1 | 3.689E − 16 | 8.861E − 18 | −1.510E − 18 | 9.122E − 21 | −5.947E − 24 |
| 2 | 2.850E − 18 | −5.879E − 20 | 3.260E − 21 | −1.337E − 23 | −9.839E − 26 |
| 3 | 8.933E − 20 | −5.736E − 22 | −4.127E − 24 | −5.205E − 26 | 5.705E − 28 |
| 4 | 0.000E + 00 | 0.000E + 00 | 0.000E + 00 | 0.000E + 00 | 0.000E + 00 |

FIGS. 40 to 42 are graphs showing a state that the laser beam LC is image-formed by a post-deflection optical system 621 to which the optical characteristics of Tables 4 and 5 are provided. Similar to the case explained in FIGS. 10 to 12, each graph shows that the first image forming lens 630a or the second image forming lens 630b, or both lenses are intentionally detached, so that the image forming characteristic is improved. The specific explanation of each of the laser beams LB, LY, and LM is omitted since the results, which are similar to the second embodiment shown in FIGS. 13 to 15 and FIGS. 16 to 18, can be obtained.

FIG. 40 is a graph showing the relationship between an amount of defocus (change of image-formation position) of the main scanning direction and the position of the main scanning direction in a state that the image forming lenses 630 are detached in connection with the laser beams LM (LMa and LMb are arrayed to have a predetermined distance in the sub-scanning direction). In this case, a curve FSY0 shows that each of first and second image forming lenses 630a and 630b is detached. A curve FSY1 shows that only the second image forming lens 630b is detached (only the first image forming lens 630a is used). A curve FSY2 corresponds to a state that each of the first and second lenses 630a and 630b is set.

FIG. 41 is a graph showing the relationship between an amount of defocus of the sub-scanning direction and the position of the main scanning direction in a state that the image-forming lens is detached in connection with the laser beams LM.

In this case, a curve FSZ0 shows that each of first and second image forming lenses 630a and 630b is detached. A curve FSZ1 shows that only the second image forming lens 630b is detached (only the first image forming lens 630a is used). A curve FSZ2 corresponds to a state that each of the first and second lenses 630a and 630b is set.

FIG. 42 is a graph showing the relationship between an amount of a beam position correction, which includes a difference between an actual position of the image-forming in the main scanning direction and a logical position of the image formation, and the position of the main scanning direction in connection with the laser beams LM. In this case, a curve Y0 shows that each of first and second image forming lenses 630a and 630b is detached. A curve Y1 shows that only the second image forming lens 630b is detached (only the first image forming lens 630a is used). A curve Y2 corresponds to a state that each of the first and second lenses 630a and 630b is set.

As shown in FIG. 40, if each of first and second image forming lenses 630a and 630b is detached, the laser beam emitted from the light source is image-formed on a portion further than the image surface with respect to the main scanning direction by the pre-deflection optical system 607 (FSY0). If only the first image forming lens 630a is inserted, the laser beam, which passes through a portion close to the center of the image forming lens 630a, is image-formed on a portion close to the polygon mirror unit 5 than FY0. The laser beam, which passes through a portion close the end portion of the image forming lens 630a, is image-formed on a portion opposite to the polygon mirror unit 5 than FSY0. In other words, at the portion close to the center of the lens, the first image forming lens 630a has power with which the image forming position of the main scanning direction can be moved to the polygon mirror unit. At the portion close to the end portion of the lens, the first image forming lens 630a has a function of moving the image forming position to the portion opposite to the polygon mirror unit (FSY1).

If the second image forming lens 630b is set, the laser beam, which passes through a portion close to the center of the image forming lens 630a, and the laser beam, which passes through a portion close the end portion of the image forming lens 630a, are substantially linearly image-formed on a predetermined image surface, respectively. In other words, at the portion close to the center of the lens, the second image forming lens 630b has power with which the image forming position of the main scanning direction can be moved to a portion to the polygon mirror unit. At the portion close to the end portion of the lens, the second image forming lens 630b has a greater function of moving the image forming position to the polygon mirror unit. In other words, the second image forming lens 630*b* is formed to have power, which is increased as the lens 630*b* is away from the center of the lens with respect to the main scanning direction (FSY2). Thereby, even if the temperature and humidity are changed, there can be provided the post-deflection optical system having little change of the image forming position.

As shown in FIG. 41, if the first and second image forming lenses 630*a* and 630*b* of the post-deflection optical system 621 are intentionally detached, the laser beams emitted from the light sources 3 are image-formed on a portion close to the reflection point of each reflection surface of the polygon mirror body 5*a* with respect to the sub-scanning direction perpendicular to the main scanning direction (FSZ0). At this time, if only the first image forming lens 630*a* is inserted, the laser beam, which is passed through substantially the center of the lens, is image-formed on a portion much closer to the pre-deflection optical system than the reflection point of each of the reflection surface of the polygon mirror body 5*a*. In other words, the first image forming lens 630*a* has a function of moving the image forming position to the direction, which is further than the image surface. The amount of the movement of the image forming position of the sub-scanning direction becomes large at the central portion of the lens as compared with the end portion of the lens (FSZ1). Moreover, by the insertion of the second image forming lens 630*b*, the laser beam, which is passed through the center of the first image forming lens, and the laser beam, which is passed through the end portion of the lend, are substantially linearly image-formed on a predetermined image surface, respectively. In other word, the second image lens 630*b* has power with which the image forming position of the sub-scanning direction can be moved to the image surface side in the entire area of the main scanning direction of the lens. That is, power of the second image forming lens 630*b* of the sub-scanning direction in the central area of the lens is set to be smaller than the lens end portion (FSZ2). Thereby, even if the amount of correcting inclination of each reflection surface of the polygon mirror body 5*a* is large and the temperature and humidity are changed, post-deflection optical system having little change of the image forming position can be provided.

As shown in FIG. 42, if the first and second image forming lenses 630*a* and 630*b* of the post-deflection optical system are intentionally detached, the laser beams, which are emitted from the light sources, and which are passed through the position corresponding to the center of the lens in the case in which the image forming lens 630 exists, are image-formed on a predetermined image surface (Y0). In this case, if only the first image forming lens 630*a* is inserted, the laser beam, which is passed through the center of the lens, is image-formed at substantially the equal position with respect to the main scanning direction of the lens. Then, the laser beam, which is passed through the lens end portion, is shifted to the center of the lens so as to be image-formed in proportion to the distance between the position of the main scanning direction where the laser beams are passed and the center of the main scanning direction of the lens (Y1). Also, if the second image forming lens 630*b* is further inserted, the laser beam, which is passed through the center of the lens, is image-formed at substantially the equal position with respect to the main scanning direction of the lens. Then, the laser beam, which is passed through the lens end portion, is further shifted to the center of the lens so as to be image-formed in proportion to the distance between the position of the main scanning direction where the laser beams are passed and the center of the main scanning direction of the lens (Y2). In other words, the first and second image forming lenses 630*a* and 630*b* have the function of moving the laser beam to the center of the main scanning direction with respect to the main scanning direction as the distance of the main scanning direction from the center of the lens is increased. The function of moving the laser beam is increased by a predetermined function as the distance of the main scanning direction from the center of the lens is increased. Therefore, there can be obtained a good constant velocity in deflecting the laser beam in the main scanning direction. Also, the variation of the position of the main scanning direction caused by the change of the temperature and humidity can be reduced.

As explained above, the optical characteristics of Tables 4 and 5 are given to the image forming lens 630 of the multi-beam exposer unit 601 including the optical elements similar to the multi-beam exposer unit of FIGS. 2 and 3. Thereby, as explained with reference to FIGS. 39 to 41, there can be provided the post-deflection optical system in which the amount of defocus of the main scanning direction, that of the sub-scanning direction, and the position of the laser beam of the main scanning direction are not changed by depending on the variations of the temperature and humidity even if two plastic lenses are used.

The first and second image forming lenses 630*a* and 630*b* are placed at the position, which is defined such that the distance from the reflection point of each reflection surface of the polygon mirror body 5*a* is shorter than the distance from the image surface, that is, the portion close to the polygon mirror unit 5 than the center of the distance between each reflection point of each reflection surface of the polygon mirror body 5*a* and the image surface. As a result, the size of the multi-beam exposer unit can be reduced.

Figure 43:
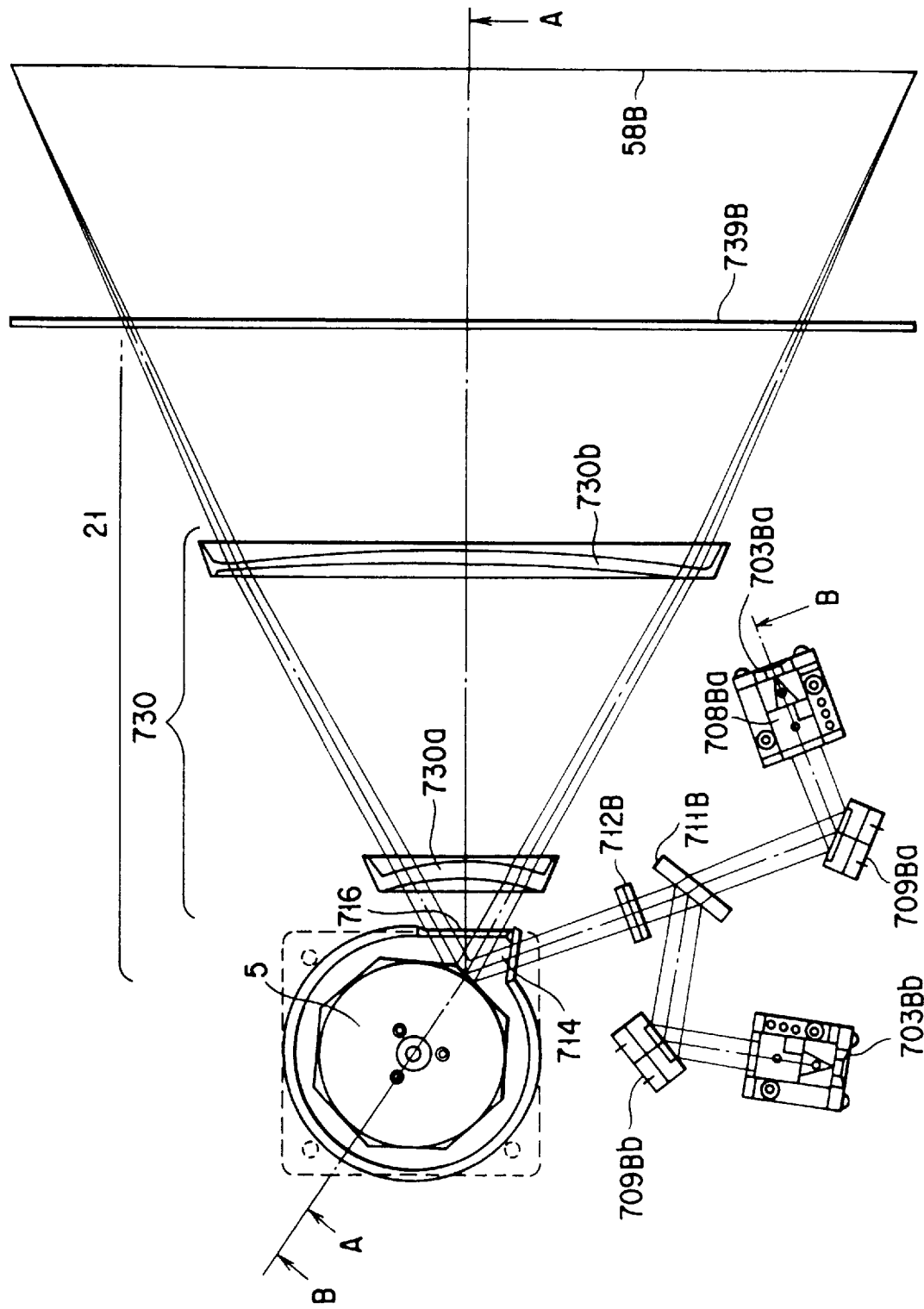
FIG. 43 is a schematic plain view showing a second modification of the optical scanning device of FIG. 39.

Next, the following will specifically explain a second modification of the post-deflection optical system of the second embodiment with reference to FIG. 43. In this case, Tables 6 and 7 show the specific characteristics.

As shown in FIG. 43, a post-deflection optical system of a multi-beam exposer unit 701 has a set of image forming lenses 730 including first and second image forming lenses 730*a* and 730*b*, and having optical characteristics and shapes as shown in the following Tables 6 and 7 and equation (8). Each of the image forming lenses 730*a* and 730*b* is placed at a predetermined position, which is defined such that the distance from the reflection point of each reflection surface of the polygon mirror body is shorter than the distance from the image surface.

TABLE 6

| Post-deflection optical system | | absolute coordinates: Decentering in y direction −4.333 | | |
|---|---|---|---|---|
| curvature | | | lens surface | |
| CUY | CUZ | Thickness | number | material |
| 0.012947194 | −0.00915104 | −57.652 | 1 | air |
| 0.0131721655 | 0.01124333 | −6.000 | 2 | PMMA |
| 0.000641449 | −0100414556 | −166.861 | 3 | air |
| 0.001987623 | 0.01029169 | −6.000 | 4 | PMMA |
| plane | plane | −13.500 | | air |
| plane | plane | −2.000 | | BK7 |
| plane | plane | −246.000 | | air |

TABLE 7

Lens surface number: 1

| n\m | 0 | 1 | 2 | 3 | 4 | 5 |
|---|---|---|---|---|---|---|
| 0 | 0.000E + 00 | −5.003E − 02 | 0.000E + 00 | 1.304E − 05 | −1.543E − 06 | −7.384E − 10 |
| 1 | 0.000E + 00 | 1.293E − 05 | 1.241E − 07 | −1.873E − 08 | 3.377E − 09 | −4.487E − 11 |
| 2 | −8.657E − 05 | −1.757E − 07 | −1.539E − 07 | 6.546E − 09 | −1.282E − 11 | 1.168E − 12 |
| 3 | 3.980E − 06 | 3.008E − 09 | 2.039E − 09 | −2.018E − 10 | 9.121E − 12 | −4.024E − 13 |
| 4 | −6.088E − 08 | −5.508E − 10 | −4.943E − 12 | 7.324E − 12 | −2.132E − 13 | 0.000E + 00 |

| n\m | 6 | 7 | 8 | 9 | 10 |
|---|---|---|---|---|---|
| 0 | −5.779E − 11 | 2.473E − 12 | −4.780E − 14 | −4.259E − 16 | 2.275E − 17 |
| 1 | 1.062E − 12 | −5.393E − 14 | −1.745E − 18 | 1.044E − 18 | 8.562E − 19 |
| 2 | 1.578E − 13 | −8.972E − 15 | −8.407E − 17 | −3.526E − 18 | 2.277E − 19 |
| 3 | 3.709E − 15 | −6.799E − 17 | 2.662E − 18 | 6.812E − 19 | −1.743E − 20 |
| 4 | 0.000E + 00 | 0.000E + 00 | 0.000E + 00 | 0.000E + 00 | 0.000E + 00 |

Lens surface number: 2

| n\m | 0 | 1 | 2 | 3 | 4 | 5 |
|---|---|---|---|---|---|---|
| 0 | 0.000E + 00 | −5.773E − 02 | 0.000E + 00 | 9.930E − 06 | −1.400E − 06 | 8.729E − 10 |
| 1 | 0.000E + 00 | 9.210E − 06 | −5.513E − 07 | 9.645E − 09 | 2.147E − 09 | −6.202E − 11 |
| 2 | −7.640E − 05 | 2.354E − 07 | −1.560E − 07 | 4.035E − 09 | 1.621E − 10 | −1.762E − 12 |
| 3 | 4.933E − 06 | −5.752E − 08 | 6.152E − 09 | −1.080E − 10 | −1.475E − 11 | 3.831E − 13 |
| 4 | −1.006E − 07 | 2.187E − 09 | −5.144E − 11 | −4.375E − 12 | 1.582E − 13 | 0.000E + 00 |

| n\m | 6 | 7 | 8 | 9 | 10 |
|---|---|---|---|---|---|
| 0 | −1.094E − 10 | 1.100E − 12 | −8.609E − 15 | −6.903E − 17 | 6.609E − 18 |
| 1 | 1.749E − 12 | −5.472E − 14 | 2.144E − 16 | −4.280E − 18 | 7.170E − 19 |
| 2 | −7.529E − 14 | −3.309E − 15 | 3.333E − 17 | 8.481E − 19 | 2.378E − 20 |
| 3 | 6.674E − 15 | 8.053E − 17 | −5.512E − 18 | −1.980E − 19 | 3.169E − 21 |
| 4 | 0.000E + 00 | 0.000E + 00 | 0.000E + 00 | 0.000E + 00 | 0.000E + 00 |

Lens surface number: 3

| n\m | 0 | 1 | 2 | 3 | 4 | 5 |
|---|---|---|---|---|---|---|
| 0 | 0.000E + 00 | 2.050E − 02 | 0.000E + 00 | −1.598E − 06 | −5.950E − 08 | 7.905E − 11 |
| 1 | 0.000E + 00 | −1.047E − 05 | 1.804E − 07 | 7.577E − 11 | 1.019E − 11 | 1.632E − 14 |
| 2 | −2.167E − 06 | −7.763E − 09 | 4.831E − 11 | 1.906E − 12 | 1.717E − 15 | −4.322E − 18 |
| 3 | −9.481E − 10 | 2.209E − 11 | 6.624E − 13 | 6.194E − 15 | 3.129E − 17 | −1.318E − 19 |
| 4 | 1.245E − 12 | −3.925E − 14 | −4.635E − 17 | 7.326E − 18 | −4.075E − 20 | 0.000E + 00 |

| n\m | 6 | 7 | 8 | 9 | 10 |
|---|---|---|---|---|---|
| 0 | 1.775E − 12 | 1.901E − 15 | −5.836E − 17 | 5.368E − 20 | −7.956E − 22 |
| 1 | −9.030E − 16 | 3.189E − 18 | −5.694E − 21 | −1.892E − 22 | −1.522E − 24 |
| 2 | 5.171E − 19 | −8.042E − 21 | −6.550E − 23 | 1.493E − 24 | −3.972E − 27 |
| 3 | 6.017E − 21 | −1.174E − 23 | 2.359E − 26 | −1.154E − 27 | −6.743E − 29 |
| 4 | 0.000E + 00 | 0.000E + 00 | 0.000E + 00 | 0.000E + 00 | 0.000E + 00 |

Lens surface number: 4

| n\m | 0 | 1 | 2 | 3 | 4 | 5 |
|---|---|---|---|---|---|---|
| 0 | 0.000E + 00 | 9.490E − 03 | 0.000E + 00 | −1.722E − 06 | −3.383E − 08 | 9.478E − 11 |
| 1 | 0.000E + 00 | −8.357E − 06 | 9.769E − 08 | −2.265E − 10 | 5.880E − 12 | 3.231E − 14 |
| 2 | −2.646E − 06 | −7.779E − 09 | 5.986E − 11 | 1.912E − 12 | 3.761E − 16 | −1.144E − 16 |
| 3 | 1.400E − 09 | 1.600E − 11 | 4.824E − 13 | 5.345E − 15 | 6.171E − 17 | 4.352E − 19 |
| 4 | −1.140E − 11 | −3.129E − 14 | 2.926E − 16 | 5.694E − 18 | 4.522E − 20 | 0.000E + 00 |

| n\m | 6 | 7 | 8 | 9 | 10 |
|---|---|---|---|---|---|
| 0 | 4.805E − 13 | −2.678E − 16 | 2.751E − 18 | 2.274E − 19 | −3.174E − 21 |
| 1 | 8.972E − 18 | 7.329E − 19 | −5.795E − 20 | 9.604E − 23 | −2.010E − 24 |
| 2 | 3.245E − 19 | 1.428E − 20 | 2.269.E − 24 | 4.105E − 25 | −8.401E − 27 |
| 3 | −7.626E − 22 | 2.707E − 24 | 2.018E − 26 | −7.895E − 27 | −2.122E − 30 |
| 4 | 0.000E + 00 | 0.000E + 00 | 0.000E + 00 | 0.000E + 00 | 0.000E + 00 |

FIGS. 44 to 46 are graphs showing a state that the laser beams LM is image-formed by a post-deflection optical system 721 to which the optical characteristics of Tables 6 and 7 are provided. Similar to the case explained in FIGS. 10 to 12, each graph shows that the first image forming lens 730a or the second image forming lens 730b, or both lenses are intentionally detached, so that the image forming characteristic is improved. The specific explanation of each of the laser beams LB, LY, and LC is omitted since the results, which are similar to the second embodiment shown in FIGS. 13 to 15 and FIGS. 16 to 18, can be obtained.

FIG. 44 is a graph showing the relationship between an amount of defocus (change of image-formation position) of the main scanning direction and the position of the main scanning direction in a state that the image forming lenses 730 are detached in connection with the laser beams LM (LMa and LMb are arrayed to have a predetermined distance in the sub-scanning direction). In this case, a curve FSY0 shows that each of first and second image forming lenses 730a and 730b is detached. A curve FSY1 shows that only the second image forming lens 630b is detached (only the first image forming lens 730a is used). A curve FSY2 corresponds to a state that each of the first and second lenses 730a and 730b is set.

FIG. 45 is a graph showing the relationship between an amount of defocus of the sub-scanning direction and the position of the main scanning direction in a state that the image-forming lens is detached in connection with the laser beams LM.

In this case, a curve FSZ0 shows that each of first and second image forming lenses 730a and 730b is detached. A curve FSZ1 shows that only the second image forming lens 730b is detached (only the first image forming lens 730a is used). A curve FSZ2 corresponds to a state that each of the first and second lenses 730a and 730b is set.

FIG. 46 is a graph showing the relationship between an amount of a beam position correction, which includes a difference between an actual position of the image forming in the main scanning direction and a logical position of the image formation, and the position of the main scanning direction in connection with the laser beams LY. In this case, a curve Y0 shows that each of first and second image forming lenses 730a and 730b is detached. A curve Y1 shows that only the second image forming lens 730b is detached (only the first image forming lens 730a is used). A curve Y2 corresponds to a state that each of the first and second lenses 730a and 730b is set.

As shown in FIG. 44, if each of first and second image forming lenses 730a and 730b is detached, the laser beam emitted from the light source is image-formed on a portion further than the image surface with respect to the main scanning direction by the pre-deflection optical system 707 (FSY0). If only the first image forming lens 730a is inserted, the laser beam, which passes through a portion close to the center of the image forming lens 730a, is image-formed on a portion close to the polygon mirror unit 5 than FY0. The laser beam, which passes through a portion close the end portion of the image forming lens 730a, is image-formed on a portion opposite to the polygon mirror unit 5 than FSY0. In other words, at the portion close to the center of the lens, the first image forming lens 730a has power with which the image forming position of the main scanning direction can be moved to the polygon mirror unit. At the portion close to the end portion of the lens, the first image forming lens 730a has a function of moving the image forming position to the portion opposite to the polygon mirror unit (FSY1).

If the second image forming lens 730b is set, the laser beam, which passes through a portion close to the center of the image forming lens 730a, and the laser beam, which passes through a portion close the end portion of the image forming lens 730a, are substantially linearly image-formed on a predetermined image surface, respectively. In other words, at the portion close to the center of the lens, the second image forming lens 730b has power with which the image forming position of the main scanning direction can be moved to a portion to the polygon mirror unit. At the portion close to the end portion of the lens, the second image forming lens 730b has a greater function of moving the image forming position to the polygon mirror unit. In other words, the second image forming lens 730b is formed to have power, which is increased as the lens 730b is away from the center of the lens with respect to the main scanning direction (FSY2). Thereby, even if the temperature and humidity are changed, there can be provided the post-deflection optical system having little change of the image forming position.

As shown in FIG. 45, if the first and second image forming lenses 730a and 730b of the post-deflection optical system 721 are intentionally detached, the laser beams emitted from the light sources are image-formed on a portion close to the reflection point of each reflection surface of the polygon mirror body 5a with respect to the sub-scanning direction perpendicular to the main scanning direction (FSZ0). At this time, if only the first image forming lens 730a is inserted, the laser beam, which is passed through substantially the center of the lens, is image-formed on a portion much closer to the pre-deflection optical system than the reflection point of each of the reflection surface of the polygon mirror body 5a. In other words, the first image forming lens 730a has a function of moving the image forming position to the direction, which is further than the image surface. The amount of the movement of the image forming position of the sub-scanning direction becomes large at the central portion of the lens as compared with the end portion of the lens (FSZ1). Moreover, by the insertion of the second image forming lens 730b, the laser beam, which is passed through the center of the first image forming lens, and the laser beam, which is passed through the end portion of the lend, are substantially linearly image-formed on a predetermined image surface, respectively. In other word, the second image lens 730b has power with which the image forming position of the sub-scanning direction can be moved to the image surface side in the entire area of the main scanning direction of the lens. That is, power of the second image forming lens 730b of the sub-scanning direction in the central area of the lens is set to be smaller than the lens end portion (FSZ2). Thereby, even if the amount of correcting inclination of each reflection surface of the polygon mirror body 5a is large and the temperature and humidity are changed, post-deflection optical system having little change of the image forming position can be provided.

As shown in FIG. 46, if the first and second image forming lenses 730a and 730b of the post-deflection optical system are intentionally detached, the laser beams, which are emitted from the light sources, and which are passed through the position corresponding to the center of the lens in the case in which the image forming lens 730 exists, are image-formed on a predetermined image surface (Y0). In this case, if only the first image forming lens 730a is inserted, the laser beam, which is passed through the center of the lens, is image-formed at substantially the equal position with respect to the main scanning direction of the lens. Then, the laser beam, which is passed through the lens end portion, is shifted to the center of the lens so as to be image-formed in proportion to the distance between the position of the main scanning direction where the laser beams are passed and the center of the main scanning direction of the lens (Y1). Also, if the second image forming lens 730b is further inserted, the laser beam, which is passed through the center of the lens, is image-formed at substantially the equal position with respect to the main scanning direction of the lens. Then, the laser beam, which is passed through the lens end portion, is further shifted to the center of the lens so as to be image-formed in proportion to the distance between the position of the main scanning direction where the laser beams are passed and the center of the main scanning direction of the lens (Y2). In other words, the first and second image forming lenses 730a and 730b have the function of moving the laser beam to the center of the main scanning direction with respect to the main scanning direction as the distance of the main scanning direction from the center of the lens is increased. The function of moving the laser beam is increased by a predetermined function as the distance of the main scanning direction from the center of the lens is increased. Therefore, there can be obtained a good constant velocity in deflecting the laser beam in the main scanning direction. Also, the variation of the position of the main scanning direction caused by the change of the temperature and humidity can be reduced.

As explained above, the optical characteristics of Tables 6 and 7 are given to the image forming lens 730 of the multi-beam exposer unit 701 including the optical elements similar to the multi-beam exposer unit of FIGS. 2 and 3. Thereby, as explained with reference to FIGS. 44 to 46, there can be provided the post-deflection optical system in which the amount of defocus of the main scanning direction, that of the sub-scanning direction, and the position of the laser beam of the main scanning direction are not changed by depending on the variations of the temperature and humidity even if two plastic lenses are used.

The first and second image forming lenses 730a and 730b are placed at the position, which is defined such that the distance from the reflection point of each reflection surface of the polygon mirror body 5a is shorter than the distance from the image surface, that is, the portion close to the polygon mirror unit 5 than the center of the distance between each reflection point of each reflection surface of the polygon mirror body 5a and the image surface. As a result, the size of the multi-beam exposer unit can be reduced.

As explained above, according to the multi-beam exposer unit of this invention, the absolute value of the coma aberration, which is generated by the half mirror, can be reduced by placing the parallel plate, which is inclined to be opposite to the direction where the half mirror is inclined, in the optical path between the light source and the optical path of the polygon mirror. In other words, it is assumed that the coma aberration, which is generated when a certain beam passes through i-th half mirror, is Fi, and that the beam passes through a (i=1 to a) half mirrors in all.

The beam is made incident on the parallel plate with a thickness tg, which satisfies the following equation, at an incident angle ug.

$$-tg \times ug^3 \times (ng^2-1)/ng^3 = -(F1+F2+ \ldots Fa)$$

Thereby, the coma aberration can be canceled.

On the other hand, in order to make the number of the parallel plates, there can be considered a method in which the absolute values of the coma aberration of the laser beam whose coma aberration is maximum and the laser beam whose coma aberration is minimum are set to be the same.

For example, it is assumed that the laser beam whose coma aberration is maximum is shown by (F1+F2+ . . . +Fa) and that the coma aberration of the laser beam whose coma aberration is minimum is 0.

The beam is made incident on the parallel plate with a thickness tg, which satisfies the following equation, at an incident angle ug.

$$-tg \times ug^3 \times (ng^2-1)/ng^3 = -(F1+F2 + \ldots +Fa)/2$$

As is obvious from the maximum absolute value of the coma aberration of (F1+F2+ . . . Fa)/2, this can be set to the half of the case in which no parallel plate exists.

It is assumed that the coma aberration generated by the half mirror is F1.

The beam is made incident on the parallel plate with a thickness tg, which satisfies the following equation, at an incident angle ug.

$$-tg \times ug^3 \times (ng^2-1)/ng^3 = -F1/2$$

As is obvious from the maximum absolute value of the coma aberration of F1/2, this can be set to the half of the case in which no parallel plate exists.

The parallel plate is formed to be integral with the dust prevention glass, which prevents dust from being adhered around the polygon mirror. As a result, the wind loss of each reflection surface of the polygon mirror, the generation of noise, and adhesion of undesirable dust onto each reflection surface can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A multi-beam exposer unit comprising:

M sets of light sources for emitting NI light beams wherein at least one set of the light sources satisfies NI (I=1, 2, 3, or 4) $\geq$ 2, M is a positive integer=1, 2, 3, or 4, and I is a positive integer no greater than M;

first optical means having a plurality of finite focal lenses for converting light beams emitted from the respective light sources to convergent light, $$\sum_{I=1}^{M}(NI-1)$$

first synthesizing reflection mirrors for reflecting a predetermined amount of incident light and transmitting a predetermined amount of incident light so as to synthesize light to M groups of beams passing through the finite focal lenses, thereby combining each NI (I=1, 2, 3, or 4) emission light from the respective finite focal lenses as one beam, M sets of optical members, having positive power and a larger absolute value of power in a sub-scanning direction than in a main scanning direction, the sub-scanning direction being perpendicular to the main scanning direction, for further converging the beam in the sub-scanning direction, and M-1 second synthesizing reflection mirrors for reflecting M groups of beams from M sets of optical members so that the M groups of beams are substantially overlaid on each other in a first direction;

deflecting means, having rotatable reflection surfaces for deflecting light in a predetermined direction; and second optical means having a set of lenses for image forming $$\sum_{I=1}^{M} NI$$

beams on a predetermined image surface at equal speed and for correcting an inclination of the deflecting means, wherein each of the lenses is positioned such that a distance from a reflection point on the deflecting means is shorter than a distance from the image surface, and wherein one lens that is placed on a side of the deflecting means moves an image forming position to the side of the deflecting means at a position close to the center of the lens, and moves the image forming position of the scanning direction to a side opposite to the deflecting means at a position close to a lens end portion.

2. A multi-beam exposer unit comprising:

M sets of light sources for emitting NI light beams wherein at least one set of the light sources satisfies NI (I=1, 2, 3, or 4)≧2, wherein M is a positive integer=1, 2, 3, or 4, and I is a positive integer no greater than M;

first optical means including
    a plurality of finite focal lenses for converting light beams emitted from the respective light sources to convergent light, $$\sum_{I=1}^{M} (NI-1)$$

first synthesizing reflection mirrors for reflecting a predetermined amount of incident light and transmitting a predetermined amount of incident light so as to synthesize light to M groups of beams passing through the finite focal lenses, thereby combining each NI (1=1, 2, 3, or 4) emission light from the respective finite focal lenses as one beam, M sets of optical members, having positive power and a larger absolute value of power in a sub-scanning direction than in a main scanning direction, the sub-scanning direction being perpendicular to the main scanning direction, for further converging the beam in the sub-scanning direction, and M-1 second synthesizing reflection mirrors for reflecting M groups of beams from M sets of optical members so that the M groups of beams are substantially overlaid on each other in a first direction;

deflecting means, having rotatable reflection surfaces for deflecting light to a predetermined direction; and second optical means having a set of lenses for image forming $$\sum_{I=1}^{M} NI$$

beams on a predetermined image surface at equal speed and for correcting an inclination of the deflecting means, wherein each of the lenses is positioned to include an image forming characteristic such that a distance from a reflection point on the deflecting means is shorter than a distance from the image surface, and wherein one lens that is placed on a side of the deflecting means moves an image forming position of a scanning direction and an image forming position of a perpendicular direction to the side of the deflecting means as seen from the image surface at a position close to the center of the lens.

3. A multi-beam exposer unit comprising:

M sets of light sources for emitting NI light beams wherein at least one set of the light sources satisfies NI (I=1, 2, 3, or 4)≧2 and wherein M is a positive integer=1, 2, 3, or 4 and I is a positive integer no greater than M;

first optical means including
    a plurality of finite focal lenses for converting light beams emitted from the respective light sources to convergent light, $$\sum_{I=1}^{M} (NI-1)$$

first synthesizing reflection mirrors for reflecting a predetermined amount of incident light and transmitting a predetermined amount of incident light so as to synthesize light to M groups of beams passing through the finite focal lenses, thereby combining each NI (I=1, 2, 3, or 4) emission light from the respective finite focal lenses as one beam, M sets of optical members, having positive power and a larger absolute value of power in a sub-scanning direction than in a main scanning direction, the sub-scanning direction being perpendicular to the main scanning direction, for further converging the beam in the sub-scanning direction, and M-1 second synthesizing reflection mirrors for reflecting M groups of beams from M sets of optical members so that the M groups of beams are substantially overlaid on each other in a first direction;

deflecting means, having rotatable reflection surfaces, for deflecting light in a predetermined direction; and second optical means having a set of lenses for image forming $$\sum_{I=1}^{M} NI$$

beams on a predetermined image surface at equal speed and for correcting an inclination of the deflecting means, wherein each of the lenses is positioned to include an image forming characteristic such that a distance from a reflection point on the deflecting means is shorter than a distance from the image surface, and wherein one lens that is placed on a side of the deflecting means moves a beam position of a scanning direction to an optical axis at a position close to a lens end portion, and another lens placed on a side of the image surface has a function of further moving the beam position of the scanning direction to the optical axis at a position close to the lens end portion.

* * * * *